(12) United States Patent
Mangold et al.

(10) Patent No.: US 12,018,192 B2
(45) Date of Patent: Jun. 25, 2024

(54) RECEIVER COMPRISING A LUMINESCENT COLLECTOR FOR OPTICAL DATA COMMUNICATION

(71) Applicant: BASF SE, Ludwigshafen am Rhein (DE)

(72) Inventors: Hannah Stephanie Mangold, Ludwigshafen am Rhein (DE); Martin Koenemann, Ludwigshafen am Rhein (DE); Sorin Ivanovici, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 537 days.

(21) Appl. No.: 17/275,532

(22) PCT Filed: Sep. 9, 2019

(86) PCT No.: PCT/EP2019/073944
§ 371 (c)(1),
(2) Date: Mar. 11, 2021

(87) PCT Pub. No.: WO2020/053124
PCT Pub. Date: Mar. 19, 2020

(65) Prior Publication Data
US 2022/0049158 A1      Feb. 17, 2022

(30) Foreign Application Priority Data

Sep. 11, 2018  (EP) .................................... 18193781

(51) Int. Cl.
*C09K 11/06* (2006.01)
*H04B 10/67* (2013.01)

(52) U.S. Cl.
CPC .............. *C09K 11/06* (2013.01); *H04B 10/67* (2013.01); *C09K 2211/1044* (2013.01)

(58) Field of Classification Search
CPC .. H04B 10/67; C09K 11/06; C09K 2211/1044
See application file for complete search history.

(56) References Cited

U.S. PATENT DOCUMENTS

| | | | | | |
|---|---|---|---|---|---|
| 2,551,731 | A | * | 5/1951 | Drewitt .................. | C08G 63/42 549/473 |
| 4,845,223 | A | * | 7/1989 | Seybold .................... | C09B 5/62 546/37 |

(Continued)

FOREIGN PATENT DOCUMENTS

| EP | 3072887 A1 | 9/2016 |
|---|---|---|
| EP | 3101087 A1 | 12/2016 |

(Continued)

OTHER PUBLICATIONS

Hany Elgala, "Indoor Optical Wireless Communication: Potential and State-of-the-Art," Sep. 8, 2011, IEEE Communications Magazine ( vol. 49, Issue: 9, Sep. 2011), pp. 56-61.*
Steve Collins,"High gain, wide field of view concentrator for optical communications," Mar. 19, 2014, Optics Letters / vol. 39, No. 7,Apr. 1, 2014, pp. 1756-1759.*

(Continued)

*Primary Examiner* — Omar S Ismail
(74) *Attorney, Agent, or Firm* — Faegre Drinker Biddle & Reath LLP

(57) ABSTRACT

A receiver comprising a luminescent collector (luminescent detector) comprising at least one organic fluorescent colorant B, an optical data communication system comprising said receiver, and to the use of the luminescent collector as fast photodetector in a receiver for an optical data communication system.

15 Claims, 1 Drawing Sheet

(56) References Cited

U.S. PATENT DOCUMENTS

| | | | | |
|---|---|---|---|---|
| 5,470,502 | A * | 11/1995 | Hahn | C08J 3/226 252/301.26 |
| 6,472,050 | B1 * | 10/2002 | Buoni | C08L 27/06 359/534 |
| 8,889,983 | B2 * | 11/2014 | Rider | H01L 31/055 136/246 |
| 11,613,523 | B2 * | 3/2023 | Sokolovskii | C07D 307/68 549/485 |
| 11,655,227 | B2 * | 5/2023 | Fontenot | B01D 3/06 549/485 |
| 11,870,492 | B2 * | 1/2024 | Momtahan | G01J 1/0411 |
| 2007/0010833 | A1 * | 1/2007 | Tanaka | A61B 17/11 606/153 |
| 2007/0119951 | A1 * | 5/2007 | Auslander | G06K 19/06075 235/491 |
| 2011/0282020 | A1 * | 11/2011 | Sipos | C08G 63/85 526/270 |
| 2011/0306804 | A1 * | 12/2011 | Cortright | C07C 27/06 568/861 |
| 2014/0336349 | A1 * | 11/2014 | Sipos | B29C 49/06 528/306 |
| 2016/0376400 | A1 * | 12/2016 | Moffitt | B65D 85/72 426/106 |
| 2017/0075191 | A1 * | 3/2017 | Tiecke | H04B 10/1141 |
| 2017/0346556 | A1 * | 11/2017 | Tiecke | H04B 10/25 |
| 2019/0039310 | A1 * | 2/2019 | Busbee | A43B 13/026 |
| 2019/0039311 | A1 * | 2/2019 | Busbee | A43B 13/04 |

FOREIGN PATENT DOCUMENTS

| | | |
|---|---|---|
| WO | 2004/029028 A2 | 4/2004 |
| WO | 2007/006717 A1 | 1/2007 |
| WO | 2009/037283 A1 | 3/2009 |
| WO | 2010/132740 A2 | 11/2010 |
| WO | 2011/043660 A2 | 4/2011 |
| WO | 2011/043661 A1 | 4/2011 |
| WO | 2012/152812 A1 | 11/2012 |
| WO | 2012/168395 A1 | 12/2012 |
| WO | 2014/122549 A1 | 8/2014 |
| WO | 2014/131628 A1 | 9/2014 |
| WO | 2015/019270 A1 | 2/2015 |
| WO | 2015/062916 A1 | 5/2015 |
| WO | 2015/137804 A1 | 9/2015 |
| WO | 2015/169935 A1 | 11/2015 |
| WO | 2016/026863 A1 | 2/2016 |
| WO | 2016/151068 A1 | 9/2016 |
| WO | 2017/089540 A1 | 6/2017 |
| WO | 2017/121833 A1 | 7/2017 |

OTHER PUBLICATIONS

T. Peyronel, "Luminescent detector for free-space optical communication," Jul. 19, 2016, Optica,2016, vol. 3, No. 7,pp. 787-790.*
Rahmat Mulyawan, "MIMO Visible Light Communications Using a Wide Field-of-View Fluorescent Concentrator," Jan. 25, 2017, IEEE Photonics Technology Letters, vol. 29, No. 3, Feb. 1, 2017, pp. 306-308.*
Harald Haas, "Optical wireless communication," Jan. 17, 2020, royalsocietypublishing.org/journal/rsta Phil. Trans. R. Soc. A 378: 20200051, pp. 1-6.*
Oskar Nuyken, "Polystyrenes and Other Aromatic Poly(vinyl compound)s," 2004, Book-Handbook of Polymer Synthesis,2nd Edition, pp. 73-126.*
Pavlos P. Manousiadis, "Wide field-of-view fluorescent antenna for visible light communications beyond the étendue limit," Jun. 28, 2016, Optica, vol. 3, No. 7 / Jul. 2016,pp. 702-705.*
Frank O. Holtrup, "Terrylenimides : New NIR Fluorescent Dyes," Feb. 1997, Chemistry A European Journal, 1997, 3, No. 2, pp. 219-225.*
Collins et al., "High gain, wide field of view concentrator for optical communications", Optics Letters, vol. 39, No. 7, Apr. 1, 2014, pp. 1756-1759.
Dimitrov et al., "Optical wireless communication", Principles of LED light communications, Cambridge University Press, 2015, pp. 12-56.
Elgala et al., "Indoor optical wireless communication: Potential and state-of-the-art", IEEE Communications Magazine, vol. 49, No. 9, 2011, pp. 56-62.
Elias, "Macromolecules", Aromatic polyesters, 2007, pp. 343-347.
Elias, "Macromolecules", Vinyl Polymers, 2007, pp. 269-275.
Holtrup et al., "Terrylenimides: New NIR Fluorescent Dyes", Chemistry A European Journal, vol. 3, Issue 2, pp. 219-225.
Manousiadis et al., "Wide field-of-view fluorescent antenna for visible light communications beyond the étendue limit", Optica, vol. 3, No. 7, Jul. 2016, pp. 702-706.
Mulyawan et al., MIMO Visible Light Communications Using a Wide Field-of-View Fluorescent Concentrator, IEEE Photonics Technology Letters, vol. 29, No. 3, Feb. 1, 2017, pp. 306-309.
Nuyken, "Polystyrenes and Other Aromatic Poly(vinyl compund)s", in Kricheldorf, 2005, pp. 73-150.
Tiecke et al., "Luminescent detector for free-space optical communication", Optica, vol. 3, No. 7, 2016, pp. 787-792.
International Preliminary Report on Patentability received for PCT Patent Application No. PCT/EP2019/073944, dated Dec. 7, 2020, 15 pages.
International Search Report and Written Opinion received for PCT Patent Application No. PCT/EP2019/073944, dated Jan. 10, 2020, 16 pages.

* cited by examiner

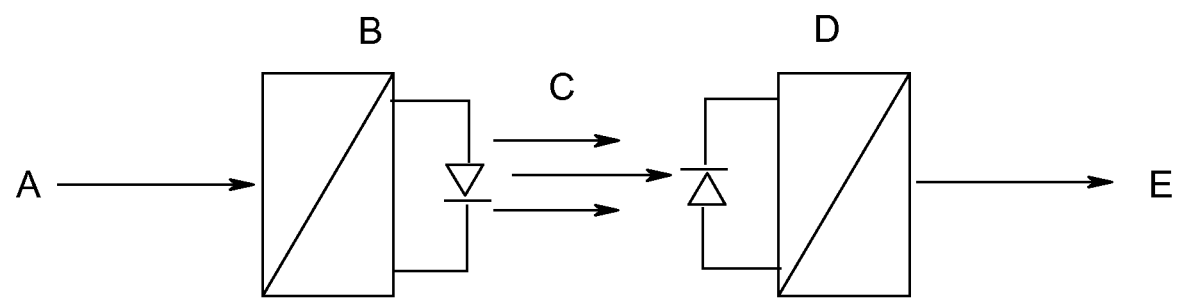

RECEIVER COMPRISING A LUMINESCENT COLLECTOR FOR OPTICAL DATA COMMUNICATION

CROSS-REFERENCE TO RELATED APPLICATIONS

This application is a national stage application (under 35 U.S.C. § 371) of PCT/EP2019/073944, filed Sep. 9, 2019, which claims benefit of European Application No. 18193781.4, filed Sep. 11, 2018, both of which are incorporated herein by reference in their entirety.

The present invention relates to a receiver comprising a luminescent collector (luminescent detector), to an optical data communication system comprising said receiver, and to the use of the luminescent collector as fast photodetector in a receiver for an optical data communication system.

BACKGROUND OF THE INVENTION

Optical data communication, especially optical wireless communication (OWC) like visible Light Communication (VLC), free space optical communication (FSO) and Li-Fi (Light Fidelity) are rapid growing technological fields that aim to implement fast and safe wireless communication to replace or complement existing wireless technologies. New technologies like the internet of things (being the basis for industry 4.0, IP 4.0®, etc.), wearables (i.e. smart electronic devices with microcontrollers that can be worn on the body as implant or accessories) and the general increase in mobile communication lead to a rapid increase in data streams and the necessity for new communication channels. In optical data communication systems generally an electrical signal is transformed to an optical signal in a transmitter. The optical light source is usually either a light-emitting diode (LED) or a laser diode (LD). The modulated optical field then propagates through a free-space path before arriving at a receiver. In the receiver, the optical signal is transformed back to an electrical signal.

Li-Fi is the term established for the transmission of data through illumination using LED lighting that varies in its intensity for high speed wireless communication. Together with the widespread use of LED lighting in offices, streetlights and homes, Li-Fi is an added benefit to the existing lighting infrastructure.

On the receiver side of an OWC system, semiconductor photodiodes are commonly used as optical detectors at high frequencies. However, the response times of these diodes are limited by the junction capacitance and the carrier transit time, and scale with detector size. In T. G. Tiecke et al., Optica, Vol. 3, No. 7, July 2016, 787-792, a method to increase the effective area and field of view of an optical receiver while maintaining fast response times is presented. This is achieved by using optical waveguides doped with wavelength shifting dyes (luminous concentrators). The incident light, modulated with a communication signal, is absorbed by the dye molecules independently of the light incidence angle and subsequently re-emitted at a different wavelength. A portion of the emitted light is collected by a fiber and guided to a small area semiconductor photodiode. It is referred to the combined system of the luminescent concentrators and photodiode as a luminescent detector (LD). However, in T. G. Tiecke et al., no specific wavelength shifting dyes are mentioned.

US 2017/0346556 A discloses an apparatus comprising: a wavelength-shifting element configured to receive an input-light signal, wherein the wavelength-shifting element comprises a wavelength-shifting material configured to: absorb at least a portion of the received input-light signal; and produce an emitted-light signal from the absorbed portion of the received input-light signal; a plasmonic grating comprising a plurality of plasmonic-structure elements, the plasmonic grating configured to: receive at least a portion of the emitted-light signal; and direct the received portion of the emitted-light signal toward a photodetector; and the photodetector configured to: receive the directed portion of the emitted-light signal; and produce an electrical current corresponding to the directed portion of the emitted-light signal. As an example for a wavelength-shifting material, the inorganic materials cadmium/selenide/cadmium sulfide (CdSe/CdS) quantum dots and lead selenide/led sulfide (PdSe/PdS) quantum dots are mentioned.

WO 2017/089540 A1 relates to a detector, a detector system and a method for determining a position of at least one object.

However, the photoluminescence lifetime (fluorescent/phosphorescent lifetime or excited-state lifetime) of conventional phosphors as wavelength-shifting material is too long (ranging in the order of greater than 10 nanoseconds and up to some microseconds) to support high rates of data transfer.

There is therefore a great demand in phosphors that have luminescent, especially fluorescent lifetimes in the order of a few nanoseconds and preferably even lower while maintaining good emission efficiency.

It is therefore an object of the present invention to provide a luminescent collector (luminescent detector) for use as fast photodetector in a receiver for an optical data communication system, to provide a receiver comprising said luminescent collector, and to provide an optical data communication system comprising said receiver.

It has been found that the afore-mentioned objects are solved by a receiver comprising a luminescent collector (luminescent detector) for use as fast photodetector in a receiver for an optical data communication system comprising at least one organic fluorescent colorant B selected from the group consisting of (B1) a naphthoylbenzimidazole compound, (B2) a cyanated naphthoylbenzimidazole compound, (B3) a cyanated perylene compound of formula (III), (B4) a cyanated compound of formula (IV), (B5) a benz (othi)oxanthene compound of formula (V), (B6) a benzimidazoxanthenisoquinoline compound of formulae (VIA) or (VIB), (B7) fluorescent compound comprising at least one structural unit of formua (VII), (B8) a perylene compound of formulae (VIII) or (IX), (B9) a naphthalene monoimide compound of formula (X), (B10) 7-(diethylamino)-3-(5-methylbenzo[d]oxazol-2-yl)-2H-chromen-2-one, (B11) a perylene compound of formulae (XIA) or (XIB), (B12) a cyanated perylene compound of formulae (XIIA) or (XIIB), (B13) a perylene bisimide compound of formula (XIII), (B14) a perylene compound of formula (XIV), (B15) a compound of the formula (XV), (B16) a terrylene bisimide compound of formula (XVI), (B17) a cyanoaryl substituted benz(othi)oxanthene compound and (B18) a cyanosubstituted BODIPY (boron-dipyrromethene) dye.

The objects are further solved by an optical data communication system comprising the receiver according to the present invention, and by the use of at least one organic fluorescent colorant B selected from the group consisting of the compounds (B1) to (B18) in a luminescent collector (luminescent detector) as photodetector in a receiver for an optical data communication system.

SUMMARY OF THE INVENTION

The present invention relates to a receiver comprising a luminescent comprising i) at least one wavelength shifting material and
ii) at least one detector,
wherein the wavelength shifting material comprises
ia) a polymeric matrix material, and
ib) at least one organic fluorescent colorant B selected from the group consisting of
(B1) a naphthoylbenzimidazole compound of formula (I)

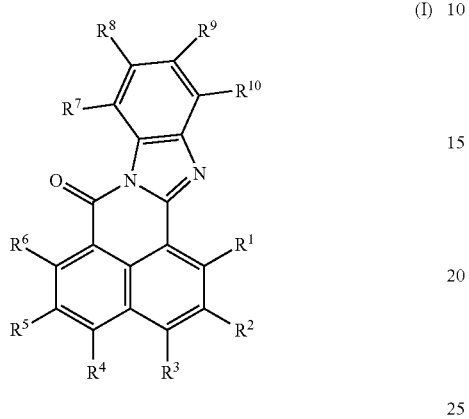

(I)

wherein
at least one of the radicals $R^1$, $R^2$, $R^3$, $R^4$, $R^5$, $R^6$, $R^7$, $R^8$, $R^9$ and $R^{10}$ independently of each other is aryl which carries one, two or three cyano groups and 0, 1, 2, 3 or 4 substituents $R^{Ar}$ and the remaining radicals $R^1$, $R^2$, $R^3$, $R^4$, $R^5$, $R^6$, $R^7$, $R^8$, $R^9$ and $R^{10}$ independently of each other are selected from hydrogen and aryl which is unsubstituted or carries 1, 2, 3, 4 or 5 substituents $R^{Ar}$,
where
$R^{Ar}$ independently of each other and independently of each occurrence is selected from halogen,
$C_1$-$C_{30}$-alkyl, $C_2$-$C_{30}$-alkenyl, $C_2$-$C_{30}$-alkynyl, where the three latter radicals are unsubstituted or carry one or more $R^a$ groups,
$C_3$-$C_8$-cycloalkyl, 3- to 8-membered heterocyclyl, where the two latter radicals are unsubstituted or carry one or more $R^b$ groups,
aryl and heteroaryl, where the two latter radicals are unsubstituted or carry one or more $R^c$ groups,
where
$R^a$ independently of each other and independently of each occurrence is selected from cyano, halogen, $C_3$-$C_8$-cycloalkyl, 3- to 8-membered heterocyclyl, aryl and heteroaryl,
where $C_3$-$C_8$-cycloalkyl, 3- to 8-membered heterocyclyl are unsubstituted or bear one or more $R^{b1}$ groups, and where aryl and heteroaryl are unsubstituted or bear one or more $R^{c1}$ groups;
$R^b$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{b1}$ groups, and where aryl and heteroaryl are unsubstituted or bear one or more $R^{c1}$ groups;
$R^c$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{b1}$ groups, and where aryl and heteroaryl are unsubstituted or bear one or more $R^{c1}$ groups;
$R^{b1}$ independently of each other and independently of each occurrence is selected from halogen, $C_1$-$C_{18}$-alkyl and $C_1$-$C_{18}$-haloalkyl,
$R^{c1}$ independently of each other and independently of each occurrence is selected from halogen, $C_1$-$C_{18}$-alkyl and $C_1$-$C_{18}$-haloalkyl;
and mixtures thereof;
(B2) a cyanated naphthoylbenzimidazole compound of formula (II)

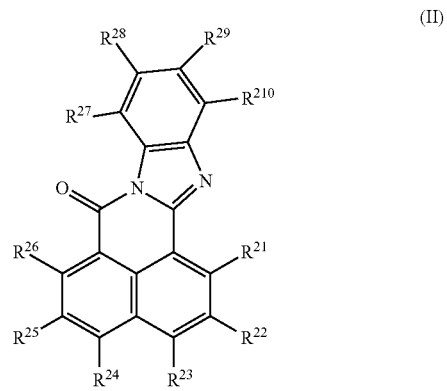

(II)

wherein $R^{21}$, $R^{22}$, $R^{23}$, $R^{24}$, $R^{25}$, $R^{26}$, $R^{27}$, $R^{28}$, $R^{29}$ and $R^{219}$ are each independently hydrogen, cyano or aryl which is unsubstituted or has one or more identical or different substituents $R^{2Ar}$,
where
each $R^{2Ar}$ is independently selected from cyano, hydroxyl, mercapto, halogen, $C_1$-$C_{20}$-alkoxy, $C_1$-$C_{20}$-alkylthio, nitro, —$NR^{2Ar2}R^{2Ar3}$,
—$NR^{2Ar2}COR^{2Ar3}$, —$CONR^{2Ar2}R^{2Ar3}$,
—$SO_2NR^{2Ar2}R^{2Ar3}$,
—$COOR^{2Ar2}$, —$SO_3R^{2Ar2}$,
$C_1$-$C_{30}$-alkyl, $C_2$-$C_{39}$-alkenyl, $C_2$-$C_{39}$-alkynyl, where the three latter radicals are unsubstituted or bear one or more Rea groups,
$C_3$-$C_8$-cycloalkyl, 3- to 8-membered heterocyclyl, where the two latter radicals are unsubstituted or bear one or more $R^{2b}$ groups, aryl, U-aryl, heteroaryl and U-heteroaryl, where the four latter radicals are unsubstituted or bear one or more $R^{2b}$ groups,
where
each $R^{2a}$ is independently selected from cyano, hydroxyl, oxo, mercapto, halogen, $C_1$-$C_{20}$-alkoxy, $C_1$-$C_{20}$-alkylthio, nitro,
—$NR^{2Ar2}R^{Ar3}$, —$NR^{2Ar2}COR^{2Ar3}$, —$CONR^{2Ar2}R^{Ar3}$,
—$SO_2NR^{2Ar2}R^{Ar3}$,
—$COOR^{2Ar2}$, —$SO_3R^{2Ar2}$, $C_3$-$C_8$-cycloalkyl, 3- to 8-membered heterocyclyl, aryl and heteroaryl, where the cycloalkyl, heterocyclyl, aryl and heteroaryl radicals are unsubstituted or bear one or more $R^{2b}$ groups;
each $R^{2b}$ is independently selected from cyano, hydroxyl, oxo, mercapto, halogen, $C_1$-$C_{20}$-alkoxy, $C_1$-$C_{20}$-alkylthio, nitro,
—$NR^{2Ar2}R^{2Ar3}$, —$NR^{2Ar2}COR^{2Ar3}$,
—$CONR^{2Ar2}R^{2Ar3}$, —$SO_2NR^{2Ar2}R^{2Ar3}$,
—$COOR^{2Ar2}$, —$SO_3R^{2Ar2}$, $C_1$-$C_{18}$-alkyl, $C_2$-$C_{18}$-alkenyl, $C_2$-$C_{18}$-alkynyl, $C_3$-$C_8$-cycloalkyl, 3- to 8-membered heterocyclyl, aryl and heteroaryl, where the four latter radicals are unsubstituted or bear one or more $R^{2b}$ 1 groups, each $R^{2b}$ 1 is independently selected from cyano, hydroxyl, mercapto, oxo, nitro, halogen, $-NR^{2Ar2}R^{2Ar3}$, $-NR^{2Ar2}COR^{2Ar3}$, $-CONR^{2Ar2}R^{2Ar3}$, $-SO_2NR^{2Ar2}R^{2Ar3}$, $-COOR^{2Ar2}$, $-SO_3R^{2Ar2}$, $-SO_3R^{2Ar2}$, $C_1$-$C_{18}$-alkyl, $C_2$-$C_{18}$-alkenyl, $C_2$-$C_{18}$-alkynyl, $C_1$-$C_{12}$-alkoxy, and $C_1$-$C_{12}$-alkylthio, U is an $-O-$, $-S-$, $-NR^{2Ar1}-$, $-CO-$, $-SO-$ or $-SO_2-$ moiety;

$R^{2Ar1}$, $R^{2Ar2}$, $R^{2Ar3}$ are each independently hydrogen, $C_1$-$C_{18}$-alkyl, 3- to 8-membered cycloalkyl, 3- to 8-membered heterocyclyl, aryl or heteroaryl, where alkyl is unsubstituted or bears one or more $R^{2a}$ groups, where 3- to 8-membered cycloalkyl, 3- to 8-membered heterocyclyl, aryl and heteroaryl are unsubstituted or bear one or more $R^{2b}$ groups; with the proviso that the compound of formula II comprises at least one cyano group, and mixtures thereof;

(B3) a cyanated perylene compound of formula (III)

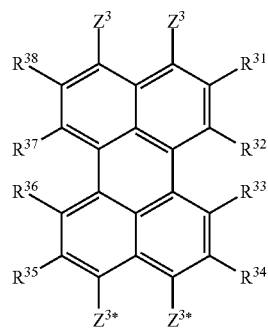

(III)

in which one of the $Z^3$ substituents is cyano and the other $Z^3$ substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_6$-$C_{14}$-aryl, where $C_1$-$C_{18}$-alkyl, $C_2$-$C_{18}$-alkenyl, $C_2$-$C_{18}$-alkynyl are unsubstituted or bear one or more identical or different Zia substituents, $C_3$-$C_{12}$-cycloalkyl is unsubstituted or bears one or more identical or different $Z^{3b}$ substituents, and $C_6$-$C_{14}$-aryl is unsubstituted or bears one or more identical or different $Z^{3Ar}$ substituents; one of the $Z^{3*}$ substituents is cyano and the other $Z^{3*}$ substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_6$-$C_{14}$-aryl, where $C_1$-$C_{18}$-alkyl, $C_2$-$C_{18}$-alkenyl, $C_2$-$C_{18}$-alkynyl are unsubstituted or bear one or more identical or different $Z^{3a}$ substituents, $C_3$-$C_{12}$-cycloalkyl is unsubstituted or bears one or more identical or different $Z^{3b}$ substituents, and $C_6$-$C_{14}$-aryl is unsubstituted or bears one or more identical or different $Z^{3Ar}$ substituents;

$R^{31}$, $R^{32}$, $R^{33}$, $R^{34}$, $R^{35}$, $R^{36}$, $R^{37}$ and $R^{38}$ are each independently selected from hydrogen, cyano, bromine and chlorine, with the proviso that 1, 2, 3, 4, 5, 6, 7 or 8 of the $R^{31}$, $R^{32}$, $R^{33}$, $R^{34}$, $R^{35}$, $R^{36}$, $R^{37}$ or $R^{38}$ substituents are cyano;

where $R^{39}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where $C_1$-$C_{10}$-alkyl, $C_2$-$C_{10}$-alkenyl, $C_2$-$C_{10}$-alkynyl are unsubstituted or bear one or more identical or different $R^{3a}$ substituents, $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

$R^{310}$ and $R^{311}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where $C_1$-$C_{10}$-alkyl, $C_2$-$C_{10}$-alkenyl, $C_2$-$C_{10}$-alkynyl are unsubstituted or bear one or more identical or different $R^{3a}$ substituents, $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents; each $Z^{3a}$ is independently halogen, hydroxyl, $NR^{310a}R^{311a}$, $C_1$-$C_{10}$-alkoxy, $C_1$-$C_{10}$-haloalkoxy, $C_1$-$C_{10}$-alkylthio, $C_3$-$C_{12}$-cycloalkyl, $C_6$-$C_{14}$-aryl, $C(=O)R^{39a}$; $C(=O)OR^{39a}$ or $C(O)RN^{310a}R^{311a}$, where $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

each $Z^{3b}$ and each $Z^{3Ar}$ is independently halogen, hydroxyl, $NR^{310a}R^{311a}$, $C_1$-$C_{10}$-alkyl, $C_1$-$C_{10}$-alkoxy, $C_1$-$C_{10}$-haloalkoxy, $C_1$-$C_{10}$-alkylthio, $C(=O)R^{39a}$; $C(=O)OR^{39a}$ or $C(O)$ $NR^{310a}R^{311a}$;

each $R^{3a}$ is independently halogen, hydroxyl, $C_1$-$C_{10}$-alkoxy, $C_3$-$C_{12}$-cycloalkyl or $C_6$-$C_{14}$-aryl;

each $R^{3b}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

each $R^{3Ar}$ is independently halogen, hydroxyl, $C_1$-$C_{10}$-alkyl, $C_1$-$C_{10}$-haloalkoxy, $C_2$-$C_{10}$-alkenyl, $C_2$-$C_{10}$-alkynyl, $C_3$-$C_{12}$-cycloalkyl or $C_6$-$C_{14}$-aryl;

$R^{39a}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $06$-$C_{14}$-5 aryl; and $R^{310a}$, $R^{311a}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, and mixtures thereof;

(B4) a cyanated compound of formula (IV)

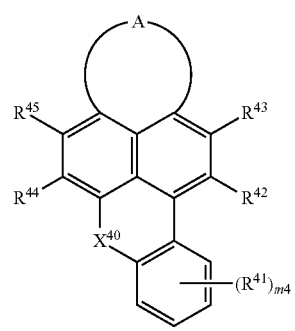

(IV)

wherein m4 is 0, 1, 2, 3 or 4;

each $R^{41}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_3$-$C_{24}$ cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy in the six last-mentioned radicals are unsubstituted or substituted with 1, 2, 3, 4 or 5 identical or different radicals $R^{41a}$ and where $C_1$-$C_{24}$-alkyl, $C_1$-$C_{24}$-alkoxy, and the alkylene moiety of $C_6$-$C_{24}$-aryl-$C_1$-$C_{10}$-alkylene may be interrupted by one or more groups selected from O, S and $NIR^{4c}$;

at least one of the radicals $R^{42}$, $R^{43}$, $R^{44}$ and $R^{45}$ is CN, and the remaining radicals, independently from each other, are selected from hydrogen, chlorine and bromine;

$X^{40}$ is O, S, SO or $SO_2$;

A is a diradical selected from diradicals of the general formulae (A.1), (A.2), (A.3), and (A.4)

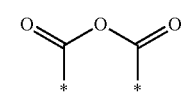
(A.1)

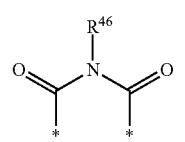
(A.2)

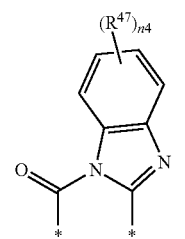
(A.3)

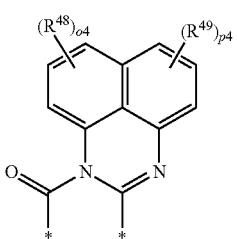
(A.4)

wherein in each case denotes the point of attachments to the remainder of the molecule;

n4 is 0, 1, 2, 3 or 4;

o4 is 0, 1, 2 or 3;

p4 is 0, 1, 2 or 3;

$R^{46}$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^{4ea}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^4C$;

each $R^{47}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{47a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^4C$;

each $R^{48}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{48a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^4C$;

each $R^{49}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{49a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^4C$;

$R^{41a}$, $R^{4ea}$, $R^{47a}$, $R^{48a}$, $R^{49a}$ are independently of one another selected from $C_1$-$C_{24}$-alkyl, $C_1$-$C_{24}$-fluoroalkyl, $C_1$-$C_{24}$-alkoxy, fluorine, chlorine and bromine;

$R^{4a}$, $R^{4b}$, $R^{4c}$ are independently of one another are selected from hydrogen, $C_1$-$C_{20}$-alkyl, $C_3$-$C_{24}$-cycloalkyl, heterocycloalkyl, heteroaryl and $C_6$-$C_{24}$-aryl; and mixtures thereof;

(B5) a benz(othi)oxanthene compound of formula (V)

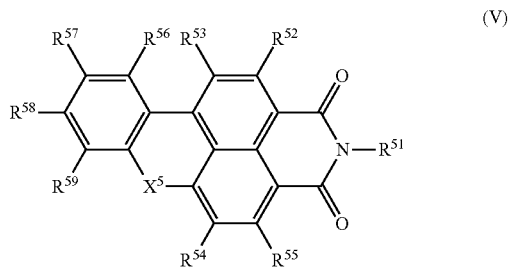
(V)

wherein
X⁵ is oxygen or sulfur;
R⁵¹ is $C_1$-$C_{24}$-alkyl which is unsubstituted or substituted by one or more $R^{51a}$ groups or
R⁵¹ is phenyl which is unsubstituted or carries 1, 2, 3, 4, or 5 substituents selected from halogen, $R^{511}$, $OR^{552}$, $NHR^{552}$ and $NR^{552}R^{557}$;
$R^{51a}$ is independently of each other and independently of each occurrence selected from cyano, halogen, $C_3$-$C_8$-cycloalkyl, 3- to 8-membered heterocyclyl, aryl and heteroaryl, where $C_3$-$C_8$-cycloalkyl, 3- to 8-membered heterocyclyl, aryl and heteroaryl are unsubstituted or bear one or more substituents selected from halogen, $C_1$-$C_{18}$-alkyl and $C_1$-$C_{18}$-haloalkyl,
$R^{52}$, $R^{53}$, $R^{54}$, $R^{55}$, $R^{56}$, $R^{57}$, $R^{58}$ and $R^{59}$ are independently of each other selected from hydrogen, halogen, $R^{553}$, $OR^{553}$, $NHR^{553}$ and $NR^{553}R^{554}$,
wherein
$R^{511}$ is selected from $C_1$-$C_{20}$-alkyl, $C_6$-$C_{24}$-aryl and heteroaryl;
$R^{552}$ and $R^{557}$ are independently of each other selected from $C_1$-$C_{18}$-alkyl, $C_6$-$C_{24}$-aryl and heteroaryl; and
$R^{553}$ and $R^{554}$ are independently of each other selected from $C_1$-$C_{18}$-alkyl, $C_6$-$C_{24}$-aryl and heteroaryl;
and mixtures thereof;
(B6) a benzimidazoxanthenisoquinoline compound of formulae (VIA) or (VIB)

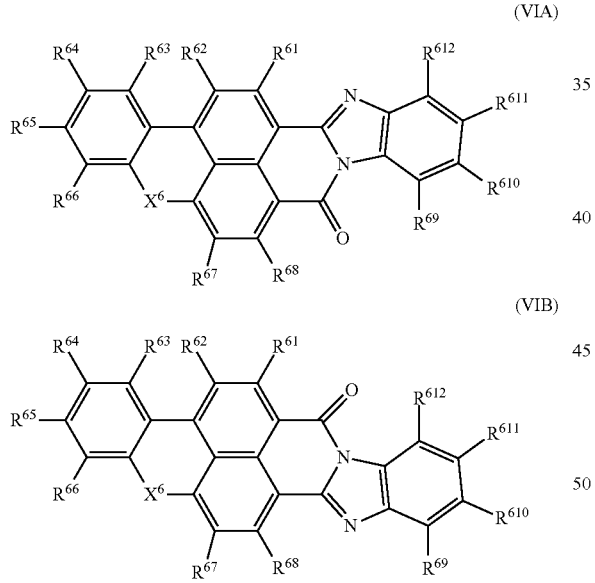

wherein
X⁶ is oxygen or sulfur;
$R^{61}$, $R^{62}$, $R^{63}$, $R^{64}$, $R^{65}$, $R^{66}$, $R^{67}$, $R^{68}$, $R^{69}$, $R^{610}$, $R^{611}$ and $R^{612}$ are independently of each other selected from hydrogen, halogen, $R^{661}$, $OR^{661}$, $NHR^{661}$ and $NR^{661}R^{662}$,
wherein
each $R^{661}$ is selected from $C_1$-$C_{18}$-alkyl, $C_6$-$C_{24}$-aryl and heteroaryl; and
each $R^{662}$ is selected from $C_1$-$C_{18}$-alkyl, $C_6$-$C_{24}$-aryl and heteroaryl;
and mixtures thereof;

(B7) fluorescent compound comprising at least one structural unit of formula (VII)

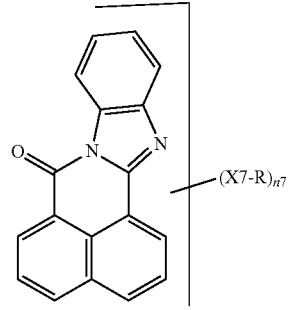

where one or more CH groups of the six-membered ring of the benzimidazole structure shown may be replaced by nitrogen and where the symbols are each defined as follows:
n7 is a number from 0 to (10-p7) for each structural unit of the formula (VII); where p⁷ is the number of CH units which have been replaced by nitrogen in the six-membered ring of the benzimidazole structure shown
X7 is a chemical bond, O, S, SO, $SO_2$, $NR^{71}$; and
R is an aliphatic radical, cycloaliphatic radical, aryl, heteroaryl, each of which may bear substituents,
an aromatic or heteroaromatic ring or ring system, each of which is fused to other aromatic rings of the structural unit of the formula (VII), is F, Cl, Br, CN, H when X7 is not a chemical bond;
where two R radicals may be joined to give one cyclic radical and
where X7 and R, when n7>one, may be the same or different;
$R^{71}$ is each independently hydrogen, $C_1$-$C_{18}$-alkyl or cycloalkyl, the carbon chain of which may comprise one or more —O—, —S—, —CO—, —SO— and/or —$SO_2$— moieties and which may be mono- or polysubstituted;
aryl or heteroaryl which may be mono- or polysubstituted;
and mixtures thereof;
(B8) a perylene compound of formulae (VIII) or (IX)

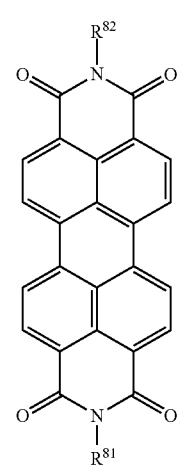

-continued (IX)

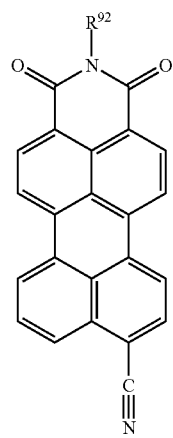

where

R⁸¹, R⁸² are each independently $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

R⁹² is $C_1$-$C_{30}$-alkyl, $C_3$-$C_8$-cycloalkyl, aryl, heteroaryl, aryl-$C_1$-$C_{10}$-alkylene, where the aromatic ring in the three latter radicals is unsubstituted or mono- or polysubstituted by $C_1$-$C_{10}$-alkyl (B9) a naphthalene monoimide compound of formula (X)

(X)

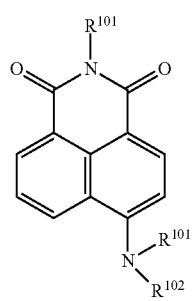

wherein each R¹⁰¹ independently of each other is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or monoor polysubstituted by $C_1$-$C_{10}$-alkyl;

R¹⁰² is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl (B10) 7-(diethylamino)-3-(6-methylbenzo[d]oxazol-2-yl)-2H-chromen-2-one;

(B111) a perylene compound of formulae (XIA) or (XIB)

(XIA)

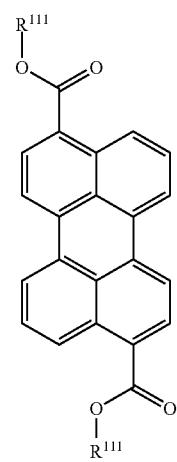

(XIB)

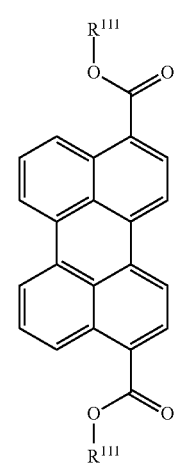

wherein each R¹¹¹ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;

and mixtures thereof;

(B12) a cyanated perylene compound of formulae (XIIA) or (XIIB)

(XIIA)

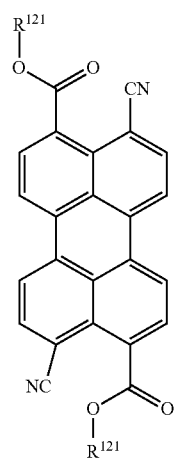

-continued

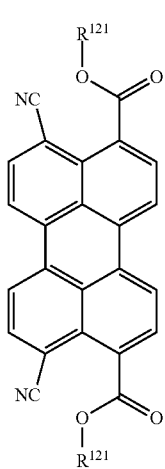

(XIIB)

wherein
each $R^{121}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;
and mixtures thereof;

(B13) a perylene bisimide compound of formula (XIII)

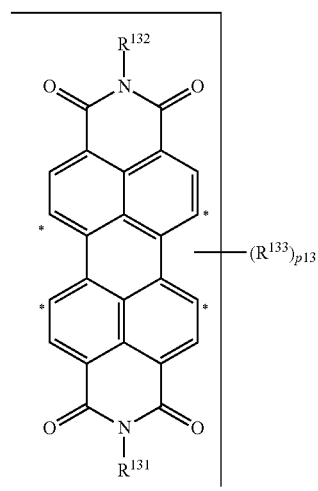

(XIII)

wherein
p13 is 1, 2, 3 or 4;
$R^{131}$ and $R^{132}$ independently of each other are $C_1$-$C_{10}$-alkyl, which is unsubstituted or substituted by $C_6$-$C_{10}$-aryl which in turn is unsubstituted or substituted by 1, 2 or 3 $C_1$-$C_{10}$-alkyl,
$C_2$-$C_{20}$-alkyl, which is interrupted by one or more oxygen,
$C_3$-$C_8$-cycloalkyl, which is unsubstituted or substituted by 1, 2 or 3 $C_1$-$C_{10}$-alkyl, or
$C_6$-$C_{10}$-aryl which is unsubstituted or substituted by 1, 2 or 3 $C_1$-$C_{10}$-alkyl;
each $R^{133}$ independently of each other is fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy,
where the $R^{133}$ radicals are at the positions indicated by *;
and mixtures thereof;

(B14) a perylene compound of formula (XIV)

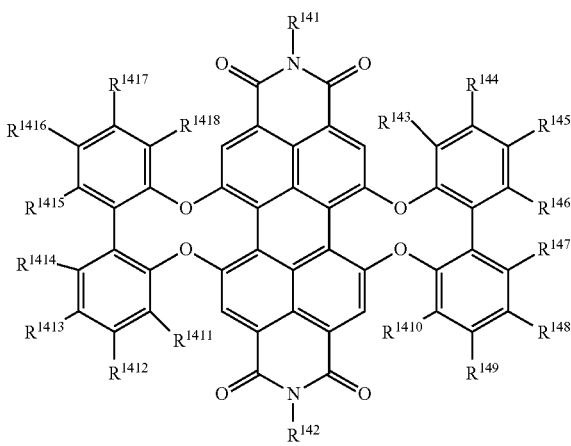

(XIV)

wherein
$R^{141}$ and $R^{142}$, independently of each other, are selected from hydrogen,
in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkyloxy, $C_6$-$C_{24}$-aryl and $C_6$-$C_{24}$-aryloxy;
$R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ independently of each other, are selected from hydrogen, halogen, cyano, hydroxyl, mercapto, nitro, $-NE^{141}E^{142}$, $-NR^{Ar141}COR^{A142}$ $CONR^{Ar141}R^{Ar142}$, $-SO_2NR^{A141}R^{A142}$, $-CO-OR^{Ar141}$, $-SO_3R^{Ar142}$,
in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkoxy, $C_6$-$C_{24}$-aryl, $C_6$-$C_{24}$-aryloxy and $C_6$-$C_{24}$-arylthio,
where $R^{143}$ and $R^{144}$, $R^{144}$ and $R^{145}$, $R^{145}$ and $R^{146}$, $R^{146}$ and $R^{147}$, $R^{147}$ and $R^{148}$, $R^{148}$ and $R^{149}$, $R^{149}$ and $R^{1410}$, $R^{1411}$ and $R^{1412}$, $R^{1412}$ and $R^{1413}$, $R^{1413}$ and $R^{1414}$, $R^{1414}$ and $R^{1415}$, $R^{1415}$ and $R^{1416}$, $R^{1416}$ and $R^{1417}$ and/or $R^{1417}$ and $R^{1418}$ together with the carbon atoms of the biphenylyl moiety to which they are bonded, may also form a further fused aromatic or nonaromatic ring system wherein the fused ring system is unsubstituted or substituted; where
$E^{141}$ and $E^{142}$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl;
$R^{Ar141}$ and $R^{Ar142}$, each independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl;
and mixtures thereof;

(B15) a compound of the formula (XV)

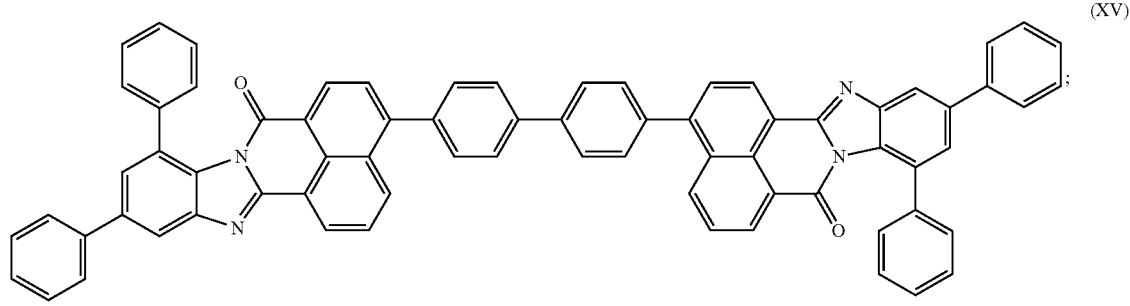 [SMILES: O=c1c2ccc(-c3ccc(-c4ccc(-c5ccc6c7c5cccc7c(=O)n5c6nc6cc(-c7ccccc7)cc(-c7ccccc7)c65)cc4)cc3)c3cccc(c32)c2nc3cc(-c4ccccc4)cc(-c4ccccc4)c3n12]

(B16) a terrylene bisimide compound of formula (XVI)

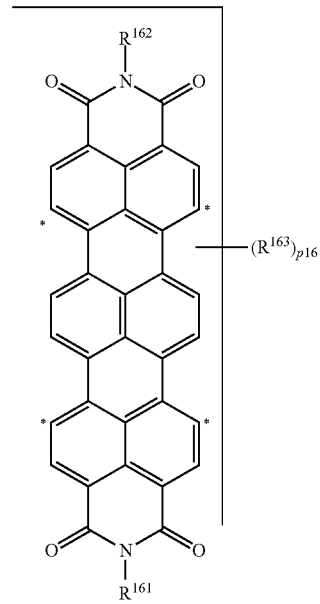

wherein
p16 is 0, 1, 2, 3 or 4;
$R^{161}$ and $R^{162}$ independently of each other are $C_1$-$C_{10}$-alkyl, which is unsubstituted or substituted by $C_6$-$C_{10}$-aryl which in turn is unsubstituted or substituted by 1, 2 or 3 $C_1$-$C_{10}$-alkyl,
$C_2$-$C_{20}$-alkyl, which is interrupted by one or more oxygen,
$C_3$-$C_8$-cycloalkyl, which is unsubstituted or substituted by 1, 2 or 3 $C_1$-$C_{10}$-alkyl, or
$C_6$-$C_{10}$-aryl which is unsubstituted or substituted by 1, 2 or 3 $C_1$-$C_{10}$-alkyl;
$R^{163}$ if present, independently of each other is fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy, where the $R^{163}$ radicals are at the positions indicated by *;
and mixtures thereof;

(B17) a cyanoaryl substituted benz(othi)oxanthene compound of formula (XVII)

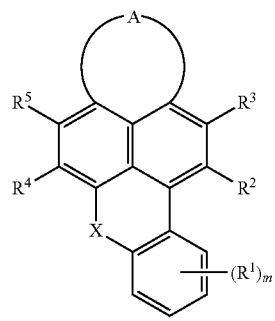

wherein
m is 0, 1, 2, 3 or 4;
each $R^1$ independently from each other is selected from the group consisting of bromine, chlorine, cyano, $-NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy and -aryl-alkylene in the six last-mentioned radicals are unsubstituted or substituted with 1, 2, 3, 4 or 5 identical or different radicals $R^{1a}$ and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from the group consisting of O, S and $NR^c$;
$R^2$, $R^3$, $R^4$ and $R^5$ are selected from the group consisting of hydrogen, chlorine, bromine and $C_6$-$C_{24}$-aryl, which carries one, two or three cyano groups;
with the proviso that at least one of the radicals $R^1$, $R^2$, $R^3$, $R^4$ and $R^5$ is $C_6$-$C_{24}$-aryl, which carries one, two or three cyano groups;
X is O, S, SO or $SO^2$;
A is a diradical selected from the group consisting of diradicals of the general formulae (A.1), (A.2), (A.3), and (A.4)

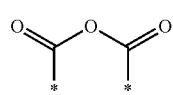

-continued

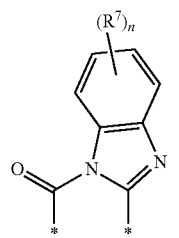
(A.2)

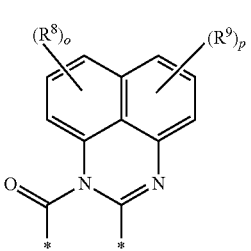
(A.3)

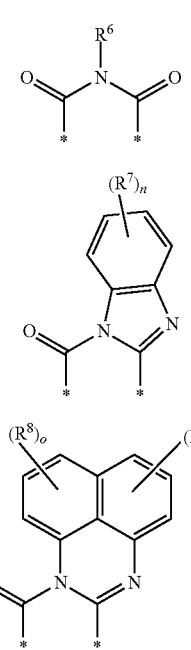
(A.4)

wherein
* in each case denotes the point of attachments to the remainder of the molecule;

n is 0, 1, 2, 3 or 4;
o is 0, 1, 2 or 3;
p is 0, 1, 2 or 3;

$R^6$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^{6a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from the group consisting of O, S and $NR^c$;

each $R^7$ independently from each other is selected from the group consisting of bromine, chlorine, cyano, —$NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{7a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from the group consisting of O, S and $NR^c$;

each $R^8$ independently from each other is selected from the group consisting of bromine, chlorine, cyano, $NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{6a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from the group consisting of O, S and $NR^c$;

each $R^9$ independently from each other is selected from the group consisting of bromine, chlorine, cyano, $NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{9a}$ and where $C_1$-$C_{24}$-alkyl, $C_1$-$C_{24}$-haloalkyl, $C_1$-$C_{24}$-alkoxy, $C_1$-$C_{24}$-haloalkoxy and the alkylene moiety of $C_6$-$C_{24}$-aryl-$C_1$-$C_{10}$-alkylene may be interrupted by one or more groups selected from the group consisting of O, S and $NR^c$;

$R^{1a}$, $R^{6a}$, $R^{7a}$, $R^{8a}$, $R^{9a}$ are independently of one another selected from the group consisting of $C_1$-$C_{24}$-alkyl, $C_1$-$C_{24}$-fluoroalkyl, $C_1$-$C_{24}$-alkoxy, fluorine, chlorine, bromine and cyano;

$R^a$, $R^b$, $R^c$ are independently of one another are selected from the group consisting of hydrogen, $C_1$-$C_{20}$-alkyl, $C_3$-$C_{24}$-cycloalkyl, heterocycloalkyl, hetaryl and $C_6$-$C_{24}$-aryl;

(B18) a cyano-substituted BODIPY (boron-dipyrromethene) dye selected from a compound of formulae (XVIIIa), (XVIIIb), (XVIIIc) or mixtures thereof

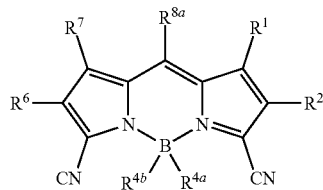
(XVIIIa)

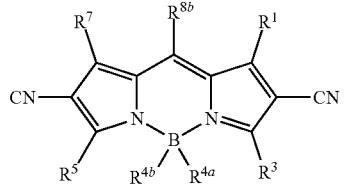
(XVIIIb)

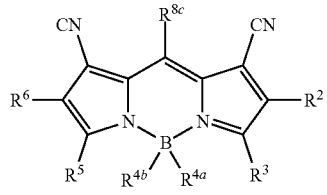
(XVIIIc)

wherein
$R^1$, $R^2$, $R^3$, $R^5$, $R^6$ and $R^7$, if present, in formulae (XVIIIa), (XVIIIb) and (XVIIIc) independently of each other are selected from hydrogen, $C_1$-$C_{20}$-alkyl or $C_6$-$C_{14}$-aryl-$C_1$-$C_{10}$-alkylene, wherein the aryl moiety in $C_6$-$C_{14}$-aryl-$C_1$-$C_{10}$-alkylene is unsubstituted or substituted by k identical or different substituents $R^9$;

$R^{4a}$, $R^{4b}$, in formulae (XVIIIa), (XVIIIb) and (XVIIIc), independently of each other, are selected from fluorine, chlorine, cyano or $OR^{10}$, $R^{8a}$ in formula (XVIIIa) is $C_1$-$C_{20}$-alkyl;

$R^{8b}$ in formula (XVIIIb) is $C_1$-$C_{20}$-alkyl; and $R^{8c}$ in formula (XVIIIc) is $C_1$-$C_{20}$-alkyl, $C_6$-$C_{10}$-aryl or $C_6$-$C_{10}$-aryl-$C_1$-$C_{10}$-alkylene, wherein the aryl moieties in the two aforementioned radicals are unsubstituted or substituted by k identical or different substituents $R^9$;

wherein k is an integer from 1, 2, 3, 4, 5 or 6;

$R^9$ is $C_1$-$C_{10}$-alkyl, $C_1$-$C_{10}$-alkoxy, CN, halogen, phenyl or phenoxy; and $R^{10}$ is $C_1$-$C_{10}$-alkyl or hydroxy-$C_1$-$C_{10}$-alkyl.

The present invention further relates to a receiver comprising at least one organic fluorescent colorant B selected from the group consisting of B1, B2, B3, B4, B5, B7, B8, B11, B12, B13, B14, B15, B16, B17 and B18.

The present invention further relates to an optical data communication system comprising at least one transmitter (T), and at least one receiver (R);

wherein at least one organic fluorescent colorant B selected from the group consisting of B1, B2, B3, B4, B5, B7, B8, B11, B12, B13, B14, B15, B16, B17 and B18 is present in the receiver.

The present invention further relates to the use of an organic fluorescent colorant B selected from the group consisting of B1, B2, B3, B4, B5, B7, B8, B11, B12, B13, B14, B15, B16, B17 and B18 in a luminescent collector in a receiver for an optical data communication system.

DESCRIPTION OF THE INVENTION

The optical data communication system according to the present invention comprises a receiver (R) to detect at least a part of the modulated electromagnetic radiation emitted by the transmitter (T). The receiver (R) according to the present invention comprises a luminescent collector. At the luminescent collector, the optical signal is collected and converted back to electrical current.

Since the response times of photodiodes commonly used as detectors in receivers are limited by the junction capacitance and the carrier transit time, and scale with detector size, and for obtaining an increased field of view, in the present invention, a luminescent collector, which is a combined system of wavelength shifting material and a detector, preferably a photodiode (PD or array of PDs), is employed in the receiver (R).

Luminescent Collector

The present invention therefore relates to luminescent collector comprising i) at least one wavelength shifting material comprising ia) a polymeric matrix material, and ib) at least one organic fluorescent colorant B selected from the group consisting of B1, B2, B3, B4, B5, B7, B8, B11, B12, B13, B14, B15, B16, B17 and B18; and ii) at least one detector.

Wavelength Shifting Material

The wavelength shifting material is used instead of traditional optics to collect the modulated electromagnetic radiation or together with traditional optics to collect the modulated electromagnetic radiation. The wavelength shifting materials are optical waveguides (i.e. polymeric matrix materials, wherein suitable matrix materials are described below) doped with at least one organic fluorescent colorant B selected from the group consisting of B1, B2, B3, B4, B5, B7, B8, B11, B12, B13, B14, B15, B16, B17 and B18.

The combined system of the wavelength shifting materials comprising at least one organic fluorescent colorant B selected from the group consisting of B1, B2, B3, B4, B5, B7, B8, B11, B12, B13, B14, B15, B16, B17 and B18 and a detector, preferably photodiode is the luminescent collector according to the present invention.

The incident light, modulated with a communication signal (i.e. the modulated electromagnetic radiation, preferably emitted by the transmitter (T)), is absorbed by the at least one organic fluorescent colorant B selected from the group consisting of B1, B2, B3, B4, B5, B7, B8, B11, B12, B13, B14, B15, B16, B17 and B18, independently of the light incidence angle and subsequently re-emitted at a different wavelength. At least a portion of the emitted light, in an ideal case all of the emitted light, is collected, for example by a fiber or a sheet, and guided by internal reflection to a detector, preferably a photodiode, more preferably a small area photodiode.

The wavelength shifting material comprises at least one organic fluorescent colorant B selected from the group consisting of B1, B2, B3, B4, B5, B7, B8, B11, B12, B13, B14, B15, B16, B17 and B18 present in a polymeric matrix. Usually, the organic fluorescent colorant B is molecularly dissolved in the polymeric matrix. Suitable polymeric matrix materials are mentioned in the following.

The concentration of the organic fluorescent colorant B selected from the group consisting of B1, B2, B3, B4, B5, B7, B8, B11, B12, B13, B14, B15, B16, B17 and B18 in the polymeric matrix materials of the wavelength shifting material is set as a function of the thickness of the receiver and the type of polymer. If a thin polymer layer is used, the concentration of the organic fluorescent colorant B is generally higher than in the case of a thick polymer layer.

Preferably, the concentration of the organic fluorescent colorant B selected from the group consisting of B1, B2, B3, B4, B5, B7, B8, B11, B12, B13, B14, B15, B16, B17 and B18 (in the case of more than one organic fluorescent colorant B, the concentration of the sum of the organic fluorescent colorants B) is in the range from 0.0001 to 5% by weight, more preferably 0.001 to 0.5% by weight, based on the amount of matrix polymer used.

The organic fluorescent colorant B selected from the group consisting of B1, B2, B3, B4, B5, B7, B8, B11, B12, B13, B14, B15, B16, B17 and B18 may be applied in the form of particles, which are usually molecularly dissolved in the polymeric matrix. In a further embodiment, the organic fluorescent colorant B is dissolved in a liquid contained in a container (e.g. glass) that includes the organic fluorescent colorant B in dissolved form.

The wavelength shifting material may be present in form of sheets which may be curved and/or flexible, or may be composed of one or more fibers.

Polymeric Matrix Materials

As mentioned before, the organic fluorescent colorant B selected from the group consisting of B1, B2, B3, B4, B5, B7, B8, B11, B12, B13, B14, B15, B16, B17 and B18 is present in a polymeric matrix.

The polymeric matrix for the at least one organic fluorescent colorant B selected from the group consisting of B1, B2, B3, B4, B5, B7, B8, B11, B12, B13, B14, B15, B16, B17 and B18 according to the present invention is preferably selected from the group consisting of polystyrene, polycarbonate, polymethylmethacrylate, polyvinylpyrrolidone, polymethacrylate, polyvinyl acetate, polyvinyl chloride, polybutene, silicone, polyacrylate, epoxy resin, polyvinyl alcohol, poly(ethylene vinylalcohol)-copolymer (EVA, EVOH), polyacrylonitrile, polyvinylidene chloride (PVDC), polystyrene acrylonitrile (SAN), polybutylene terephthalate (PBT), polyethylene terephthalate (PET), polyvinyl butyrate (PVB), polyvinyl chloride (PVC), polyamides, polyoxymethylenes, polyimides, polyetherimides, 2,5-furandicarboxylate polyester, UV curable or thermally curable resists like epoxy, acrylates or silicones, and mixtures thereof.

Preferably, the polymeric matrix material comprises at least one polymer selected from polystyrene, polymethylmethacrylate, polycarbonate, polyethylene terephthalate and mixtures thereof.

Polystyrene is understood here to mean, inter alia, all homo- or copolymers which result from polymerization of styrene and/or derivatives of styrene. Derivatives of styrene are, for example, alkylstyrenes such as alpha-methylstyrene, ortho-, meta-, para-methylstyrene, para-butylstyrene, especially para-tert-butylstyrene, alkoxystyrene such as para-methoxystyrene, para-butoxystyrene, para-tert-butoxystyrene. In general, suitable polystyrenes have a number average molecular weight Mn of 10000 to 1000000 g/mol (determined by GPC), preferably 20000 to 750000 g/mol, more preferably 30000 to 500000 g/mol.

In one preferred embodiment of the invention, the polymeric matrix comprises or is a homopolymer of styrene or styrene derivatives. More particularly, the polymeric matrix consists of polystyrene.

In a further preferred embodiment of the invention, the polymeric matrix comprises or is a styrene copolymer, which is likewise regarded as polystyrene in the context of this application.

Styrene copolymers may comprise, as further constituents, for example, butadiene, acrylonitrile, maleic anhydride, vinylcarbazole or esters of acrylic, methacrylic or itaconic acid as monomers. Suitable styrene copolymers generally comprise at least 20% by weight of styrene, preferably at least 40% and more preferably at least 60% by weight of styrene. In another embodiment, they comprise at least 90% by weight of styrene.

Preferred styrene copolymers are styrene-acrylonitrile copolymers (SAN) and acrylonitrilebutadiene-styrene copolymers (ABS), styrene-1,1'-diphenylethene copolymers, acrylic esterstyrene-acrylonitrile copolymers (ASA), methyl methacrylate-acrylonitrile-butadiene-styrene copolymers (MABS). A further preferred polymer is alpha-methylstyrene-acrylonitrile copolymer (AMSAN). The styrene homo- or copolymers can be prepared, for example, by free-radical polymerization, cationic polymerization, anionic polymerization or under the influence of organometallic catalysts (for example Ziegler-Natta catalysis). This can lead to isotactic, syndiotactic or atactic polystyrene or copolymers. They are preferably prepared by free-radical polymerization. The polymerization can be performed as a suspension polymerization, emulsion polymerization, solution polymerization or bulk polymerization. The preparation of suitable polystyrenes is described, for example, in Oscar Nuyken, Polystyrenes and Other Aromatic Polyvinyl Compounds, in Kricheldorf, Nuyken, Swift, New York 2005, p. 73-150 and references cited therein; and in Elias, Macromolecules, Weinheim 2007, p. 269-275.

In another preferred embodiment, the polymeric matrix comprises or is polyethylene terephthalate. Polyethylene terephthalate is obtainable by condensation of ethylene glycol with terephthalic acid.

In a further preferred embodiment, the polymeric matrix comprises or is polycarbonate. Polycarbonates are polyesters of carbonic acid with aromatic or aliphatic dihydroxyl compounds. Preferred dihydroxyl compounds are, for example, methylenediphenylenedihydroxyl compounds, for example bisphenol A. One means of preparing polycarbonates is the reaction of suitable dihydroxyl compounds with phosgene in an interfacial polymerization. Another means is the reaction with diesters of carbonic acid such as diphenyl carbonate in a condensation polymerization. The preparation of suitable polycarbonates is described, for example, in Elias, Macromolecules, Weinheim 2007, p. 343-347.

In a further preferred embodiment, the polymeric matrix comprises at least one 2,5-furandicarboxylate polyester (A) obtainable by reacting (i) at least one diol selected from an aliphatic $C_2$-$C_{20}$-diol and a cycloaliphatic $C_3$-$C_{20}$-diol, with (ii) 2,5-furandicarboxylic acid and/or an ester forming derivative thereof and (iii) optionally at least one further dicarboxylic acid selected from 1,2-cyclohexanedicarboxylic acid, 1,4-cyclohexanedicarboxylic acid, 3,4-furandicarboxylic acid, terephthalic acid and 2,5-naphthalic acid and/or an ester forming derivative thereof.

Suitable aliphatic $C_2$-$C_{20}$-diols are preferably linear or branched $C_2$-$C_{15}$-alkanediols, especially linear or branched $C_2$-$C_{10}$-alkanediols, such as ethane-1,2-diol (ethylene glycol), propane-1,2-diol, propane-1,3-diol (propylene glycol), butane-1,3-diol, butane-1,4-diol (butylene glycol), 2-methyl-1,3-propanediol, pentane-1,5-diol, 2,2-dimethyl-1,3-propanediol (neopentyl glycol), hexane-1,6-diol, heptane-1,7-diol, octane-1,8-diol, nonane-1,9-diol, decane-1,10-diol, etc. Suitable cycloaliphatic $C_3$-$C_{20}$-diols are preferably $C_3$-$C_{10}$-cycloalkylenediols, such as 1,2-cyclopentanediol, 1,3-cyclopentanediol, 1,2-cyclohexanediol, 1,4-cyclohexanediol, 1,2-cycloheptanediol or 1,4-cycloheptanediol. Other suitable cycloaliphatic $C_3$-$C_{20}$-diols include 1,3-cyclohexane dimethanol and 1,4-cyclohexane dimethanol, or 2,2,4,4-tetramethyl-1,3-cyclobutanediol, or combinations thereof. Particularly preferred diols are $C_2$-$C_6$-alkanediols, in particular ethane-1,2-diol, propane-1,2-diol, propane-1,3-diol, butane-1,3-diol, butane-1,4-diol, pentane-1,5-diol, 2,2-dimethyl-1,3-propanediol and mixtures thereof. More particularly preferred are ethane-1,2-diol and propane-1,3-diol. Especially preferred is ethane-1,2-diol.

More particularly preferred are also biologically derived ("bio-derived") $C_2$-$C_{10}$-alkanediols, especially $C_2$-$C_6$-alkanediols, such as ethane-1,2-diol and propane-1,3-diol. Bio-based ethane1,2-diol may be obtained from a lignocellulosic biomass source by the conversion of the carbohydrates therein contained. Methods for preparing $C_2$-$C_{10}$-alkanediols from biomass are known in the art, for example from US 2011/0306804.

Preferably, the diol component (i) is made up exclusively of one diol mentioned as preferred, especially ethane-1,2-diol. The diol component (i) may also comprise two, three or more than three different diols. If two, three or more than three different diols are used, preference is given to those mentioned above as being preferred. In this case, based on the total weight of component (i), ethane-1,2-diol is preferably the major component.

Ester forming derivatives of 2,5-furandicarboxylic acids are especially $C_1$-$C_{10}$-dialkyl esters of 2,5-furandicarboxylic acid. Particularly preferred diesters are $C_1$-$C_6$-dialkyl esters of 2,5-furandicarboxylic acid, especially the dimethyl ester and diethyl ester. Component (ii) may also comprise two, three or more than three different diesters of 2,5-furandicarboxylic acid. 2,5-Furandicarboxylic acid can be produced from bio-based sugars. Routes for the preparation of 2,5- furandicarboxylic acid using air oxidation of 2,5-disubstituted furans, such as 5-hydroxymethylfurfural with catalysts comprising Co, Mn and/or Ce were reported recently in WO 2010/132740, WO 2011/043660, WO 2011/043661, US 2011/0282020, US 2014/0336349 and WO 2015/137804.

Routes for the preparation of dialkyl esters of 2,5-furandicarboxylic acid are also described for example in WO 2011/043661.

Preferably, component (ii) is made up exclusively of 2,5-furandicarboxylic acid or of diester(s) of 2,5-furandicarboxylic acid.

Preferably, the 2,5-furandicarboxylate polyester (A) is selected from poly(ethylene-2,5-furandicarboxylate), poly(propylene-2,5-furandicarboxylate), poly(ethylene-co-propylene-2,5-furandicarboxylate), poly(butylene-2,5-furandicarboxylate), poly(pentylene-2,5-furandicarboxylate), poly(neopentylene-2,5-furandicarboxylate) and mixtures thereof.

In particular, the polymeric matrix material for use in combination with the frequency converter is selected from the group consisting of poly(ethylene-2,5-furandicarboxylate), poly(trimethylene2,5-furandicarboxylate) and poly(butylene-2,5-furandicarboxylate). More preferably, the polymeric matrix material for use in combination with the frequency converter is poly(ethylene-2,5-furandicarboxylate).

In a further specific embodiment, the polymeric matrix material for use in combination with the frequency converter comprises a mixture (blend) of different 2,5-furandicarboxylate polyesters (A) as defined above, for example, a blend of poly(ethylene-2,5-furandicarboxylate) and poly(propylene-2,5-furandicarboxylate) Poly(propylene-2,5-furandicarboxylate) is also referred to as poly(trimethylene-2,5-furandicarboxylate); poly(butylene-2,5-furandicarboxylate) is also referred to as poly(tetramethylene-2,5-furan-dicarboxylate), poly(pentylene-2,5-furandicarboxylate) is also referred to as poly(pentamethylene-2,5-furan-dicarboxylate).

Likewise suitable are 2,5-furandicarboxylate polyesters (A) obtainable by reacting at least one diol component (i) as defined above, component (ii) as defined above and at least one further diacid or diester component (iii) selected from 1,2-cyclohexane-dicarboxylic acid, 1,4-cyclohexanedicarboxylic acid, 3,4-furandicarboxylic acid, terephthalic acid and 2,6-naphthalic acid and/or an ester forming derivative thereof. Ester forming derivatives of 1,2-cyclohexanedicarboxylic acid, 1,3-cyclohexanedicarboxylic acid, 3,4-furandicarboxylic acid, terephthalic acid and 2,5-naphthalic acid are especially the $C_1$-$C_{10}$-dialkyl ester. Particularly preferred esters are $C_1$-$C_6$-dialkyl ester, especially the dimethyl ester and diethyl ester. When using a combination of component (ii) and component (iii), component (ii) is usually the major component based on the total weight of component (ii) and (iii). Examples are poly(ethylene-2,5-furandicarboxylate-co1,2-cyclohexanedicarboxylate), poly(ethylene-2,5-furandicarboxylate-co-1,4-cyclohexanedicarboxylate), poly(ethylene-2,5-furandicarboxylate-co-terephthalate), poly(ethylene-2,5-furandicarboxylate-co-2,5-naphthalate) or poly(ethylene-2,5-furandicarboxylate-co-3,4-furandicarboxylate), preferably poly(ethylene-2,5-furandicarboxylate-co-terephthalate), poly(ethylene-2,5-furandicarboxylate-co-2,6-naphthalate) or poly(ethylene-2, 5-furandicarboxylate-co-3,4-furandicarboxylate.

The 2,5-furandicarboxylate polyester (A) can be prepared as described in U.S. Pat. No. 2,551,731.

In a preferred embodiment, polymers which have been polymerized with exclusion of oxygen are used. Preferably, the monomers during the polymerization comprised a total of not more than 1000 ppm of oxygen, more preferably not more than 100 ppm and especially preferably not more than 10 ppm.

Further suitable polymeric matrix materials are also UV curable or thermally curable resists like epoxy, acrylates or silicones.

In one embodiment of the invention, suitable polymers are optically transparent polymers. In another embodiment, suitable polymers are opaque polymers.

In the meaning of the present application optically transparent means completely optically transparent as well semitransparent. Therefore, optically transparent means that at least 30% of the incident light enter through the polymer, preferably 30% to 100%, more preferably at least 50%, even more preferably 50% to 100%, most preferably at least 80%, even more most preferably 80% to 100%.

The transparency (light transmission) of at least 30%, preferably 30% to 100%, more preferably at least 50%, even more preferably 50% to 100%, most preferably at least 80%, even more most preferably 80% to 100% is preferably determined as light transmission TL (380-780 nm) based on EN 410.

Opaque polymers do not allow transmission of light waves. In other words, one cannot see through an opaque polymer. Opacity occurs because of the reflection of light waves off the surface of a polymer.

Suitable matrix polymers may comprise, as further constituents, additives, such as flame retardants, antioxidants, light stabilizers, UV absorbers, free-radical scavengers, antistats. Stabilizers of this kind are known to those skilled in the art.

Suitable antioxidants or free-radical scavengers are, for example, phenols, especially sterically hindered phenols, such as butylhydroxyanisole (BHA) or butylhydroxytoluene (BHT), or sterically hindered amines (HALS). Stabilizers of this kind are sold, for example, by BASF under the Irganox® trade name. In some cases, antioxidants and free-radical scavengers can be supplemented by secondary stabilizers, such as phosphites or phosphonites, as sold, for example, by BASF under the Irgafos® trade name.

Suitable UV absorbers are, for example, benzotriazoles, such as 2-(2-hydroxyphenyl)-2H-benzotriazole (BTZ), triazines, such as (2-hydroxyphenyl)-s-triazine (HPT), hydroxybenzophenones (BP) or oxalanilides. UV absorbers of this kind are sold, for example, by BASF under the Uvinul® trade name.

In a preferred embodiment of the invention, suitable matrix polymers do not comprise any antioxidants or free-radical scavengers.

Pigments/Scattering Bodies

In one embodiment, the wavelength shifting material additionally comprises at least one scattering body. Preferably, the wavelength shifting material is additionally employed with at least one inorganic white pigment as a scattering body.

Suitable scattering bodies are inorganic white pigments, for example titanium dioxide, barium sulfate, lithopone, zinc oxide, zinc sulfide, calcium carbonate with a mean particle size to DIN 13320 of 0.01 to 10 µm, preferably 0.1 to 1 µm, more preferably 0.15 to 0.4 µm, especially scattering bodies based on $TiO_2$.

Scattering bodies are included in a composition comprising a dye comprising at least one organic fluorescent colorant B selected from the group consisting of B1, B2, B3, B4, B5, B7, B8, B11, B12, B13, B14, B15, B16, B17 and B18, at least one polymeric matrix and at least one scattering body typically in an amount of 0.01 to 10% by weight, preferably 0.05 to 5% by weight, more preferably 0.1 to 2% by weight, based in each case on the polymeric matrix.

Examples of suitable light scattering organic agents include those based on poly(acrylates); poly (alkyl methacrylates), for example poly(methyl methacrylate) (PMMA); poly (tetrafluoroethylene) (PTFE); silicone-based scattering agents, for example hydrolyzed poly(alkyl trialkoxysilanes), and mixtures thereof. The size of these light scattering agents (average diameter-weight average) is usually in the range from 0.5 to 50 μm, preferably 1 to 10 μm.

Useful scattering agents are for example a mixture of PMMA based scattering agent and silicone base scattering agent. Also suitable are light-scattering compositions which contain polymeric particles based on vinyl acrylate with a core/shell morphology in combination with $TiO_2$ as described in EP-A 634 445. Preferably, the at least one scattering agent is a poly(methyl methacrylate)-based scattering agent, silicone-based scattering agent or $TiO_2$.

The wavelength shifting material may optionally comprise further constituents, such as a backing layer.

Backing layers serve to impart mechanical stability to the wavelength shifting material. The type of material for the backing layers is not crucial, provided that it is transparent and has the desired mechanical strength. Suitable materials for backing layers are, for example, glass or transparent rigid organic polymers, such as polycarbonate, polystyrene or polymethacrylates or polymethyl methacrylates.

Backing layers generally have a thickness of 0.1 mm to 10 mm, preferably 0.2 mm to 5 mm, more preferably 0.3 mm to 2 mm.

In one embodiment of the invention, the wavelength shifting material has at least one barrier layer against oxygen and/or water, as disclosed in WO 2012/152812. Examples of suitable barrier materials for barrier layers are, for example, glass, quartz, metal oxides, $SiO_2$, a multilayer system composed of alternating layers of $M_2O_3$ and $SiO_2$ layers, titanium nitride, $SiO_2$/metal oxide multilayer materials, polyvinyl alcohol, polyacrylonitrile, polyvinylidene chloride (PVDC), liquid crystal polymers (LCP), polystyrene-acrylonitrile (SAN), polybutylene terephthalate (PBT), polybutylene naphthalate (PBN), polyethylene terephthalate (PET), polyethylene naphthalate (PEN), polyvinyl butyrate (PBT), polyvinyl chloride (PVC), polyamides, polyoxymethylenes, polyimides, polyetherimides, epoxy resins, polymers which derive from ethylene-vinyl acetate (EVA) and polymers which derive from ethylene-vinyl alcohol (EVOH).

A preferred material for barrier layers is glass or a multilayer system composed of alternating layers of $AlO_3$ and $SiO_2$ layers.

Preferably, suitable barrier layers have low permeability for oxygen. More preferably, suitable barrier layers have low permeability for oxygen and water.

The preparation of the wavelength shifting material is generally known by a person skilled in the art. In particular, the wavelength shifting material is formed by extrusion, fibre drawing, printing, coating or molding.

Organic Fluorescent Colorants B1 to B18

The luminescent collector comprises at least one colorant B selected from the group consisting of B1, B2, B3, B4, B5, B7, B8, B11, B12, B13, B14, B15, B16, B17, B18 and mixtures thereof.

Preferably, the luminescent collector comprises one or two organic fluorescent colorants B selected from the group consisting of B1, B2, B3, B4, B5, B7, B8, B11, B12, B13, B14, B15, B16, B17 and B18, more preferably one colorant B selected from the group consisting of B1, B2, B3, B4, B5, B7, B8, B11, B12, B13, B14, B15, B16, B17 and B18.

Organic Fluorescent Colorant (B1)

Naphthoylbenzimidazole compounds of formula (I) are known from EP 17151931.7. Compounds of formula (I) are usually yellow fluorescent compounds.

With regard to the use in an optical receiver, compounds of formula (I) are preferred which correspond to a compound of formula (I-A)

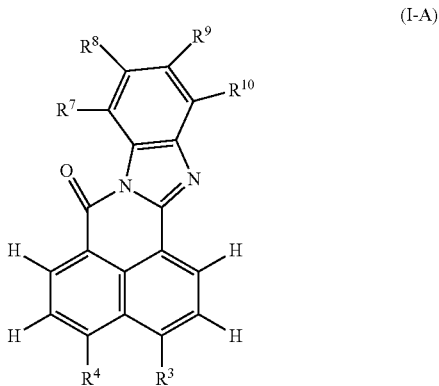

(I-A)

wherein
$R^3$ and $R^4$ are each independently hydrogen, phenyl, phenyl which carries 1 or 2 cyano groups or phenyl which carries 1, 2 or 3 substituents selected from $C_1$-$C_{10}$-alkyl; and
$R^7$, $R^8$, $R^9$ and $R^{10}$ are each independently hydrogen, phenyl, phenyl which carries 1 or 2 cyano groups or phenyl which carries 1, 2 or 3 substituents selected from $C_1$-$C_{10}$-alkyl.

Among the compounds of formula (I-A), preference is given to compounds, in which $R^8$ and $R^{10}$ have the same meaning. Likewise, preference is given to compounds, in which $R^7$ and $R^9$ have the same meaning. In particular, $R^8$ and $R^{10}$ have the same meaning and $R^7$ and $R^9$ have the same meaning. In particular, $R^7$ and $R^9$ have the same meaning and are hydrogen.

A particular preferred embodiment of the invention relates to compounds of formula (I-A),
wherein
$R^3$ and $R^4$ are each independently selected from hydrogen, phenyl, phenyl which carries 1 or 2 cyano groups and phenyl which carries 1, 2 or 3 $C_1$-$C_{10}$-alkyl substituents; in particular hydrogen, phenyl or phenyl which carries 1 cyano group;
$R^7$ is hydrogen;
$R^8$ is phenyl, phenyl which carries 1 or 2 cyano groups or phenyl which carries 1, 2 or 3 $C_1$-$C_{10}$-alkyl substituents;
$R^9$ is hydrogen; and
$R^{10}$ is phenyl, phenyl which carries 1 or 2 cyano groups or phenyl which carries 1, 2 or 3 $C_1$-$C_{10}$-alkyl substituents.

In particular $R^8$ is 4-cyanophenyl. In particular $R^{10}$ is 4-cyanophenyl.

A more particular preferred embodiment of the invention relates to compounds of formula (I-A),
wherein
$R^3$ is phenyl, phenyl which carries 1 cyano group; or phenyl which carries 1 substituent selected from $C_1$-$C_{10}$-alkyl;

R⁴ is hydrogen;

R⁸ and R¹⁰ are each phenyl which carries 1 cyano group;

R⁷ and R⁹ are each hydrogen.

In particular R³ is phenyl which carries 1 cyano group;

A further especially preferred embodiment of the invention relates to compounds of formula (IA), wherein R³ hydrogen;

R⁴ is phenyl, phenyl which carries 1 cyano group or phenyl which carries 1 substituent selected from $C_1$-$C_{10}$-alkyl; in particular phenyl which carries 1 cyano group;

R⁸ and R¹⁰ are each phenyl which carries 1 cyano group;

R⁷ and R⁹ are each hydrogen.

Examples of preferred compounds of formula (I-A) are the compounds of formulae (I-A.1), (I-A.2) (I-A.3) and (I-A.4)

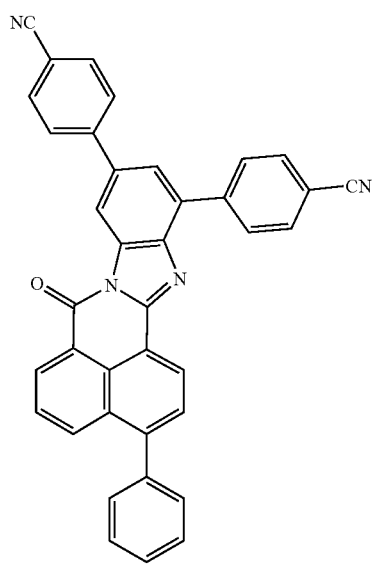

(I-A.1)

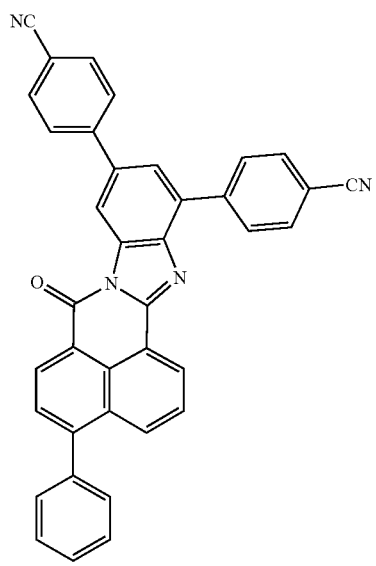

(I-A.2)

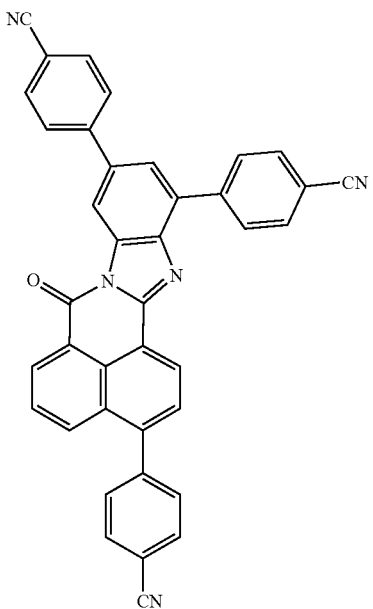

(I-A.3)

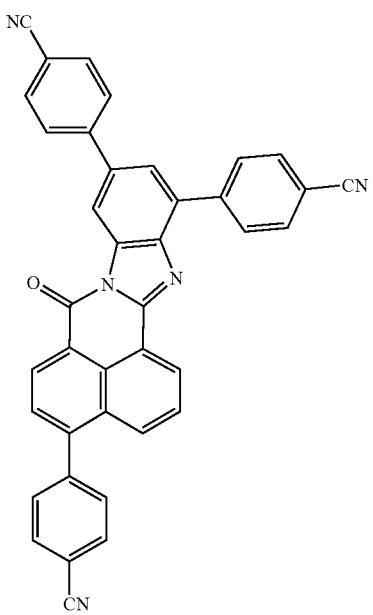

(I-A.4)

Compounds of formula I and mixtures thereof can be prepared in analogy to standard methods, for example as described in WO 2012/168395, especially on pages 64-81 or WO 2015/019270, on pages 21-30.

Organic Fluorescent Colorant (B2)

Cyanated naphthoylbenzimidazole compound of formula (II) are known from WO 2015/019270. Compounds of formula (II) are usually green, yellow-green or yellow fluorescent dyes. With regard to the use in the optical receiver of the present invention, the compound (II) is preferably selected from a compound of formula (II-A)

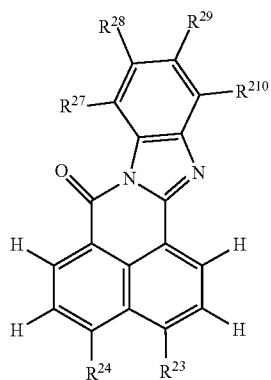

(II-A)

and mixtures thereof,
in which
$R^{23}$ and $R^{24}$ are each independently cyano, phenyl, 4-cyanophenyl or phenyl which carries 1, 2 or 3 substituents selected from $C_1$-$C_{10}$-alkyl, especially cyano, phenyl or 4-cyanophenyl; and
$R^{27}$, $R^{28}$, $R^{29}$ and $R^{210}$ are each independently hydrogen, cyano, phenyl, 4-cyanophenyl or phenyl which carries 1, 2 or 3 substituents selected from $C_1$-$C_{10}$-alkyl, especially hydrogen, cyano, phenyl or 4-cyanophenyl.

More preferred are the compounds specified in WO 2015/019270 on page 16, $2^{nd}$ paragraph to page 20, $3^{rd}$ paragraph. With regard to the use in the optical receiver of the present invention, especially preferred are compounds of formula (II) selected from compounds of formulae (II-1), (II-2), (II-3), (II-4), (II-5), (II-6), (II-7), (II-8), (II-9), (II-10), (II-11), (II-12), (II-13), (II-14), (II-15), (1116), (II-17), (II-18), (II-19), (II-20), (II-21), (II-22), (II-23), (II-24), (II-25), (II-26), (II-27), (II-28), (1129), (II-30), (II-31), (II-32), (II-33), (II-34), (II-35), (II-36), (II-37), (II-38), (II-39), (II-40), (II-41), (1142), (II-43), (II-44), (II-45), (II-46), (II-47), (II-48), (II-49), and (II-50) and mixtures thereof

(II-1)

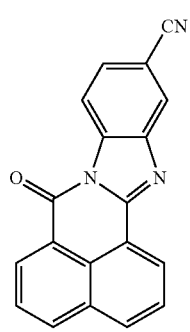

(II-2)

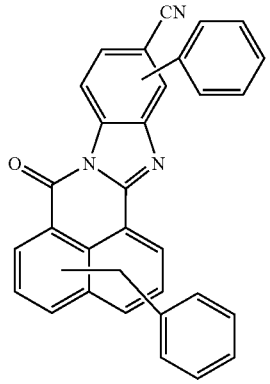

(II-3)

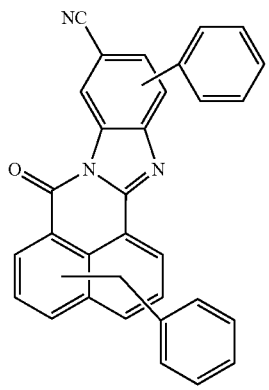

(II-4)

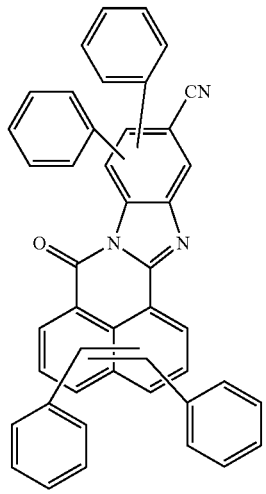

(II-5)

(II-6)
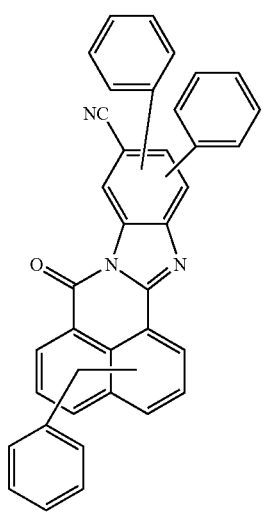
(II-7)
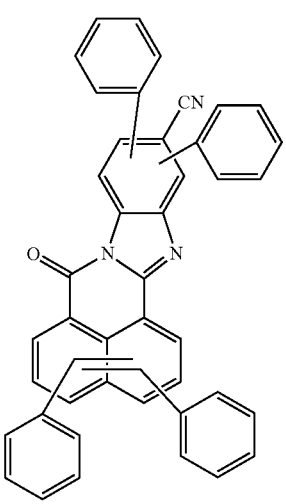
(II-8)
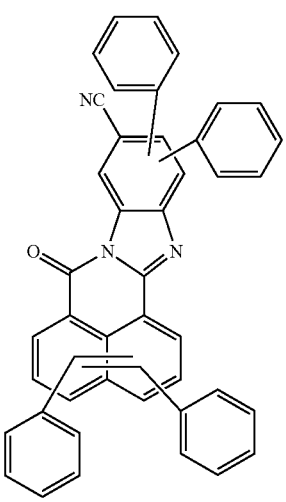
(II-9)
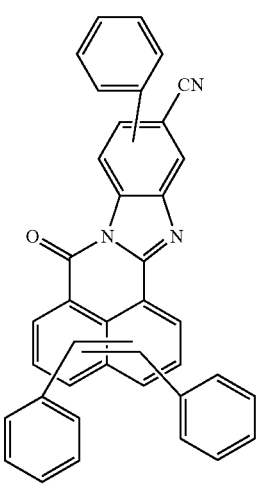
(II-10)
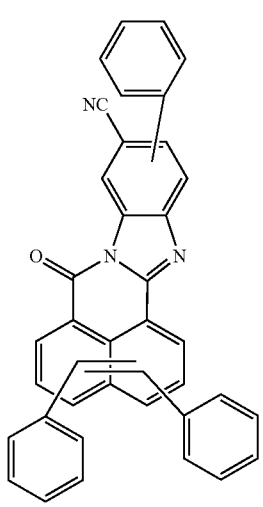
(II-11)
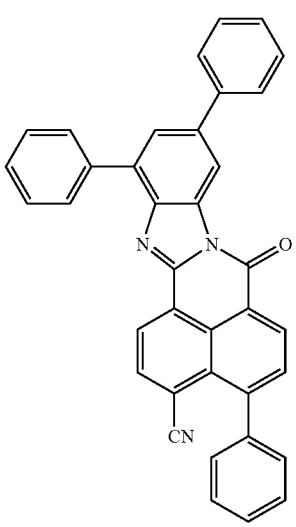

(II-12)
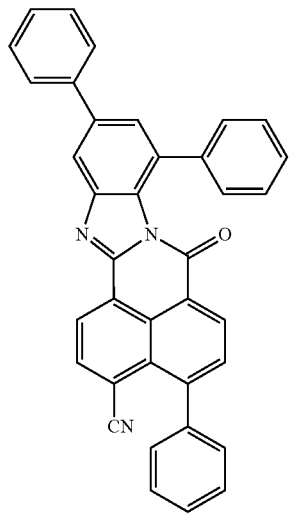
(II-13)
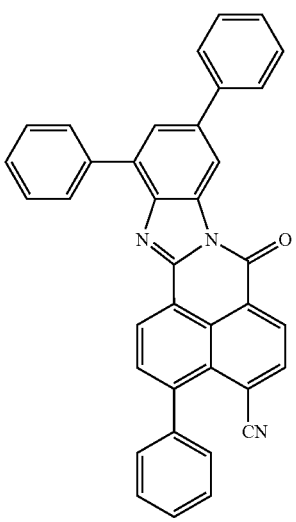
(II-14)
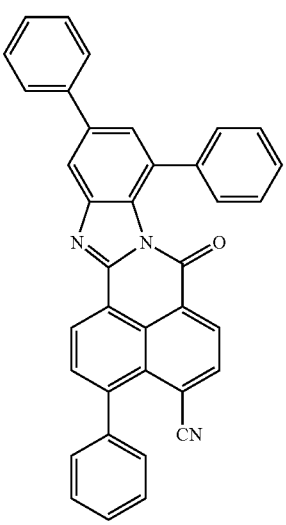
(II-15)
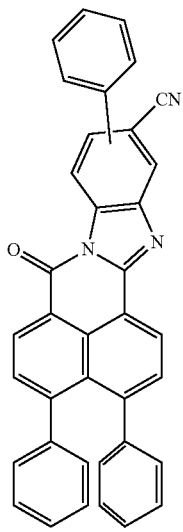
(II-16)
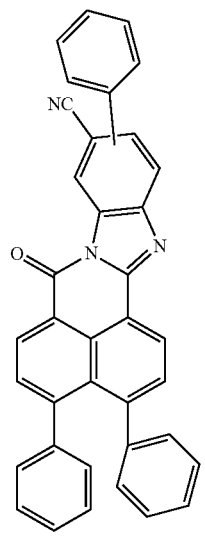
(II-17)
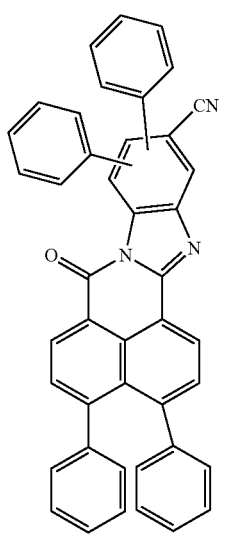

(II-18)
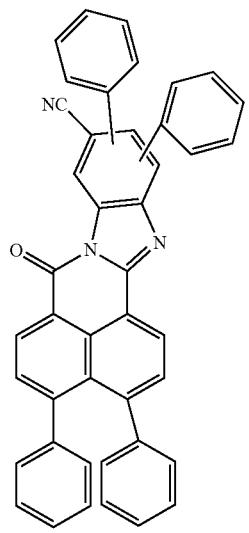
(II-19)
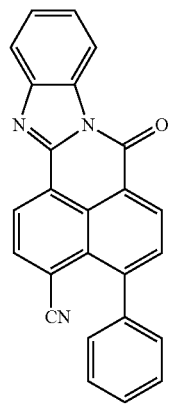
(II-20)
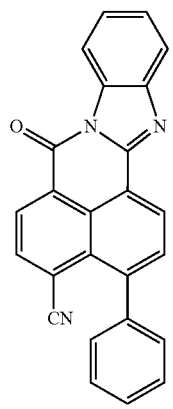
(II-21)
(II-22)
(II-23)
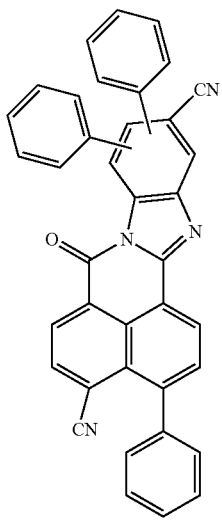

(II-24)
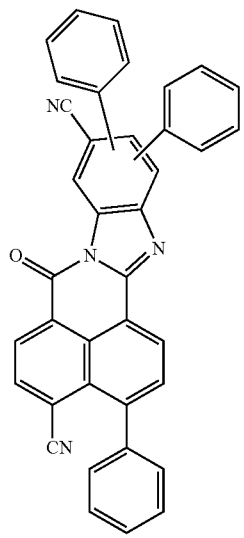
(II-25)
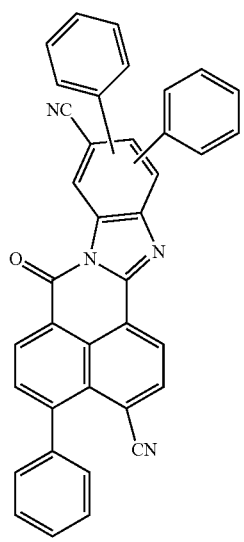
(II-27)
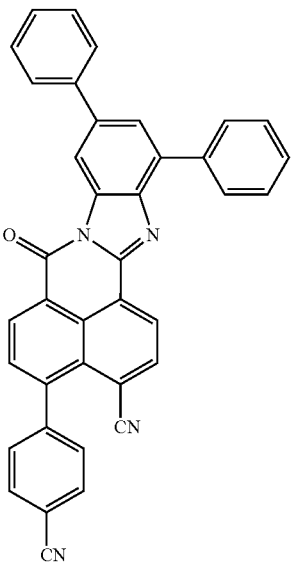
(II-26)
(II-28)
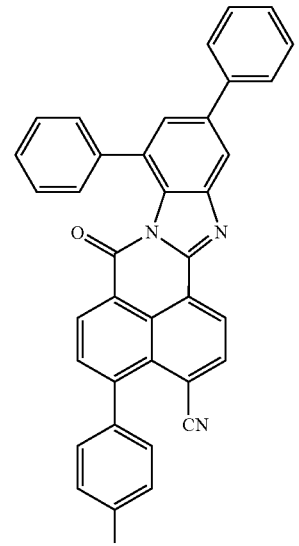

(II-29)
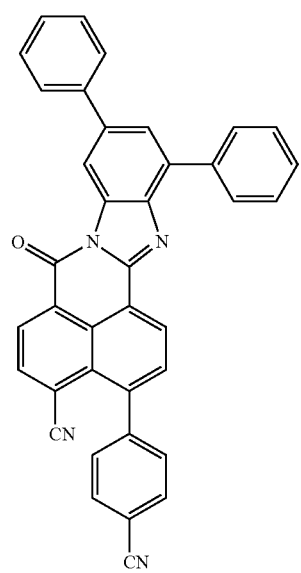
(II-30)
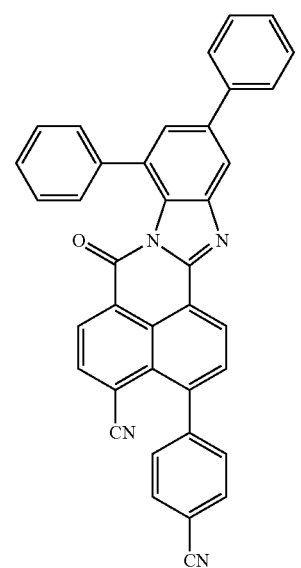
(II-31)
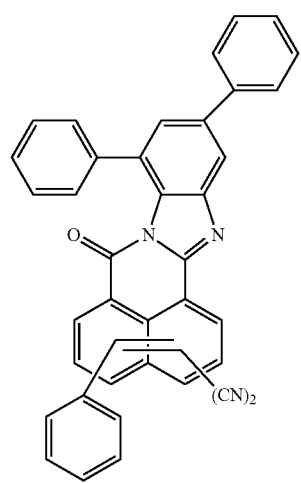
(II-32)
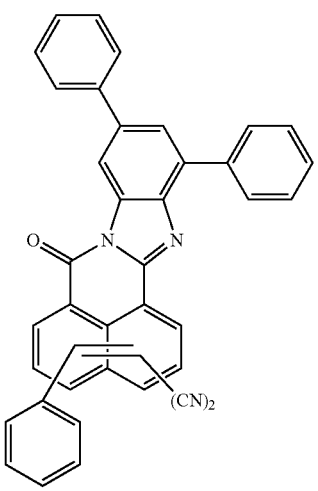
(II-33)
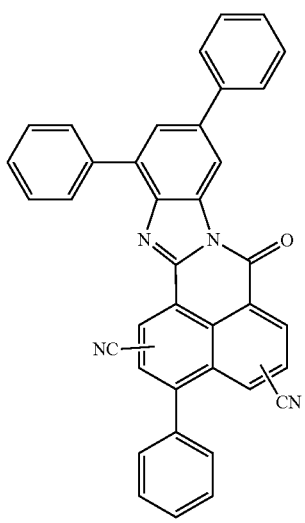
(II-34)
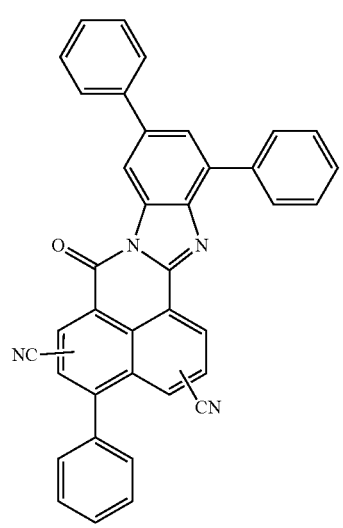

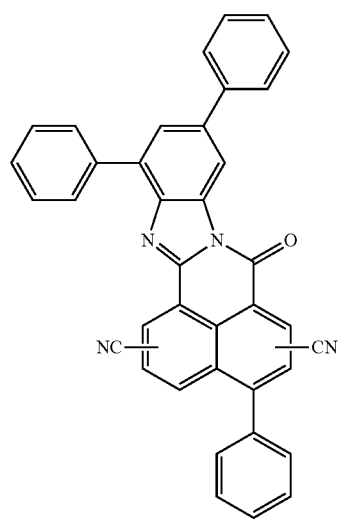
(II-35)
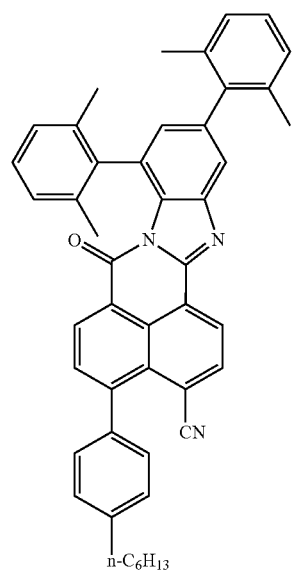
(II-38)
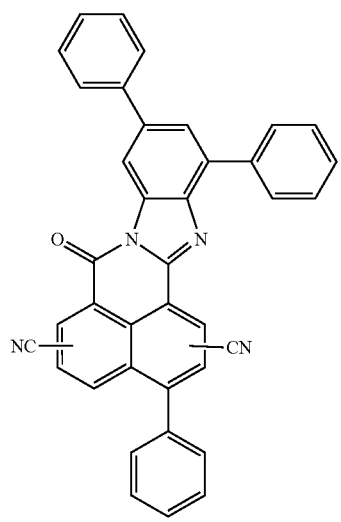
(II-36)
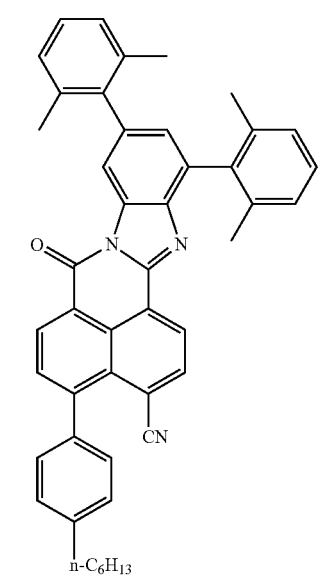
(II-37)
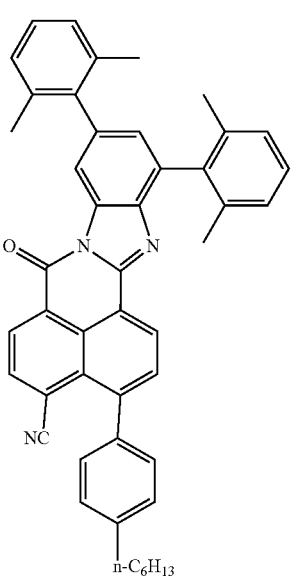
(II-39)

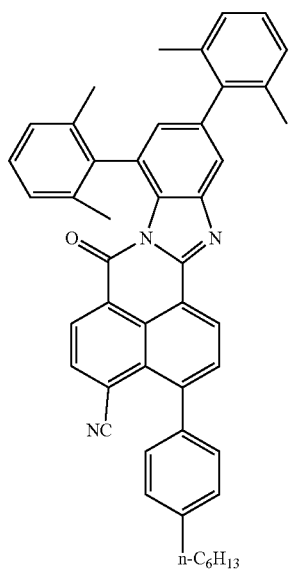
(II-40)
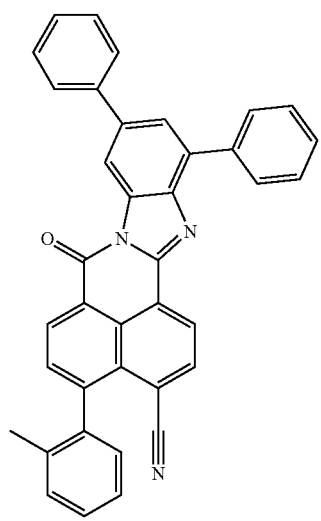
(II-41)
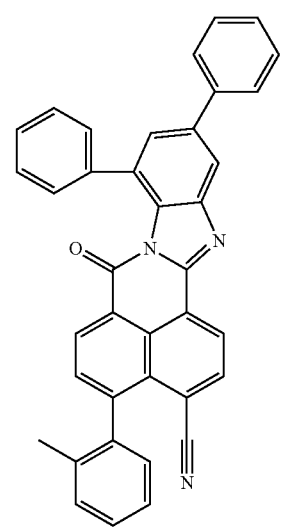
(II-42)
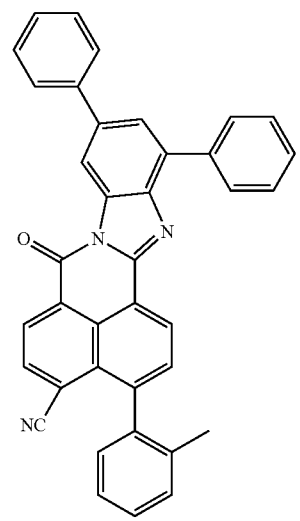
(II-43)
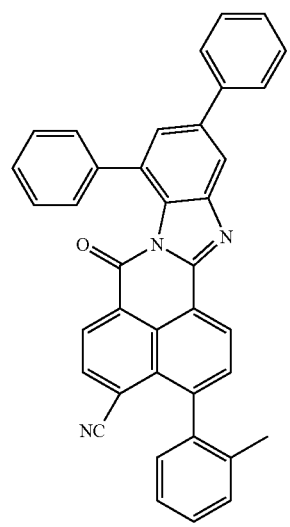
(II-44)
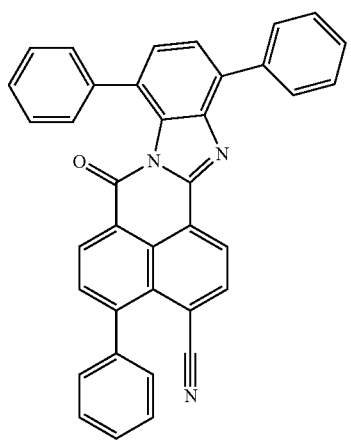
(II-45)

(II-46)
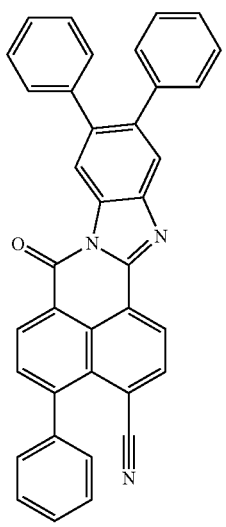

(II-47)
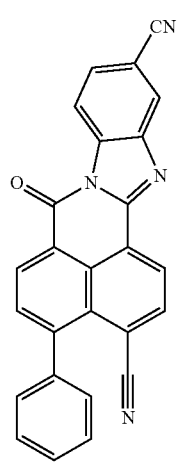

(II-48)
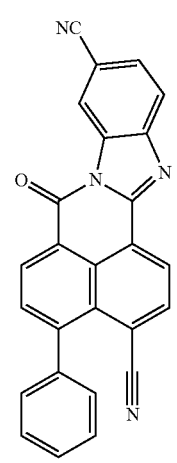

(II-49)
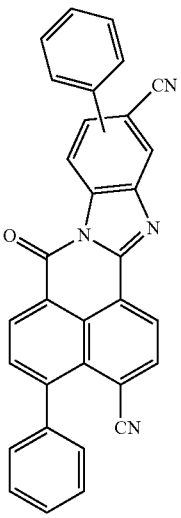

(II-50)
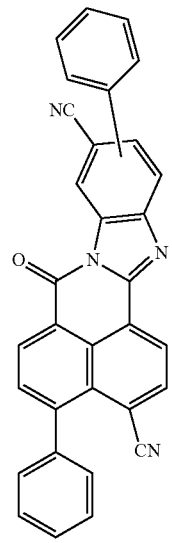

More especially preferred are compounds (II-11), (II-12), (II-13) and (II-14) and mixtures thereof.

Organic Fluorescent Colorant (B3)

Compounds of formula (III) are known from WO 2015/169935. Compounds of formula (III) are usually yellow or yellow-green fluorescent dyes. With regard to the use in the optical receiver of the present invention, the compound of formula (III) encompass the following compounds of formulae (III-a) and (III-b) as well as compounds of formulae (III-c) and (IIII-d):

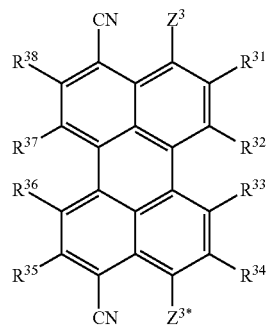

(III-a)

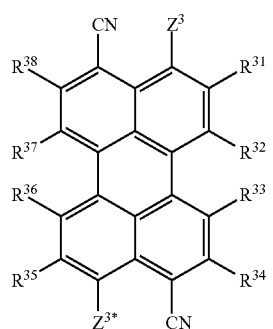

(III-b)

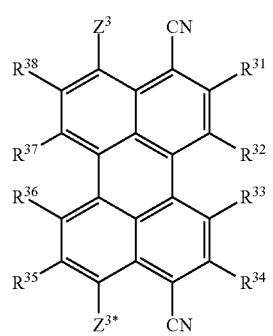

(III-c)

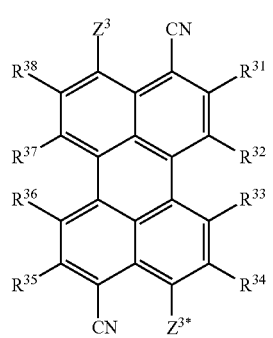

(III-d)

individually and mixtures thereof, in which $R^{31}$, $R^{32}$, $R^{33}$, $R^{34}$, $R^{35}$, $R^{36}$, $R^{37}$, $R^{38}$, $Z^3$ and $Z^{3*}$ are each as defined above.

In particular, preference is given to the compounds specified in WO 2015/169935 on page 12, line 9 to page 13, line 31. With regard to the use in the optical receiver of the present invention, preferred are compounds of formula (III) selected from compounds of formulae (III-1), (III-2), (III-3), (III-4), (III-5), (III-6), (III-7), (III-8), (III-9), (III-10), (III-11), (III-12), (III-13), (III-14), (III-15), (III-16), (III-17), (III-18), (III-19), (III-20)

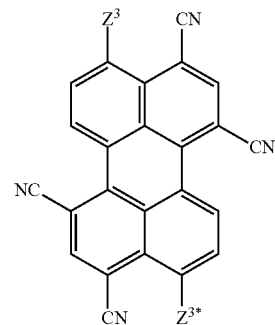

(III-1)

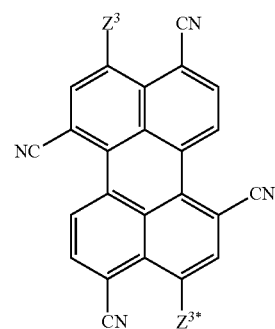

(III-2)

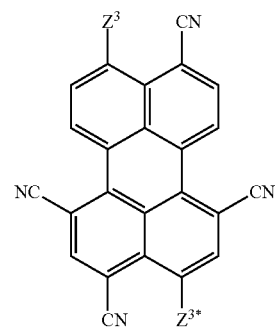

(III-3)

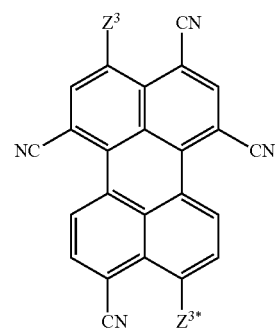

(III-4)

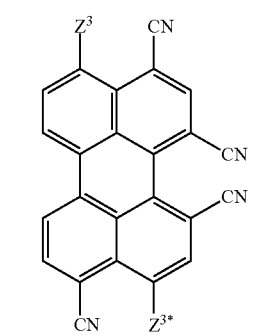

(III-5)

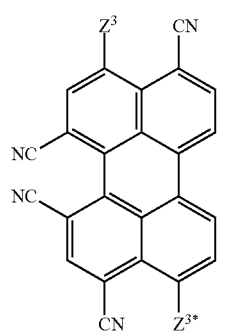
(III-6)
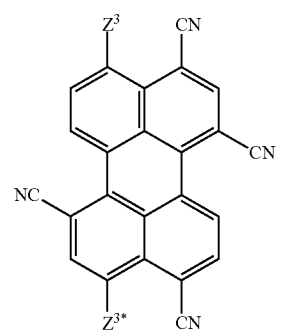
(III-7)
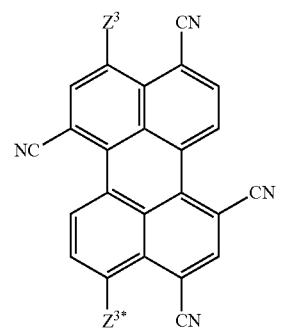
(III-8)
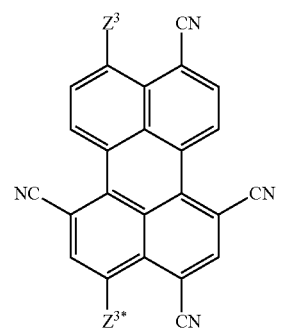
(III-9)
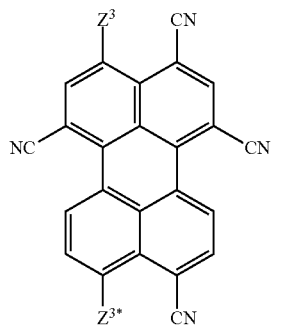
(III-10)
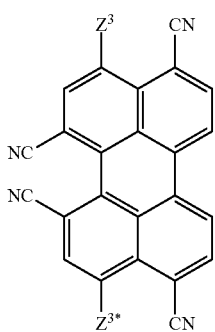
(III-11)
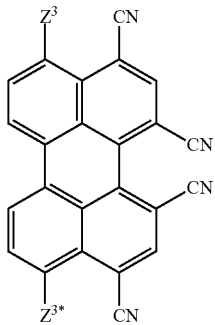
(III-12)
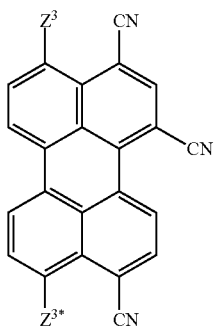
(III-13)
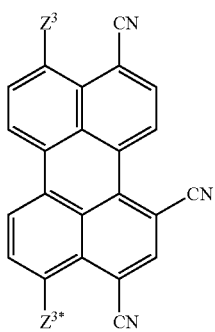
(III-14)
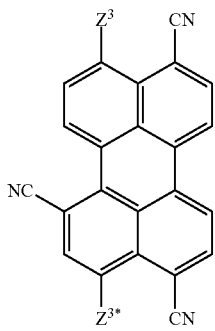
(III-15)

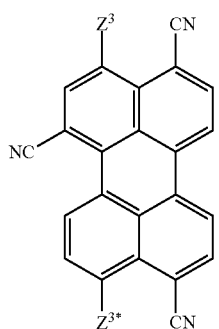
(III-16)

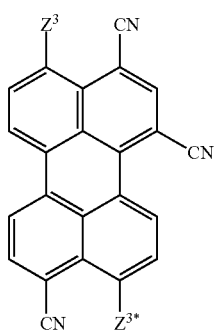
(III-17)

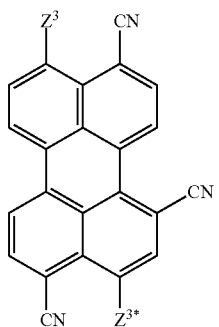
(III-18)

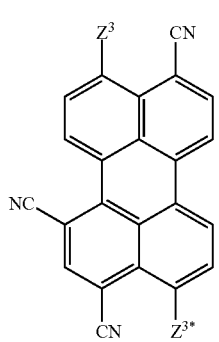
(III-19)

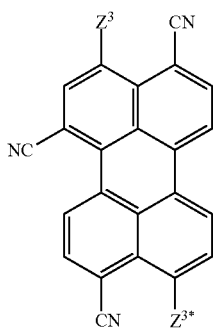
(III-20)

mixtures thereof,
in which
$Z^3$ is selected from $C_1$-$C_6$-alkyl, $C_1$-$C_6$-alkoxycarbonyl, phenyl, and phenyl bearing 1, 2 or 3 $C_1$-$C_4$-alkyl groups; and
$Z^{3*}$ is selected from $C_1$-$C_6$-alkyl, $C_1$-$C_6$-alkoxycarbonyl, phenyl, and phenyl bearing 1, 2 or 3 $C_1$-$C_4$-alkyl groups.
In a special embodiment $Z^{3*}$ has the same meaning as $Z^3$.
Among these, specific preference is given to perylene compounds of formulae (10.a), (10.b)

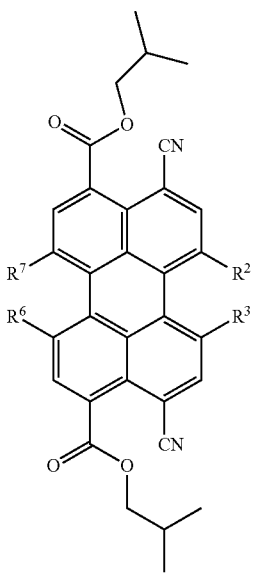
(10.a)

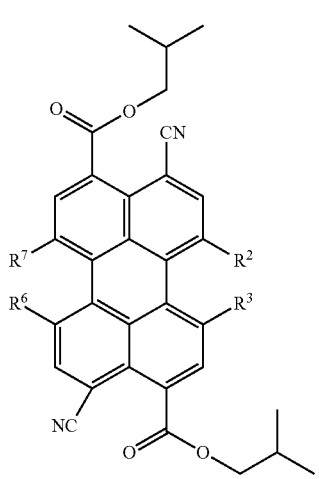
(10.b)

and mixtures thereof in which
three of the $R^2$, $R^3$, $R^6$ and $R^7$ substituents are hydrogen; and
one of the $R^2$, $R^3$, $R^6$ and $R^7$ substituents is cyano.

Organic Fluorescent Colorant (B4)

Cyanated compounds of formula (IV) are subject-matter of WO 2016/151068. Compounds of formula (IV) are usually yellow or yellow-green fluorescent dyes. With regard to the use in the optical receiver of the present invention, the compound of formula (IV) is preferably a compound, wherein $X^{40}$ is O. Also preferred are compounds of formula (IV), wherein $X^{40}$ is S. Preferrence is given to the compounds specified in WO 2016/151068 on page 24, line 10 to page 34, line 4.

Among these, compounds of formula (IV) are especially preferred, wherein A is a radical of formula (A.2). Compounds of formula (IV), where A is a radical of formula (A.2) are also referred to as compounds of formula (IV-A.2),

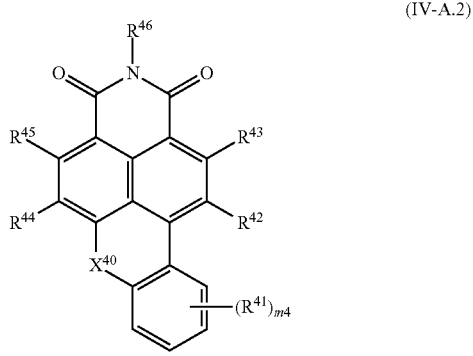

(IV-A.2)

wherein
m4, $X^{40}$, $R^{41}$, $R^{42}$, $R^{43}$, $R^{44}$, $R^{45}$ and $R^{46}$ are as defined above.

In the compounds of formula (I-A.2), $R^{46}$ is preferably selected from hydrogen, linear $C_1$-$C_{24}$-alkyl, branched $C_3$-$C_{24}$-alkyl, $C_6$-$C_{10}$-aryl and $C_6$-$C_{10}$-aryl-$C_1$-$C_{10}$-alkylene, where the aryl ring in the two last mentioned moieties is unsubstituted or substituted with 1, 2, 3, 4 or 5 identical or different radicals $R^{46a}$. Especially, $R^{46}$ is selected from linear $C_1$-$C_{24}$-alkyl, a radical of formula (B.1) and a radical of formula (B.2)

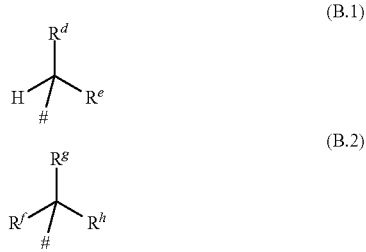

in which
is the bonding site to the nitrogen atom;
$R^d$ and $R^e$, in the formula (B.1), independently from each other are selected from $C_1$-$C_{23}$-alkyl, where the sum of the carbon atoms of the $R^d$ and $R^e$ radicals is an integer from 2 to 23;

$R^f$, $R^g$ and $R^h$, in the formula (B.2) are independently selected from $C_1$- to $C_{20}$-alkyl, where the sum of the carbon atoms of the $R^f$, $R^g$ and $R^h$ radicals is an integer from 3 to 23.

Preferred radicals of formula (B.1) are: 1-methylethyl, 1-methylpropyl, 1-methylbutyl, 1-methylpentyl, 1-methylhexyl, 1-methylheptyl, 1-methyloctyl, 1-ethylpropyl, 1-ethylbutyl, 1-ethylpentyl, 1-ethylhexyl, 1-ethylheptyl, 1-ethyloctyl, 1-propylbutyl, 1-propylpentyl, 1-propylhexyl, 1-propylheptyl, 1-propyloctyl, 1-butylpentyl, 1-butylhexyl, 1-butylheptyl, 1-butyloctyl, 1-pentylhexyl, 1-pentylheptyl, 1-pentyloctyl, 1-hexylheptyl, 1-hexyloctyl, 1-heptyloctyl.

A particularly preferred radical of formula (B.2) is tert.-butyl.

Likewise especially, $R^{46}$ is a radical of formula (C.1), a radical of formula (C.2) or a radical of formula (C.3)

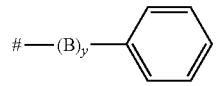

(C.1)

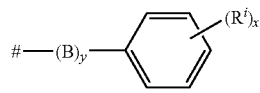

(C.2)

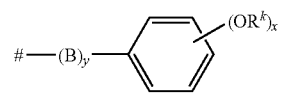

(C.3)

where
represents the bonding side to the nitrogen atom,
B where present, is a $C_1$-$C_{10}$-alkylene group which may be interrupted by one or more non-adjacent groups selected from —O— and —S—,
y is 0 or 1,
$R^i$ is independently of one another selected from $C_1$-$C_{24}$-alkyl, $C_1$-$C_{24}$-fluoroalkyl, fluorine, chlorine or bromine,
$R^k$ is independently of one another selected from $C_1$-$C_{24}$-alkyl,
x in formulae C.2 and C.3 is 1, 2, 3, 4 or 5.

Preferably, y is 0, i.e. the variable B is absent.

Irrespectively of its occurrence, $R^i$ is preferably selected from $C_1$-$C_{24}$-alkyl, more preferably linear $C_1$-$C_{10}$-alkyl or branched $C_3$-$C_{10}$-alkyl, especially isopropyl. Irrespectively of its occurrence, $R^k$ is preferably selected from $C_1$-$C_{30}$-alkyl, more preferably linear $C_1$-$C_{10}$-alkyl or branched $C_3$-$C_{10}$-alkyl. The variable x in formulae C.2 and C.3 is preferably 1, 2 or 3.

A special group of embodiments relates to compounds of formula (IV-A.2), wherein the variables m4, $X^{40}$, $R^{41}$, $R^{42}$, $R^{43}$, $R^{44}$, and $R^{45}$ independently of each other or in particular in combination, have the following meanings:
$X^{40}$ is O or S;
$R^{42}$ and $R^{44}$ are each cyano;
$R^{43}$ and $R^{45}$ are each hydrogen or one of $R^{43}$ and $R^{45}$ is bromine and the other of $R^{43}$ and $R^{45}$ is hydrogen;
$R^{41}$ is selected from cyano, bromine, and phenyl which is unsubstituted or carries 1 or 2 radicals selected from $C_1$-$C_4$-alkyl;
$R^{46}$ is selected from hydrogen, $C_1$-$C_{24}$-linear alkyl, branched $C_3$-$C_{24}$-alkyl, a radical of formula (C.1), a radical of formula (C.2) and a radical of formula (C.3);
m4 is 0 or 1.

Even more preferably, $X^{40}$ is O or S;

$R^{42}$ and $R^{44}$ are each cyano;

$R^{43}$ and $R^{45}$ are each hydrogen;

$R^{41}$ is selected from cyano, bromine, and phenyl which is unsubstituted or carries 1 or 2 radicals selected from $C_1$-$C_4$-alkyl; especially cyano;

$R^{46}$ is selected from linear $C_1$-$C_{24}$-alkyl, branched $C_3$-$C_{24}$-alkyl, a radical of formula (C.1), a radical of formula (C.2) and a radical of formula (C.3); especially linear $C_1$-$C_{24}$-alkyl, branched $C_3$-$C_{24}$-alkyl, or phenyl which carries 1 or 2 radicals selected from $C_1$-$C_4$-alkyl such as 2,6-diisopropylphenyl;

m4 is 0 or 1.

Examples for preferred compounds of formula (IV-A.2) are shown below:

(IV-A.2-1)

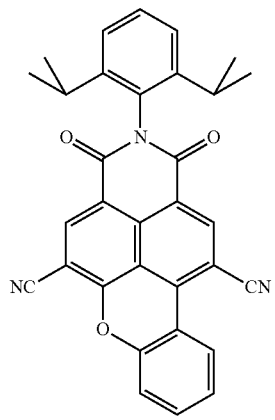

(IV-A.2-2)

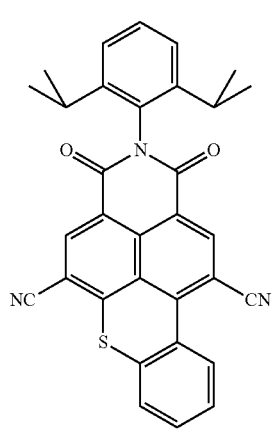

(IV-A.2-3)

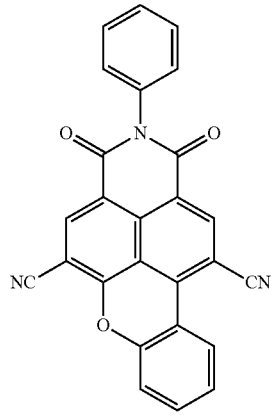

(IV-A.2-4)

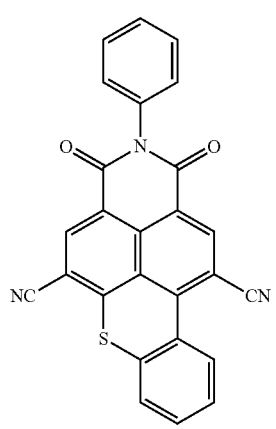

(IV-A.2-5)

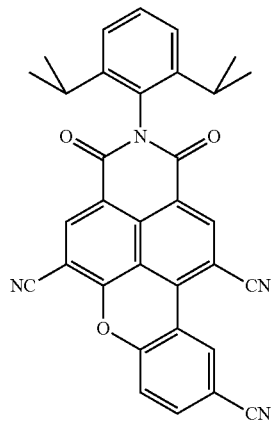

(IV-A.2-6)
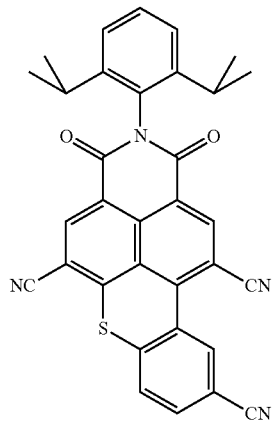
(IV-A.2-7)
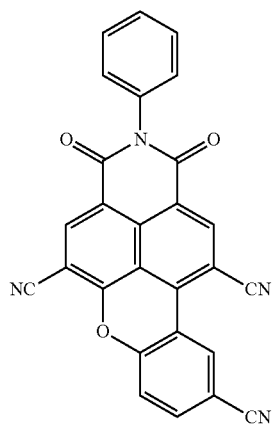
(IV-A.2-8)
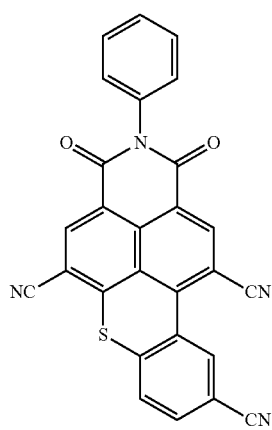
(IV-A.2-9)
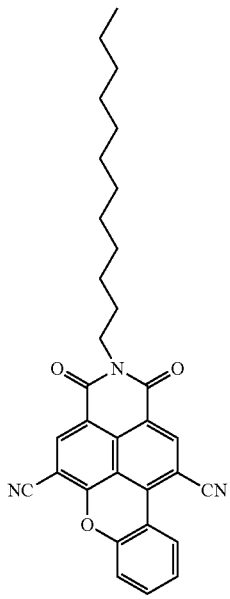
(IV-A.2-10)

(IV-A.2-11)
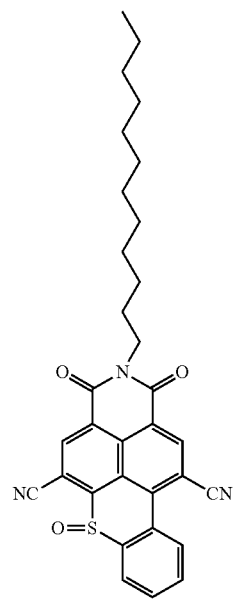
(IV-A.2-13)
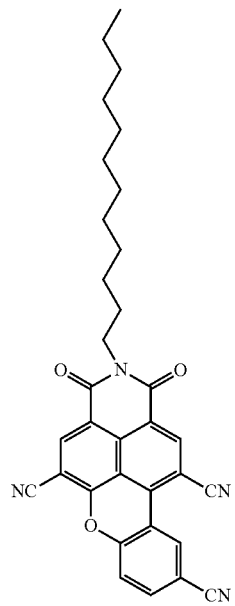
(IV-A.2-12)
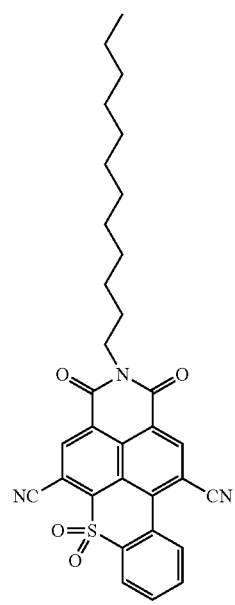
(IV-A.2-14)
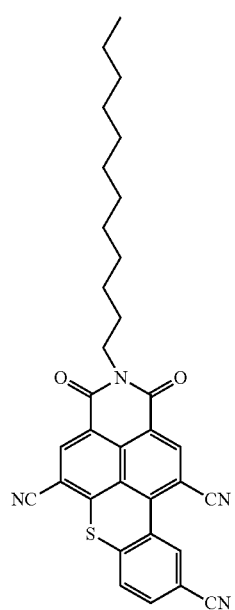

-continued

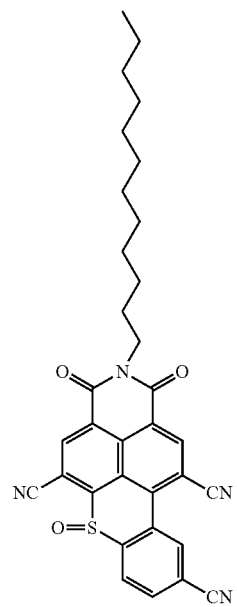
(IV-A.2-15)

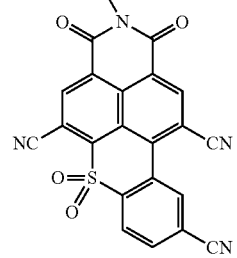
(IV-A.2-16)

In particular, organic fluorescent colorant (B34) is selected from compounds IV-A.2-1, IV-A.2-6 and IV-A.2-9.

Organic Fluorescent Colorant (B5)

Benzoxanthene compounds of formula (V) are known from WO 2014/131628. Suitable compounds are depicted in in FIG. 2A, FIG. 2B and FIG. 2C of WO 2014/131628. They are usually yellow or yellow-green fluorescent dyes. Benzothioxanthene compounds of formula (V) are known for example from U.S. Pat. No. 3,357,985. Preferred are benzothioxanthene compounds of formula (V), wherein $X^5$ is O or S, $R^{51}$ is $C_1$-$C_{24}$-alkyl and $R^{52}$-$R^{59}$ are hydrogen. Preferably, $R^{51}$ is $C_6$-$C_{20}$-alkyl.

Organic Fluorescent Colorant (B6)

Benzimidazoxanthenisoquinoline compounds of formula (VIA) and (VIB) are known from WO 2015/062916. Suitable compounds are depicted at page 3, line 24 to page 8, line 24, especially FIG. 3A, FIG. 3B, FIG. 3C of WO 2015/062916.

Organic Fluorescent Colorant (B7)

Compounds having a structural unit of formula (VII) are known from WO 2012/168395. In general, they are yellow fluorescent dyes. With regard to the use in the optical receiver of the present invention, the compound having a structural unit of formula (VII) is preferably a compound as specified in WO 2012/168395, at page 28, line14 to page 32, line 5. With regard to the use in the optical receiver of the present invention, the compound having a structural unit of formula (VII) is more preferably selected from compounds of formulae (VII-1), (VII-2), (VII-3), (VII-4), (VII-5), (VII-6), (VII-7), (VI-8), (VII-9), (VII-10), (VII-11), (VII-12), (VII-13), (VII-14), (VII-15), (VII-16), (VII-17), (VII-18), (VII-19), (VII-20), (VII-21), (VII-22), (VII-23), (VII-24), (VII-25), (VII-26), (VII-27), (VII-28), (VII-29), (VII-30), (VII-31), (VII-32), (VII-33), (VII-34), (VII-35), (VII-36), (VII-37), (VII-38), (VII-39), (VII-40), (VII-41), (VII-42), (VII-43), (VII-44), (VII-45), (VII-46), (VII-47), (VII-48), (VII-49), (VII-50), (VII-51), (VII-52), (VII-53), (VII-54), (VII-55), and mixtures thereof

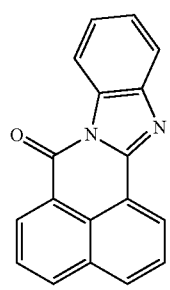
(VII-1)

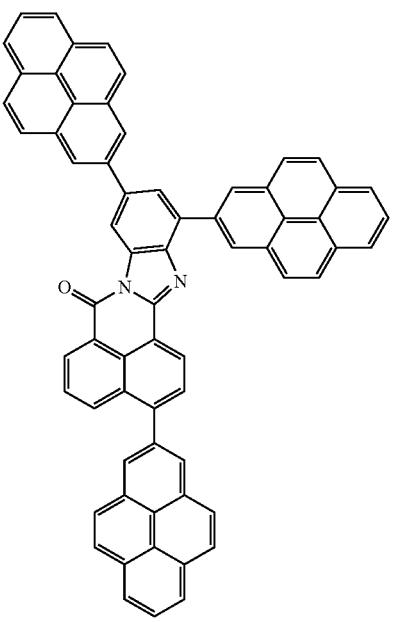
(VII-2)

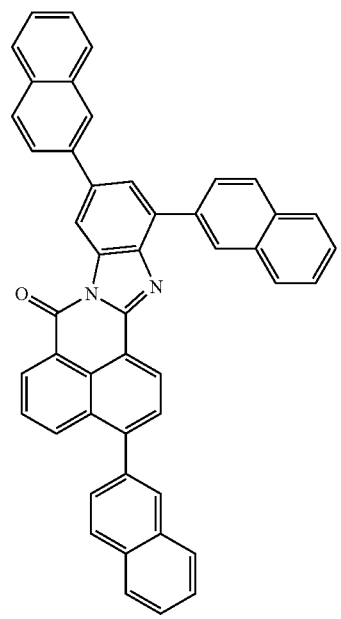
(VII-3)
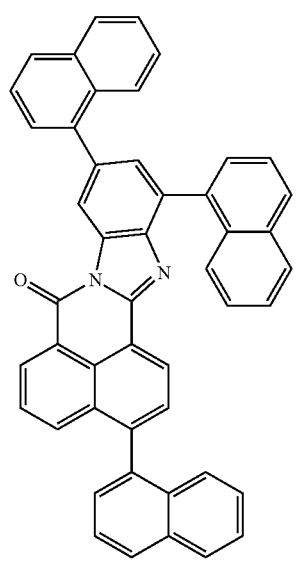
(VII-4)
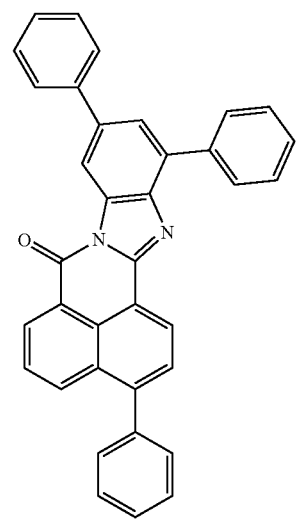
(VII-5)
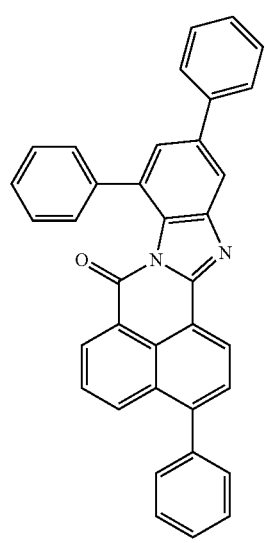
(VII-6)
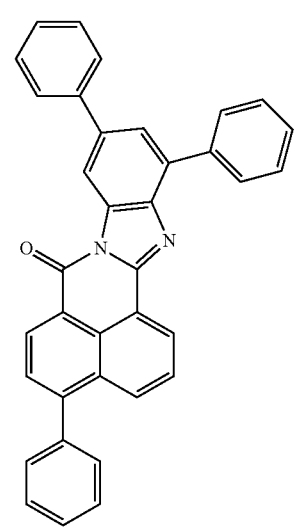
(VII-7)

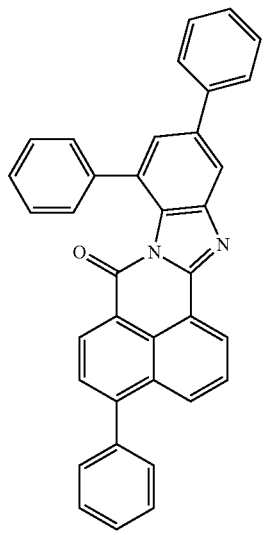
(VII-8)
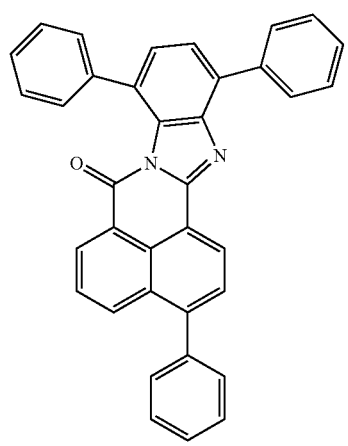
(VII-9)
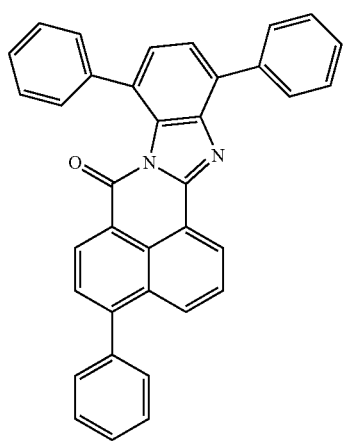
(VII-10)
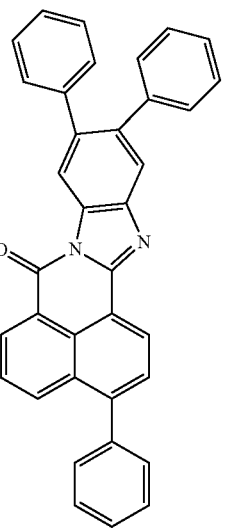
(VII-11)
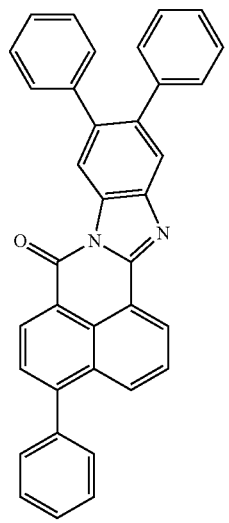
(VII-12)
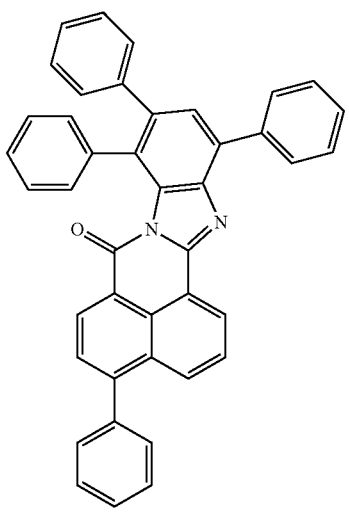
(VII-13)

-continued
(VII-14)
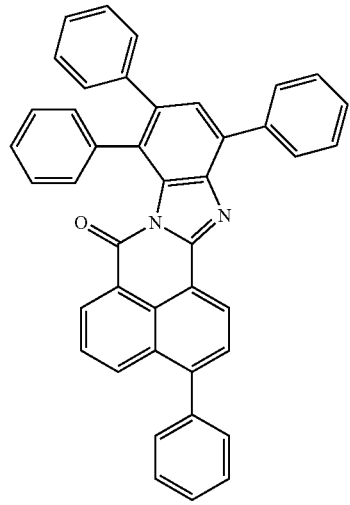
(VII-15)
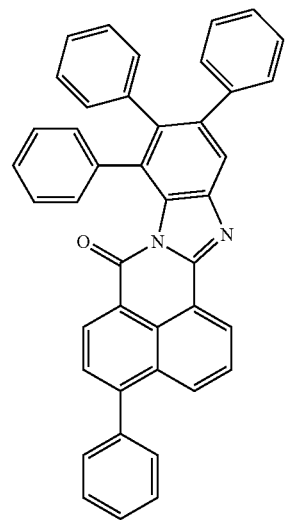
(VII-16)
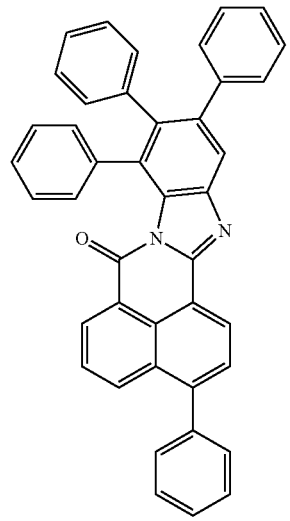
-continued
(VII-17)
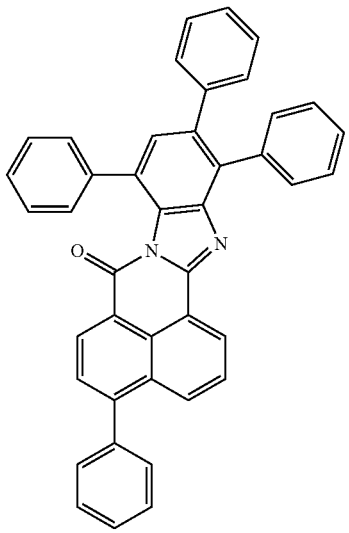
(VII-18)
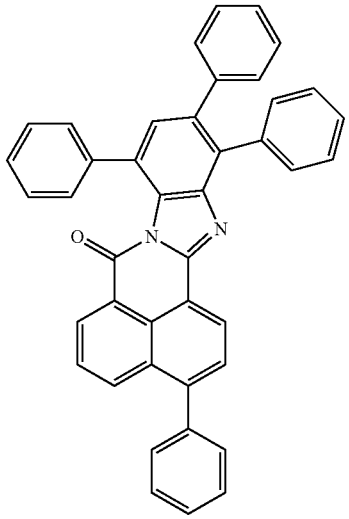
(VII-19)
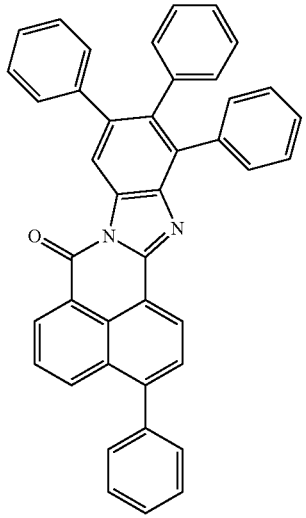

(VII-20)
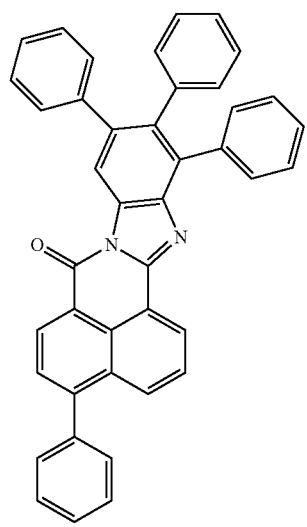
(VII-21)
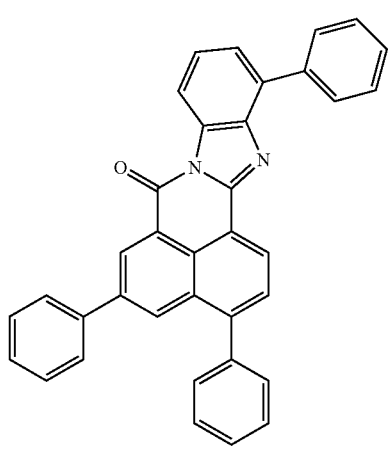
(VII-22)
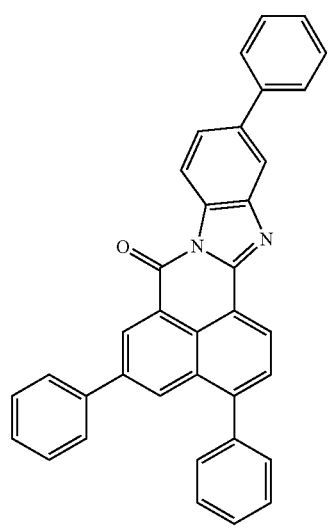
(VII-23)
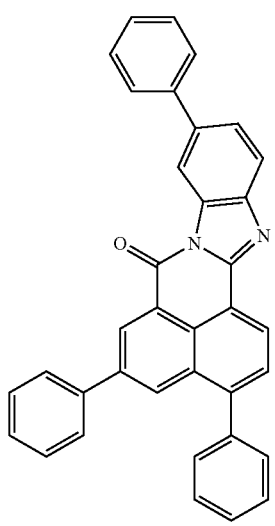
(VII-24)
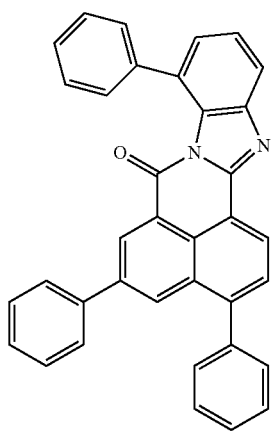
(VII-25)
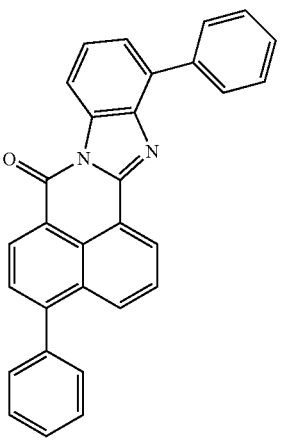

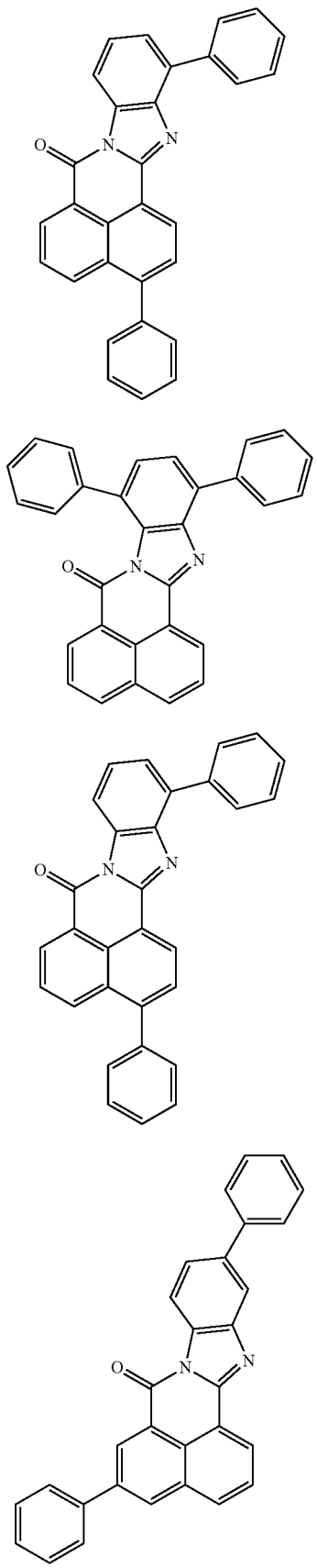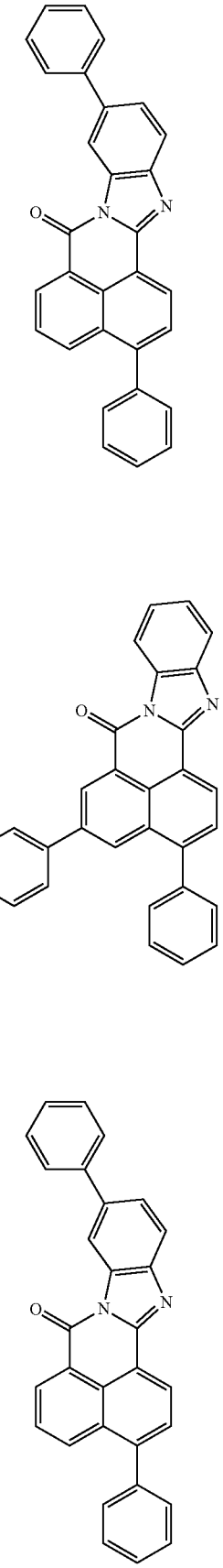

(VII-33)
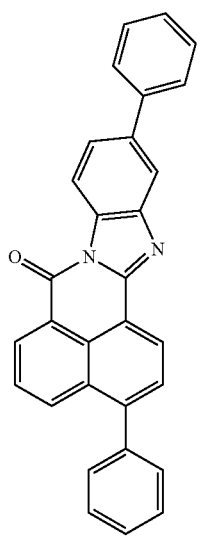
(VII-34)
(VII-35)
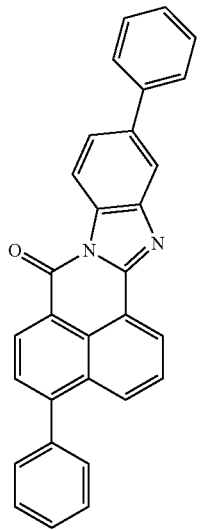
(VII-36)
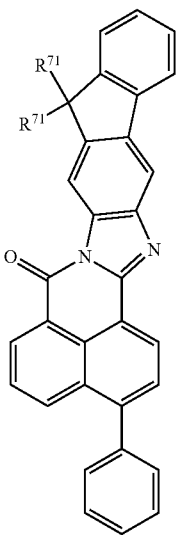
(VII-37)
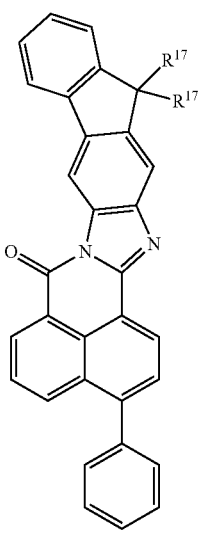
(VII-38)
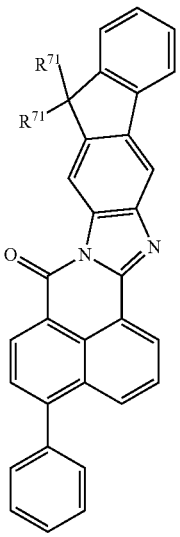

-continued
(VII-39)
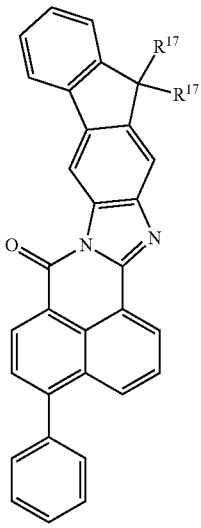
(VII-40)
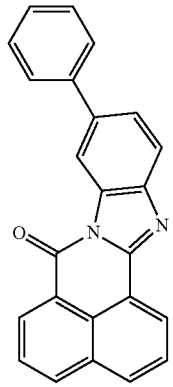
(VII-41)
(VII-42)
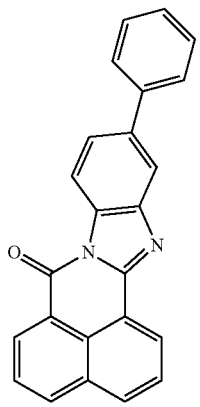
(VII-43)
(VII-44)
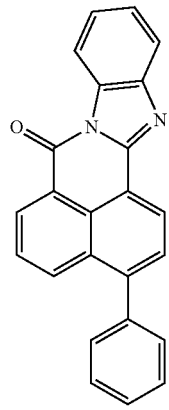
(VII-45)
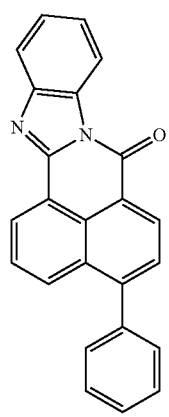

(VII-46)
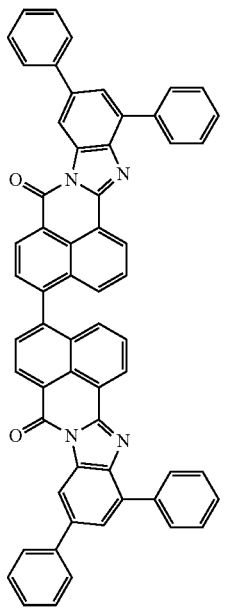
(VII-47)
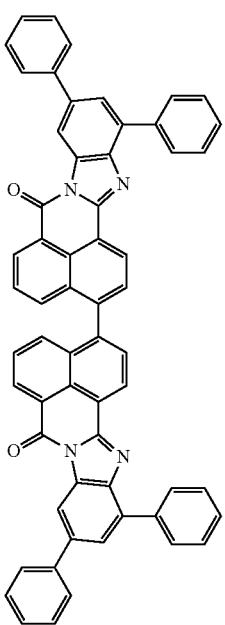
(VII-48)
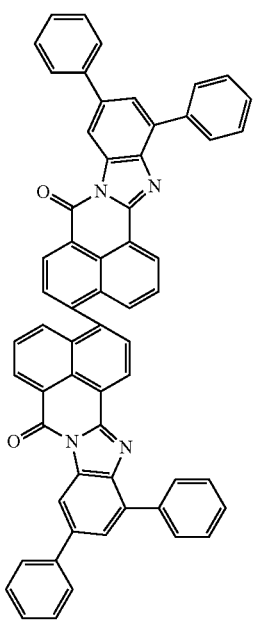
(VII-49)
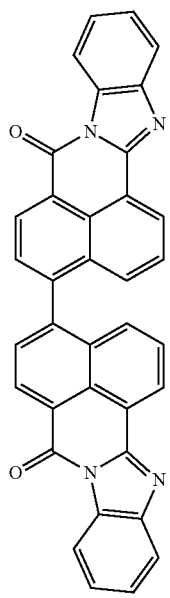

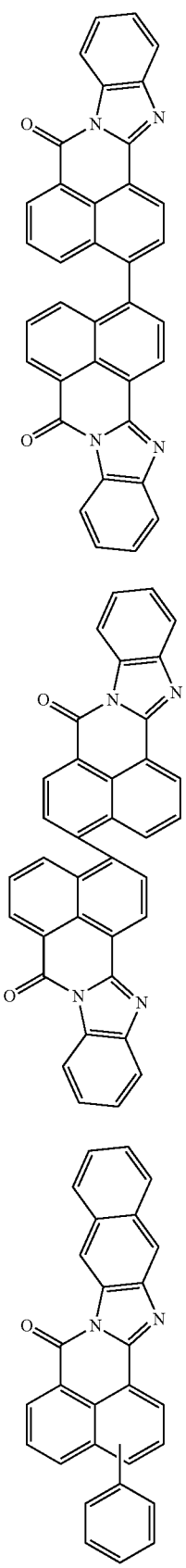
(VII-50)
(VII-51)
(VII-52)
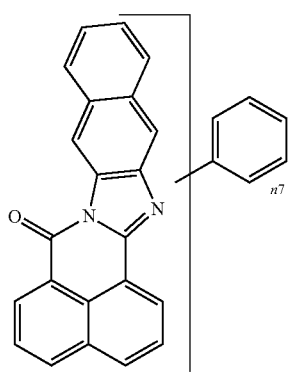
(VII-53)
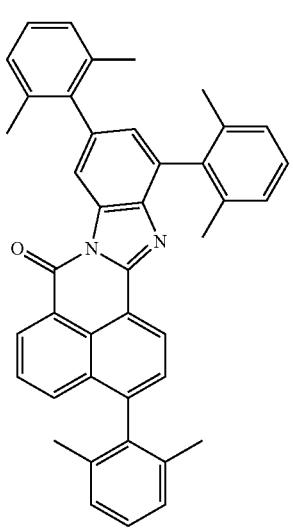
(VII-54)
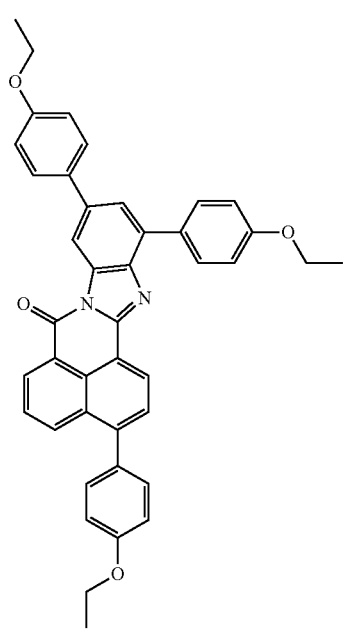
(VII-55)

(VII-56)

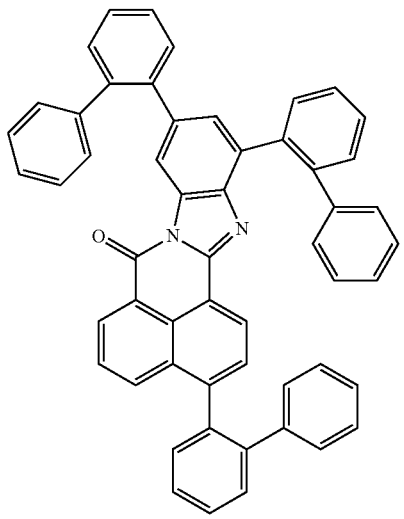

(VII-57)

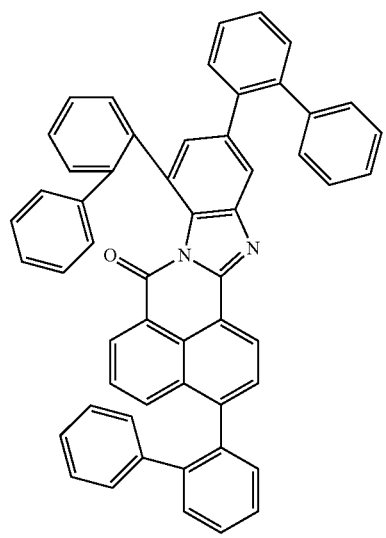

(VII-58)

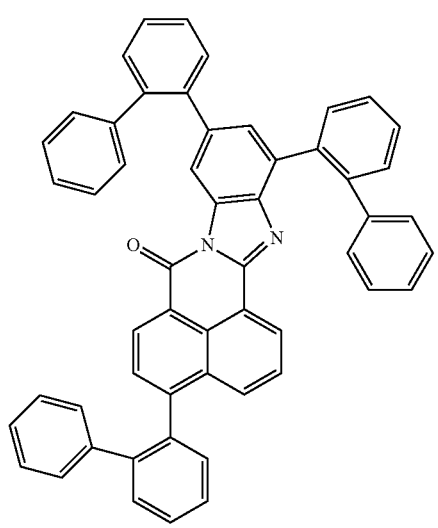

(VII-59)

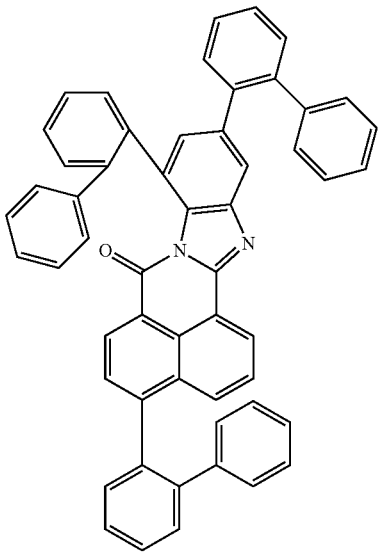

and mixtures thereof, where n7 is a number from 0, 1, 2, 3, 4, 5, 6, 7, 8, 9 or 10; $R^{71}$ is independently hydrogen, $C_1$-$C_{18}$-alkyl or cycloalkyl, the carbon chain of which may comprise one or more —O—, —S—, —CO—, —SO— and/or —SO$_2$— moieties and which may be mono- or polysubstituted; aryl or heteroaryl which may be mono- or polysubstituted.

Especially preferred are the compounds of formulae (VII-5), (VII-6), (VII-7) and (VII-8) and mixtures thereof. Especially preferred are also the compounds of formulae (VII-56), (VII-57), (VII58) and (VII-59) and mixtures thereof.

Organic Fluorescent Colorant (B8)

Perylene imide compounds of formula (VIII) and (IX) are well known in the art, e.g. from WO 2007/006717 or U.S. Pat. No. 6,472,050. 9-Cyano substituted perylene-3,4-dicarboxylic acid monoimides of formula (IX) are also known from WO 2004/029028. They are usually orange fluorescent dyes.

Preferably, in compounds of the formula (VIII), $R^{81}$ and $R^{82}$ are a linear or branched $C_1$-$C_{18}$ alkyl radical, a $C_4$-$C_8$ cycloalkyl radical which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl.

Preferably, $R^{81}$ and $R^{82}$ have the same meaning.

In one embodiment, $R^{81}$ and $R^{82}$ in formula (VIII) represent compounds with what is called swallowtail substitution, as specified in WO 2009/037283 A1 at page 16 line 19 to page 25 line 8. In a preferred embodiment, $R^{81}$ and $R^{82}$, independently of each other, are a 1-alkylalkyl, for example 1-ethylpropyl, 1-propylbutyl, 1-butylpentyl, 1-pentylhexyl or 1-hexylheptyl.

In a preferred embodiment the organic fluorescent colorant (B8) is selected from compounds (VIII-1)

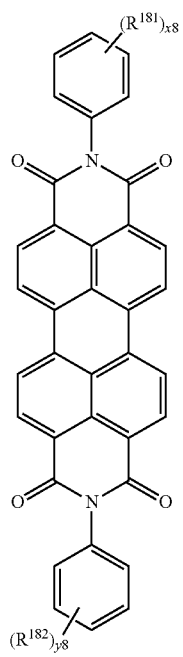

(VIII-1)

wherein
x8 is 1, 2 or 3,
y8 is 1, 2 or 3,
$R^{181}$ is $C_1$-$C_4$-alkyl, and
$R^{182}$ is $C_1$-$C_4$-alkyl.

Preferably, x8 is 2. Preferably, y8 is 2. Preferably, $R^{181}$ and $R^{182}$ are selected from isopropyl and tert-butyl.

A preferred compound of formula (VIII) is N,N'-bis(2,6-diisopropylphenyl)-3,4,9,10-perylenetetracarboxylic diimide.

Suitable 9-cyano substituted perylene-3,4-dicarboxylic acid monoimides of formula (IX) are preferably those, wherein $R^{92}$ is a linear or branched $C_1$-$C_{18}$ alkyl radical, a $C_4$-$C_8$ cycloalkyl radical which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl.

In one embodiment, $R^{92}$ in formula IX represents compounds with what is called swallowtail substitution, as specified in WO 2009/037283 A1 at page 16 line 19 to page 25 line 8. In a preferred embodiment, $R^{92}$, is a 1-alkylalkyl, for example 1-ethylpropyl, 1-propylbutyl, 1-butylpentyl, 1-pentylhexyl or 1-hexylheptyl.

In a preferred embodiment, $R^{92}$ is 2,4-di(tert-butyl)phenyl 2,6-diisopropylphenyl or 2,6-di(tertbutyl)phenyl. In particular, $R^{92}$ is 2,6-diisopropylphenyl.

Organic Fluorescent Colorant (B9)

4-Amino-substituted naphthalimide compounds of formula (X) are known in the art. Suitable 4-amino substituted naphthalimide compounds of formula (X) are preferably those, wherein $R^{101}$ is linear or branched $C_1$-$C_{10}$-alkyl, $C_2$-$C_{10}$-alkyl which is interrupted by one or more oxygen, or $C_3$-$C_8$-cycloalkyl. $R^{102}$ is preferably hydrogen. A suitable compound of formula (X) is 4-(butylamino)N-butyl-1,8-naphthalimide. Likewise preferably, $R^{102}$ is linear or branched $C_1$-$C_{10}$-alkyl. The compounds of formula (X) can be synthesized in two steps. The first step may be the condensation of 4-chloro-1,8-naphthalic anhydride with amines in a solvent such as 1,4-dioxane or 2-methoxyethanol under reflux yielding the corresponding 4-chloro-1,8-naphthalimides. The second step involves the substitution of the chlorine atom with aliphatic primary or secondary amines.

Organic Fluorescent Colorant (B10)

7-(Diethylamino)-3-(6-methylbenzo[d]oxazol-2-yl)-2H-chromen-2-one is also known as Disperse Yellow.

Organic Fluorescent Colorant (B111)

Compounds of formulae (XIA) and (XIB) are known from U.S. Pat. No. 5,470,502. They are usually yellow fluorescent dyes. Preferred are compounds of formulae (XIA) and (XIB), wherein $R^{111}$ is linear $C_1$-$C_{10}$-alkyl or branched $C_3$-$C_{10}$-alkyl. Preferred examples are diisobutyl-3,9-perylenedicarboxylate, diisobutyl-3,10-perylenedicarboxylate and mixtures thereof. Especially preferred is a mixture of diisobutyl-3,9-perylenedicarboxylate and diisobutyl-3,10-perylenedicarboxylate.

Organic Fluorescent Colorant (B12)

Compounds of formulae (XIIA) and (XIIB) are known from U.S. Pat. No. 5,470,502. They are usually yellow fluorescent dyes. Preferred are compounds of formulae (XIIA) and (XIIB), wherein $R^{121}$ is linear $C_1$-$C_{10}$-alkyl or branched $C_3$-$C_{10}$-alkyl. Preferred examples are diisobutyl 4,10-dicyanoperylene-3,9-dicarboxylate and diisobutyl 4,9-dicyanoperylene-3,10-dicarboxylate and mixtures thereof. Especially preferred is a mixture of diisobutyl 4,10-dicyanoperylene-3,9-dicarboxylate and diisobutyl 4,9-dicyanoperylene-3,10-dicarboxylate.

Organic Fluorescent Colorant (B13)

Suitable examples of compounds of formula (XIII) are for example the perylene derivatives specified in WO 2007/006717, especially at page 1, line 5 to page 22, line 6; in U.S. Pat. No. 4,845,223, especially col. 2, line 54 to col. 6, line 54; in WO 2014, especially at page 3, line 20 to page 9, line 11; in EP3072887; and in EP16192617.5, especially at page 35, line 34 to page 37, line 29.

The compounds of formula (XIII) are usually orange or red fluorescent colorants. Preferred are compounds of formula (XIII), wherein $R^{131}$ and $R^{132}$ are each independently selected from $C_1$-$C_{10}$-alkyl, 2,6-di($C_1$-$C_{10}$-alkyl)aryl and 2,4-di($C_1$-$C_{10}$-alkyl)aryl. More preferably, $R^{131}$ and $R^{132}$ are identical. Very particularly, $R^{131}$ and $R^{132}$ are each 2,6-diisopropylphenyl or 2,4-di-tertbutylphenyl. $R^{133}$ is preferably phenoxy, which is unsubstituted or substituted by 1 or 2 identical or different substituents selected from fluorine, chlorine, $C_1$-$C_{10}$-alkyl and phenyl. Preferably, $p_{13}$ is 2, 3 or 4, in particular 2 or 4.

The compounds of formula (XIII) can be prepared in analogy to the methods described for example in WO 2007/006717, U.S. Pat. No. 4,845,223, EP3072887 and WO 2014/122549.

Suitable organic fluorescent colorants B13 are, for example, N,N'-bis(2,6-diisopropylphenyl)1,6,7,12-tetraphenoxyperylene-3,4:9,10-tetracarboximide, N,N'-bis(2,6-diisopropylphenyl)-1,7-di(2,6-diisopropylphenoxy)

perylene-3,4:9,10-tetracarboxímide, N,N'-bis(2,6-diisopropylphenyl)1,6-di(2,6-diisopropylphenoxy)perylene-3,4:9,10-tetracarboxímide, N,N'-bis(2,6-diisopropylphenyl)-1,7-di(p-tert-octylphenoxy)perylene-3,4:9,10-tetracarboxímide, N,N'-bis(2,6-diisopropylphenyl)-1,7-diphenoxyperylene-3,4:9,10-tetracarboxímide, N,N'-bis(2,6-diisopropylphenyl)-1,7-di(2,6-diphenylphenoxy)perylene-3,4:9,10-tetracarboxímide, N,N'-bis(2,6-diisopropylphenyl)-1,6-di(2,6-diphenylphenoxy)perylene-3,4:9,10-tetracarboxímide, N,N'-bis(2,6-diisopropylphenyl)-1,6,7,12-tetra(2-phenylphenoxy)perylene-3,4:9,10-tetracarboxímide, N,N'-bis(2,6-diisopropylphenyl)-1,7-di(2,3-difluorophenoxy)perylene-3,4:9,10-tetracarboxímide, N,N'-bis(2,6-diisopropylphenyl)-1,6,7,12-tetra(2,3-difluorophenoxy)perylene-3,4:9,10-tetracarboxímide, N,N'-bis(2,6-diisopropylphenyl)-1,6,7,12-tetra(3-fluorophenoxy)perylene3,4:9,10-tetracarboxímide, N,N'-bis(2,6-diisopropylphenyl)-1,6,7,12-tetra(2,6-difluorophenoxy)perylene-3,4:9,10-tetracarboxímide, N,N'-bis(2,6-diisopropylphenyl)-1,6,7,12-tetra(2,5-difluorophenoxy)perylene-3,4:9,10-tetracarboxímide, N,N'-bis(2,6-diisopropylphenyl)1,6,7,12-tetra(2,3-dichlorophenoxy)perylene-3,4:9,10-tetracarboxímide, N,N'-bis(2,6-diisopropylphenyl)-1,6,7,12-tetra(3-chlorophenoxy)perylene-3,4:9,10-tetracarboxímide, N,N'-bis(2,6-diisopropylphenyl)-1,6,7,12-tetra(2,6-dichlorophenoxy)perylene-3,4:9,10-tetracarboxímide, N,N'-bis(2,6-diisopropylphenyl)-1,6,7,12-tetra(2,5-dichlorophenoxy)perylene3,4:9,10-tetracarboxímide.

In particular, the organic fluorescent colorant (B13) is selected from compounds (XIII-1), (XIII-2), (XIII-3) and (XIII-4)

(XIII-1)

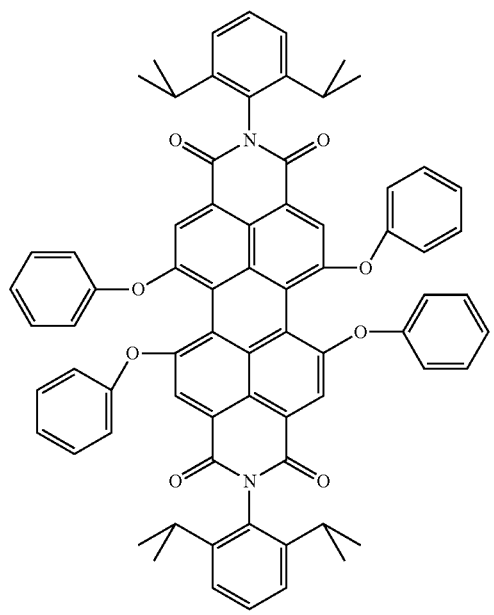

(XIII-2)

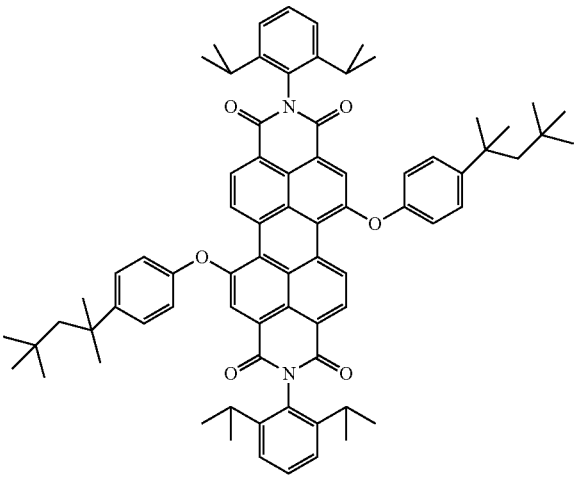

(XIII-3)

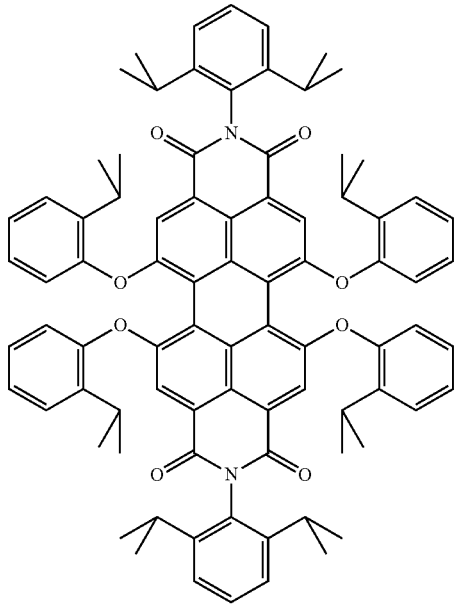

(XIII-4)

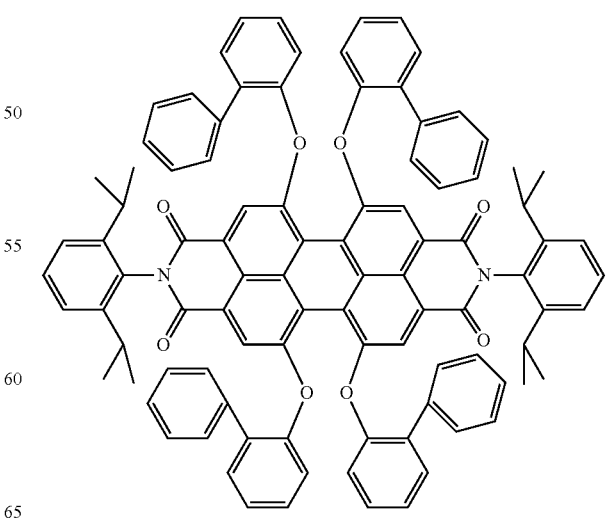

Organic Fluorescent Colorant (B14)

Compounds of formula (XIV) are subject matter of WO 2017/121833. Compounds of formula (IV) are usually orange or red fluorescent colorants. Preference is given to compounds of formula (XIV), where $R^{141}$ and $R^{142}$ are, independently of each other, selected from phenyl which is unsubstituted or substituted by 1, 2 or 3 $C_1$-$C_6$-alkyl; and $R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ are each hydrogen. The compound of formula (XIV) as defined above is preferably

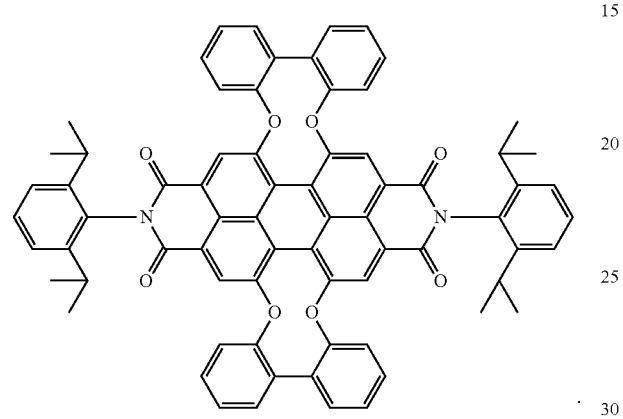

The compound of formula (XIV) can be prepared by reacting the appropriate chlorinated or brominated perylene bisimide of formula (XIVa)

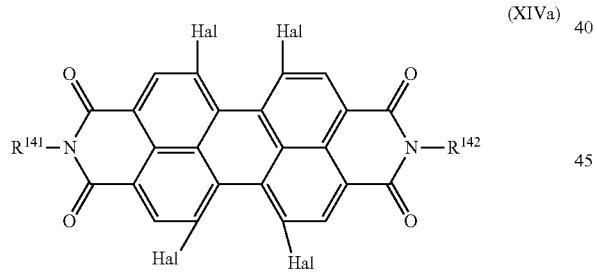

where
Hal is in each case bromine or in each case chlorine; and $R^{141}$ and $R^{142}$ are as defined above;
with a 2,2'-biphenol compound of formula (XIVb) and, if appropriate, an 2,2'-biphenol compound of formula (XIVc)

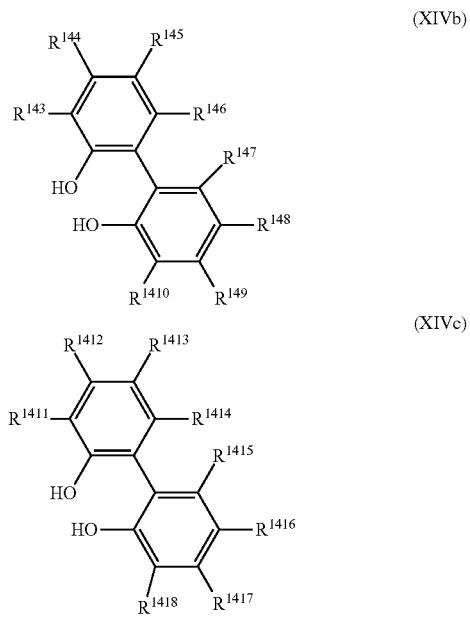

where
$R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ are as defined above.

The 2,2'-biphenol of formula (XIVc) may also be as defined for the 2,2'-biphenol of formula (XIVc) (if only one 2,2'-biphenol of formula (XIVb) is used for halogen replacement reaction).

Organic Fluorescent Colorant (B15)

Suitable examples of compounds of formula (XV) are for example the compounds as specified in WO 2016/026863, especially at page 6, line 32 to page 18, line 26. Especially preferred are the compounds 2455, 2452, 2517 and 2440 of WO 2016/026863. Suitable examples of compounds of formula (XV) are also the compounds as specified in EP 3101087, especially [0059]-[0078].

In particular, the organic fluorescent colorant (B15) is a compound of the formula (XV-1)

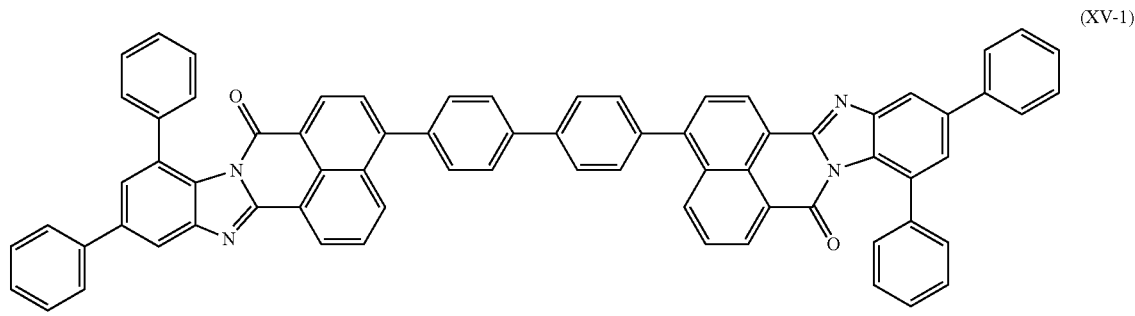 [SMILES: O=c1c2ccc(-c3ccc(-c4ccc(-c5ccc6c7c5cccc7c(=O)n5c6nc6cc(-c7ccccc7)cc(-c7ccccc7)c65)cc4)cc3)c3cccc(c32)c2nc3cc(-c4ccccc4)cc(-c4ccccc4)c3n12]

Organic Fluorescent Colorant (B16)

In a first preferred embodiment, the organic fluorescent colorant (B16) is selected from compounds (XVI-1)

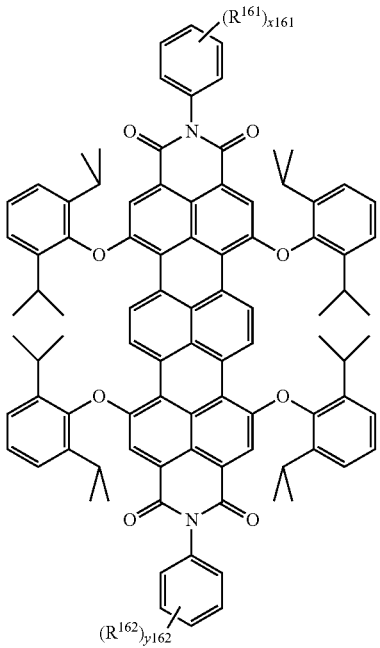

(XVI-1)

wherein
x161 is 1, 2 or 3,
y162 is 1, 2 or 3,
$R^{161}$ is $C_1$-$C_4$-alkyl, and
$R^{162}$ is $C_1$-$C_4$-alkyl.

Preferably, x161 is 2. Preferably, y162 is 2. Preferably, $R^{161}$ and $R^{162}$ are selected from isopropyl and tert-butyl.

In a further preferred embodiment the organic fluorescent colorant (B16) is selected from compounds (XVI-2)

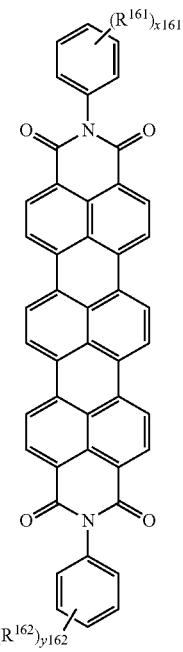

(XVI-2)

wherein
x161 is 1, 2 or 3,
y162 is 1, 2 or 3,
$R^{161}$ is $C_1$-$C_4$-alkyl, and
$R^{162}$ is $C_1$-$C_4$-alkyl.

Preferably, x161 is 2. Preferably, y162 is 2. Preferably, $R^{161}$ and $R^{162}$ are selected from isopropyl and tert-butyl.

Organic Fluorescent Colorant (B17)

Cyanoaryl substituted benz(othi)oxanthene compounds of formula (XVII) are disclosed in EP17208597.9, filed on Dec. 19, 2017, with the title "Cyanoaryl substituted benz(othi)oxanthene compounds".

Preferred compounds of formula (XVII), wherein the variable X is oxygen.

Preferred compounds according to the invention are compounds of formula I, wherein $R^2$, $R^3$, $R^4$ and $R^5$ are selected from the group consisting of the group consisting of hydrogen and $C_6$-$C_{10}$-aryl, which carries one, two or three cyano groups.

More preferably, $R^2$ and $R^4$ are selected from the group consisting of $C_6$-$C_{10}$-aryl, which carries one, two or three cyano groups. Particularly preferred $R^2$ and $R^4$ are each phenyl, which carries one, two or three cyano groups, especially one or two cyano group(s). Particularly preferred $R^3$ and $R^5$ are each hydrogen.

According to one embodiment of the invention the variable A in the compounds of formula I is a diradical of the formula A.1.

According to a preferred embodiment of the invention, the variable A in the compounds of formula I is a diradical of the formula A.2. In the context of A.2, $R^6$ is preferably selected from the group consisting of the group consisting of hydrogen, linear $C_1$-$C_{24}$-alkyl, branched $C_3$-$C_{24}$-alkyl, $C_6$-$C_{10}$-aryl and $C_6$-$C_{10}$-aryl-$C_1$-$C_{10}$-alkylene, where the aryl ring in the two last mentioned moieties is unsubstituted or substituted with 1, 2, 3, 4 or 5 identical or different radicals $R^{6a}$. More preferably, $R^6$ is selected from the group consisting of linear $C_1$-$C_{24}$-alkyl, a radical of the formula (B.1), a radical of the formula (B.2) and a radical (B.3)

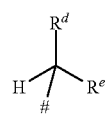

(B.1)

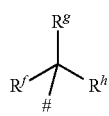

(B.2)

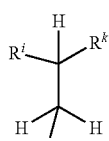

(B.3)

in which

\#represents the bonding site to the nitrogen atom;

$R^d$ and $R^e$, in the formula (B.1), independently from each other are selected from the group consisting of $C_1$-$C_{22}$-alkyl, where the sum of the carbon atoms of the $R^d$ and $R^e$ radicals is an integer from 2 to 23;

$R^f$, $R^g$ and $R^h$, in the formula (B.2) are independently selected from the group consisting of $C_1$- to $C_{21}$-alkyl, where the sum of the carbon atoms of the $R^f$, $R^g$ and $R^h$ radicals is an integer from 3 to 23;

$R^i$ and $R^k$, in the formula (B.3) are independently selected from the group consisting of $C_1$- to $C_{21}$-alkyl, where the sum of the carbon atoms of the $R^i$ and $R^k$ radicals is an integer from 2 to 22.

In particular, $R^6$ is linear $C_6$-$C_{24}$-alkyl. Herein, specific examples of $R^6$ are n-hexyl, n-heptyl, noctyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-uneicosyl, n-docosyl.

According to another embodiment of the invention, the variable A in the compounds of formula I is a diradical of the formula A.3. In the context of A.3, n in formula A.3 is preferably zero, one or two. $R^7$, if present, is preferably selected from the group consisting of cyano, bromine and phenyl which is unsubstituted or carries 1 or 2 radicals selected from the group consisting of $C_1$-$C_4$-alkyl.

According to another embodiment of the invention, the variable A in the compounds of formula I is a diradical of the formula A.4. In the context of A.4, o and p in formula A.4 are preferably zero, i.e. $R^8$ and $R^9$ are both absent. Likewise preferably, in the context of A.4, the sum of o and p is 1, 2, 3 or 4. In this context, $R^8$ and $R^9$ are, independently of each other, preferably selected from the group consisting of cyano, bromine, chlorine, $C_1$-$C_4$-alkyl, $C_1$-$C_4$-alkoxy, $C_1$-$C_4$-haloalkyl, phenyl and phenyloxy, wherein phenyl in the two last mentioned radicals is unsubstituted or carries 1, 2 or 3 substituents selected from the group consisting of $C_1$-$C_{10}$-alkyl.

Examples of preferred compounds of formula (XVII) are those depicted below:

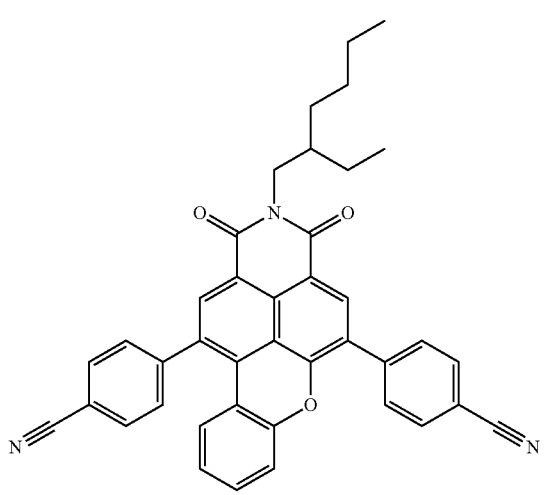

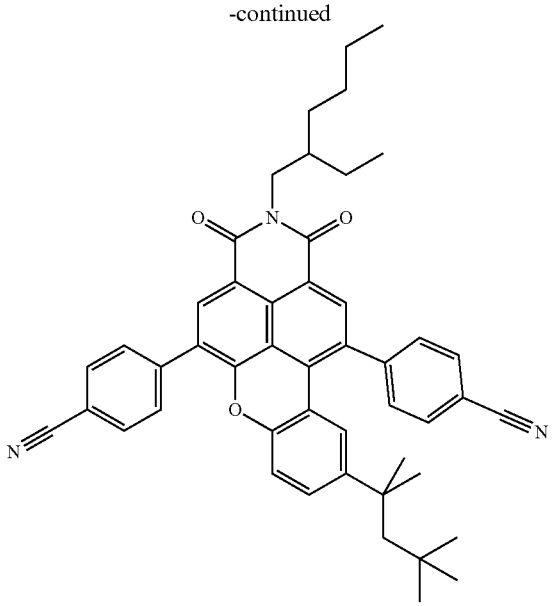

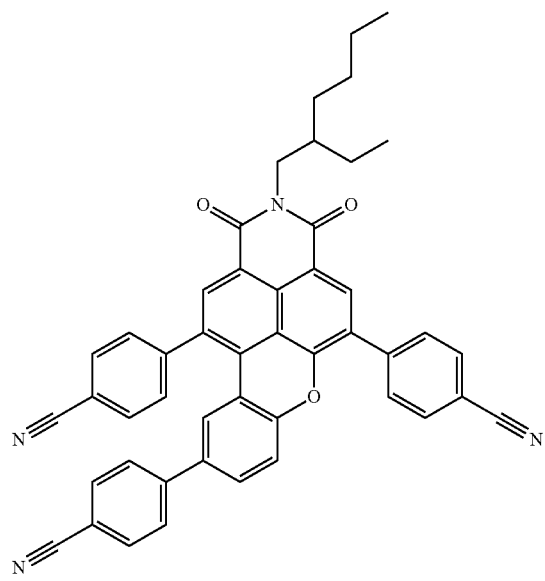

Organic Fluorescent Colorant (B18)

The cyano-substituted BODIPY (boron-dipyrromethene) dye selected from a compound of formulae (XVIIIa), (XVIIIb), (XVIIIc) or mixtures thereof (B18) is disclosed in EP18179281.3, filed Jun. 22, 2018 with the title "Photostable green cyano-substituted boron-dipyrromethene dye for display and illumination application".

Preferred compounds of formulae (XVIIIa), (XVIIIb), (XVIIIc) are exemplified below: Examples of preferred compounds of formula (XVIIIa) are compiled in Table A below:

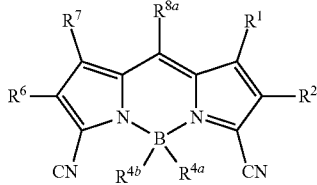

(XVIIIa)

TABLE A

| Compound | R¹ | R² | R⁴ᵃ | R⁴ᵇ | R⁶ | R⁷ | R⁸ᵃ |
|---|---|---|---|---|---|---|---|
| XVIIIa-1 | CH₃ | CH³ | F | F | CH₃ | CH₃ | CH₃ |
| XVIIIa-2 | CH₃ | CH³ | Cl | Cl | CH₃ | CH₃ | CH₃ |
| XVIIIa-3 | CH₃ | CH³ | CN | CN | CH₃ | CH₃ | CH₃ |
| XVIIIa-4 | CH₃ | CH³ | OCH₃ | OCH₃ | CH₃ | CH₃ | CH₃ |
| XVIIIa-5 | CH₃ | CH³ | 2-htp | 2-htp | CH₃ | CH₃ | CH₃ |
| XVIIIa-6 | C₂H₅ | C₂H₅ | F | F | C₂H₅ | C₂H₅ | C₂H₅ |
| XVIIIa-7 | C₂H₅ | C₂H₅ | Cl | Cl | C₂H₅ | C₂H₅ | C₂H₅ |
| XVIIIa-8 | C₂H₅ | C₂H₅ | CN | CN | C₂H₅ | C₂H₅ | C₂H₅ |
| XVIIIa-9 | C₂H₅ | C₂H₅ | OCH₃ | OCH₃ | C₂H₅ | C₂H₅ | C₂H₅ |
| XVIIIa-10 | C₂H₅ | C₂H₅ | 2-htp | 2-htp | C₂H₅ | C₂H₅ | C₂H₅ |
| XVIIIa-11 | CH₃ | C₂H₅ | F | F | C₂H₅ | CH₃ | CH₃ |
| XVIIIa-12 | CH₃ | C₂H₅ | Cl | Cl | C₂H₅ | CH₃ | CH₃ |
| XVIIIa-13 | CH₃ | C₂H₅ | CN | CN | C₂H₅ | CH₃ | CH₃ |
| XVIIIa-14 | CH₃ | C₂H₅ | OCH₃ | OCH₃ | C₂H₅ | CH₃ | CH₃ |
| XVIIIa-15 | CH₃ | C₂H₅ | 2-htp | 2-htp | C₂H₅ | CH₃ | CH₃ |
| XVIIIa-16 | CH₃ | H | F | F | H | CH₃ | CH₃ |
| XVIIIa-17 | CH₃ | H | Cl | Cl | H | CH₃ | CH₃ |
| XVIIIa-18 | CH₃ | H | CN | CN | H | CH₃ | CH₃ |
| XVIIIa-19 | CH₃ | H | OCH₃ | OCH₃ | H | CH₃ | CH₃ |
| XVIIIa-20 | CH₃ | H | 2-htp | 2-htp | H | CH₃ | CH₃ |

2-htp: 2-hydroxy-1,1,2-trimethylpropoxy

Examples of preferred compounds of formula (XVIIIb) are compiled in Table B below:

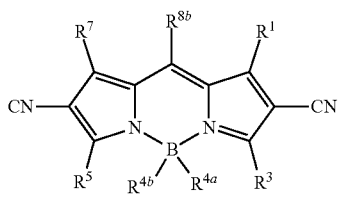

(XVIIIb)

TABLE B

| Compound | R¹ | R³ | R⁴ᵃ | R⁴ᵇ | R⁵ | R⁷ | R⁸ᵇ |
|---|---|---|---|---|---|---|---|
| XVIIIb-1 | CH₃ | CH₃ | F | F | CH₃ | CH₃ | CH₃ |
| XVIIIb-2 | CH₃ | CH₃ | Cl | Cl | CH₃ | CH₃ | CH₃ |
| XVIIIb-3 | CH₃ | CH₃ | CN | CN | CH₃ | CH₃ | CH₃ |
| XVIIIb-4 | CH₃ | CH₃ | OCH₃ | OCH₃ | CH₃ | CH₃ | CH₃ |
| XVIIIb-5 | CH₃ | CH₃ | 2-htp | 2-htp | CH₃ | CH₃ | CH₃ |
| XVIIIb-6 | C₂H₅ | C₂H₅ | F | F | C₂H₅ | C₂H₅ | C₂H₅ |
| XVIIIb-7 | C₂H₅ | C₂H₅ | Cl | Cl | C₂H₅ | C₂H₅ | C₂H₅ |
| XVIIIb-8 | C₂H₅ | C₂H₅ | CN | CN | C₂H₅ | C₂H₅ | C₂H₅ |
| XVIIIb-9 | C₂H₅ | C₂H₅ | OCH₃ | OCH₃ | C₂H₅ | C₂H₅ | C₂H₅ |
| XVIIIb-10 | C₂H₅ | C₂H₅ | 2-htp | 2-htp | C₂H₅ | C₂H₅ | C₂H₅ |
| XVIIIb-11 | CH₃ | C₂H₅ | F | F | C₂H₅ | CH₃ | CH₃ |
| XVIIIb-12 | CH₃ | C₂H₅ | Cl | Cl | C₂H₅ | CH₃ | CH₃ |
| XVIIIb-13 | CH₃ | C₂H₅ | CN | CN | C₂H₅ | CH₃ | CH₃ |
| XVIIIb-14 | CH₃ | C₂H₅ | OCH₃ | OCH₃ | C₂H₅ | CH₃ | CH₃ |
| XVIIIb-15 | CH₃ | C₂H₅ | 2-htp | 2-htp | C₂H₅ | CH₃ | CH₃ |
| XVIIIb-16 | CH₃ | H | F | F | H | CH₃ | CH₃ |
| XVIIIb-17 | CH₃ | H | Cl | Cl | H | CH₃ | CH₃ |
| XVIIIb-18 | CH₃ | H | CN | CN | H | CH₃ | CH₃ |
| XVIIIb-19 | CH₃ | H | OCH₃ | OCH₃ | H | CH₃ | CH₃ |
| XVIIIb-20 | CH₃ | H | 2-htp | 2-htp | H | CH₃ | CH₃ |

2-htp: 2-hydroxy-1,1,2-trimethylpropoxy

Of compounds of formula I.b, more preferred are the compounds XVIIb-1, XVRIIb-6, XVIIIb-11 and XVIIIb-16.

Examples fo preferred compounds of formula (XVIIc) are compied in Table C below:

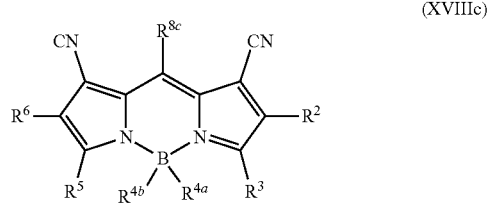

(XVIIIc)

TABLE C

| Compound | R² | R³ | R⁴ᵃ | R⁴ᵇ | R⁵ | R⁶ | R⁸ᶜ |
|---|---|---|---|---|---|---|---|
| XVIIIc-1 | CH₃ | CH₃ | F | F | CH₃ | CH₃ | CH₃ |
| XVIIIc-2 | CH₃ | CH₃ | Cl | Cl | CH₃ | CH₃ | CH₃ |
| XVIIIc-3 | CH₃ | CH₃ | CN | CN | CH₃ | CH₃ | CH₃ |
| XVIIIc-4 | CH₃ | CH₃ | OCH₃ | OCH₃ | CH₃ | CH₃ | CH₃ |
| XVIIIc-5 | CH₃ | CH₃ | 2-htp | 2-htp | CH₃ | CH₃ | CH₃ |
| XVIIIc-6 | C₂H₅ | C₂H₅ | F | F | C₂H₅ | C₂H₅ | C₂H₅ |
| XVIIIc-7 | C₂H₅ | C₂H₅ | Cl | Cl | C₂H₅ | C₂H₅ | C₂H₅ |
| XVIIIc-8 | C₂H₅ | C₂H₅ | CN | CN | C₂H₅ | C₂H₅ | C₂H₅ |
| XVIIIc-9 | C₂H₅ | C₂H₅ | OCH₃ | OCH₃ | C₂H₅ | C₂H₅ | C₂H₅ |
| XVIIIc-10 | C₂H₅ | C₂H₅ | 2-htp | 2-htp | C₂H₅ | C₂H₅ | C₂H₅ |
| XVIIIc-11 | C₆H₅ | CH₃ | F | F | CH₃ | C₆H₅ | CH₃ |
| XVIIIc-12 | C₆H₅ | CH₃ | Cl | Cl | CH₃ | C₆H₅ | CH₃ |
| XVIIIc-13 | C₆H₅ | CH₃ | CN | CN | CH₃ | C₆H₅ | CH₃ |
| XVIIIc-14 | C₆H₅ | CH₃ | OCH₃ | OCH₃ | CH₃ | C₆H₅ | CH₃ |
| XVIIIc-15 | C₆H₅ | CH₃ | 2-htp | 2-htp | CH₃ | C₆H₅ | CH₃ |
| XVIIIc-16 | CH₃ | CH₃ | F | F | CH₃ | CH₃ | C₆H₅ |
| XVIIIc-17 | CH₃ | CH₃ | Cl | Cl | CH₃ | CH₃ | C₆H₅ |
| XVIIIc-18 | CH₃ | CH₃ | CN | CN | CH₃ | CH₃ | C₆H₅ |
| XVIIIc-19 | CH₃ | CH₃ | OCH₃ | OCH₃ | CH₃ | CH₃ | C₆H₅ |
| XVIIIc-20 | CH₃ | CH₃ | 2-htp | 2-htp | CH₃ | CH₃ | C₆H₅ |
| XVIIIc-21 | CH₃ | CH₃ | F | F | CH₃ | CH₃ | 4-CH₃-C₆H₄ |
| XVIIIc-22 | CH₃ | CH₃ | Cl | Cl | CH₃ | CH₃ | 4-CH₃-C₆H₄ |
| XVIIIc-23 | CH₃ | CH₃ | CN | CN | CH₃ | CH₃ | 4-CH₃-C₆H₄ |
| XVIIIc-24 | CH₃ | CH₃ | OCH₃ | OCH₃ | CH₃ | CH₃ | 4-CH₃-C₆H₄ |
| XVIIIc-25 | CH₃ | CH₃ | 2-htp | 2-htp | CH₃ | CH₃ | 4-CH₃-C₆H₄ |
| XVIIIc-26 | CH₃ | CH₃ | F | F | CH₃ | CH₃ | CH₂C₆H₅ |
| XVIIIc-27 | CH₃ | CH₃ | Cl | Cl | CH₃ | CH₃ | CH₂C₆H₅ |
| XVIIIc-28 | CH₃ | CH₃ | CN | CN | CH₃ | CH₃ | CH₂C₆H₅ |
| XVIIIc-29 | CH₃ | CH₃ | OCH₃ | OCH₃ | CH₃ | CH₃ | CH₂C₆H₅ |
| XVIIIc-30 | CH₃ | CH₃ | 2-htp | 2-htp | CH₃ | CH₃ | CH₂C₆H₅ |

2-htp: 2-hydroxy-1,1,2-trimethylpropoxy

Of compounds of formula IXVIIIc, preferred are the compounds XVIIIc-1, XVIIIc-6, XVIIIIc-11, XVIIIac-16, XVIIIac-21 and XVIIIac-26.

The luminescent collector may comprise a plurality of organic fluorescent colorants (B) as defined above, for example from 1, 2, 3, 4, 5, 6, 7, 8, 9, 10 or more than 10. Preferably, the luminescent collector comprises one or two organic fluorescent colorants (B), more preferably one organic fluorescent colorant (B).

In particular, the organic fluorescent colorants (B) are selected from the following compounds and mixtures thereof:

95              96
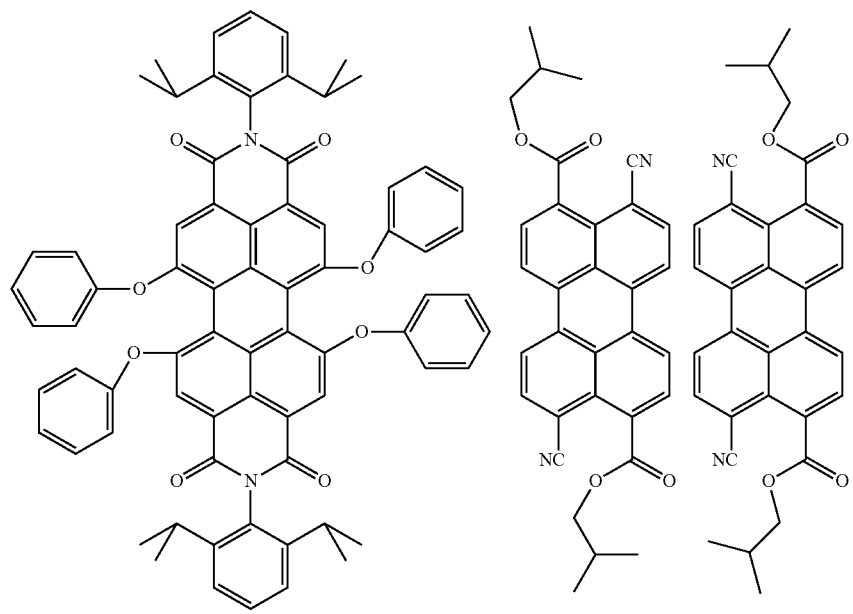

-continued
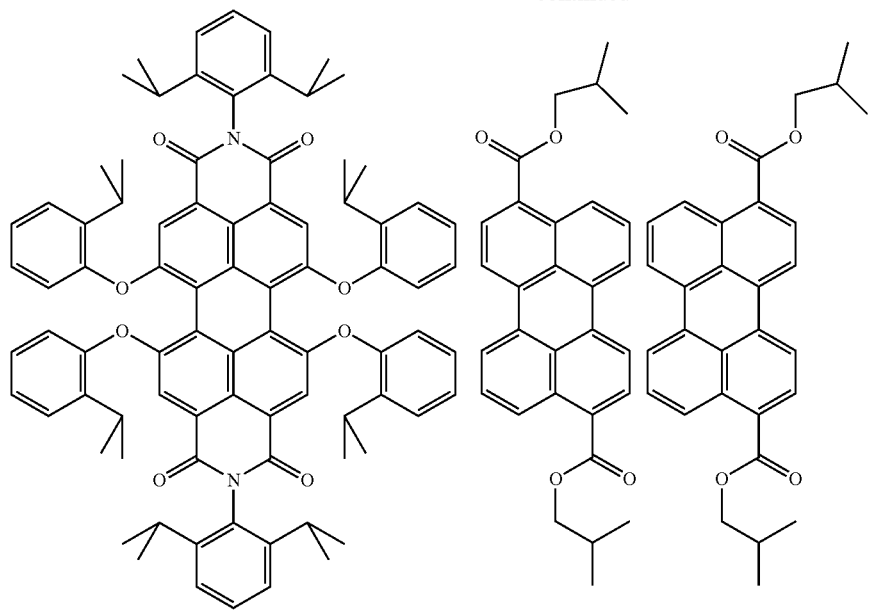
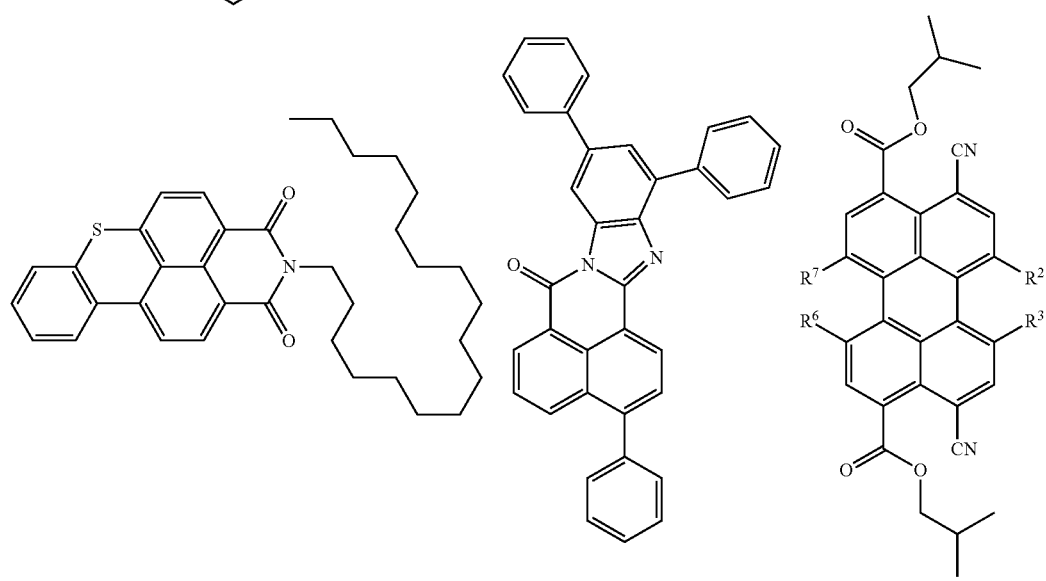
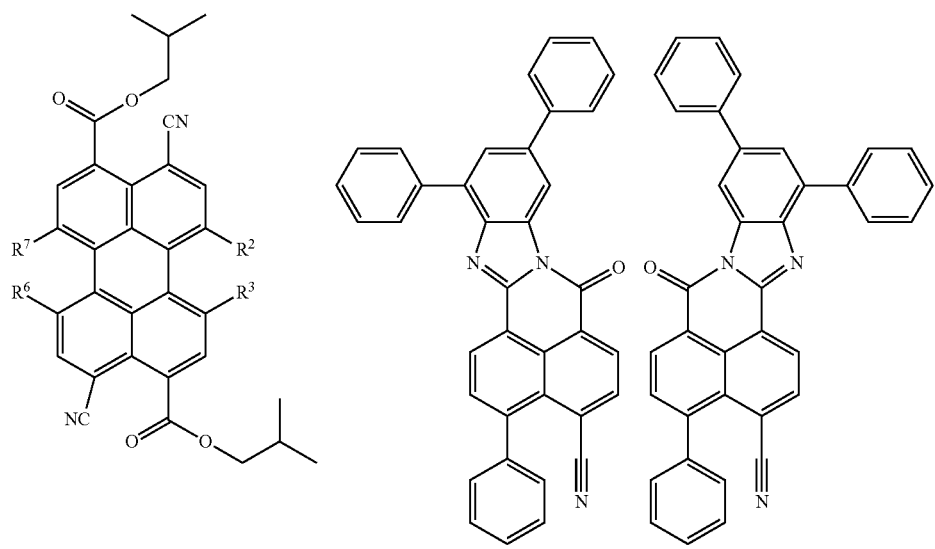

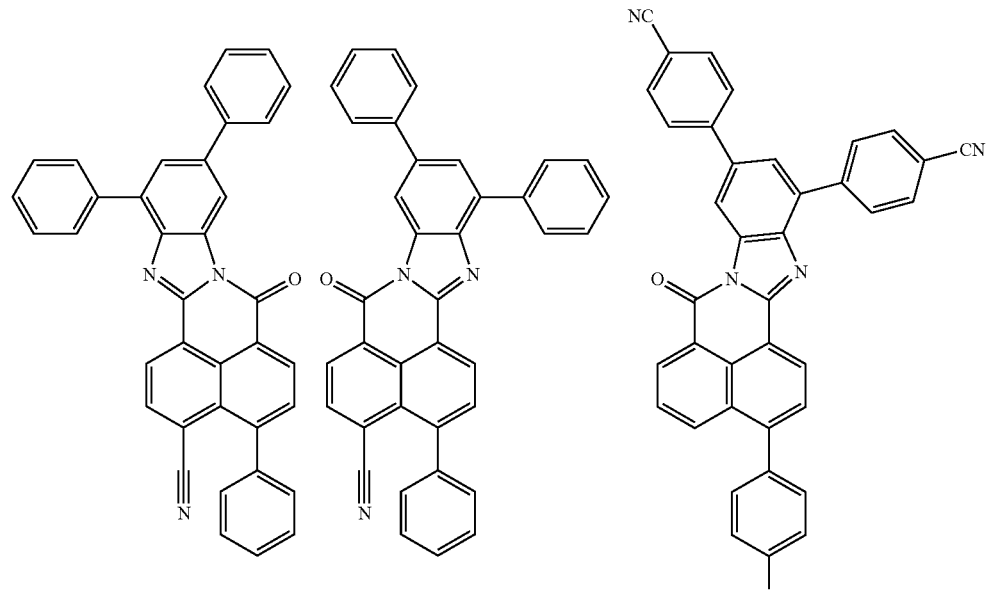
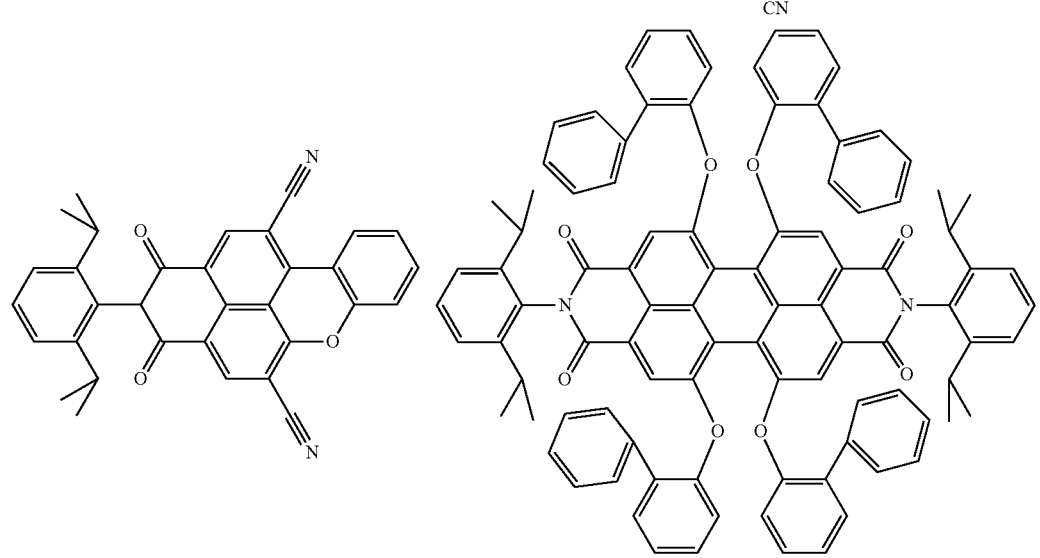
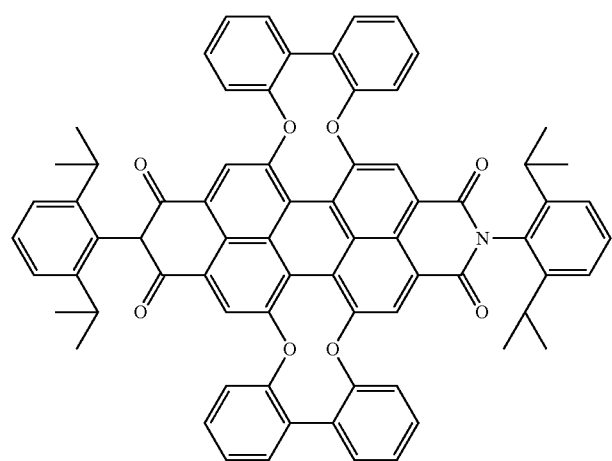

-continued
101
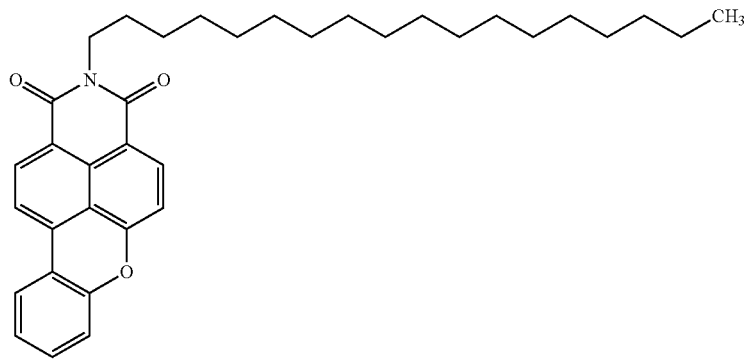
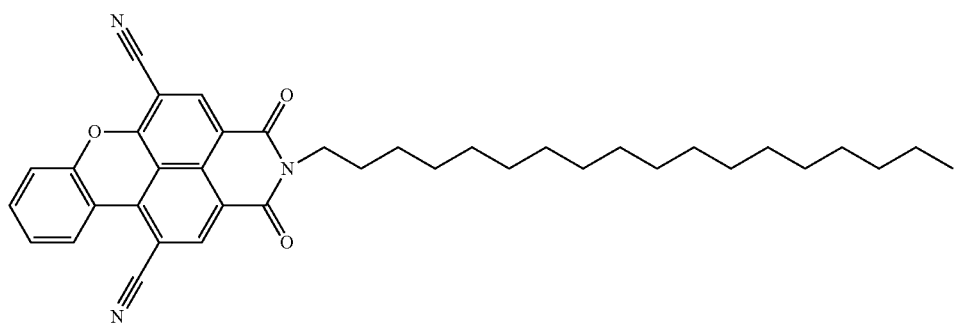
102
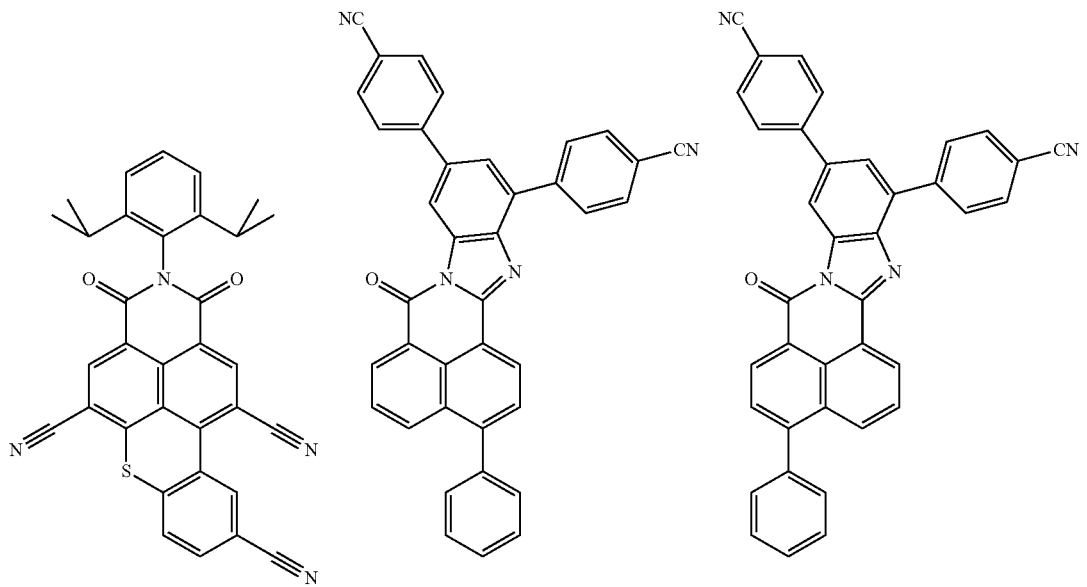

103 104
-continued
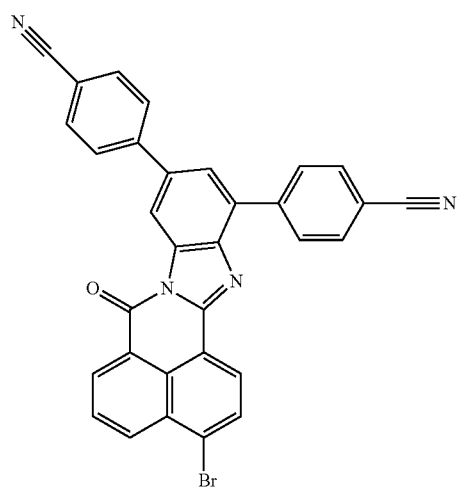
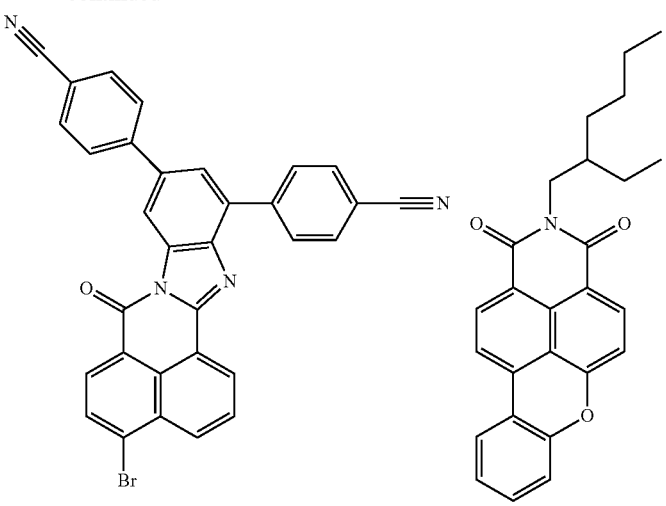
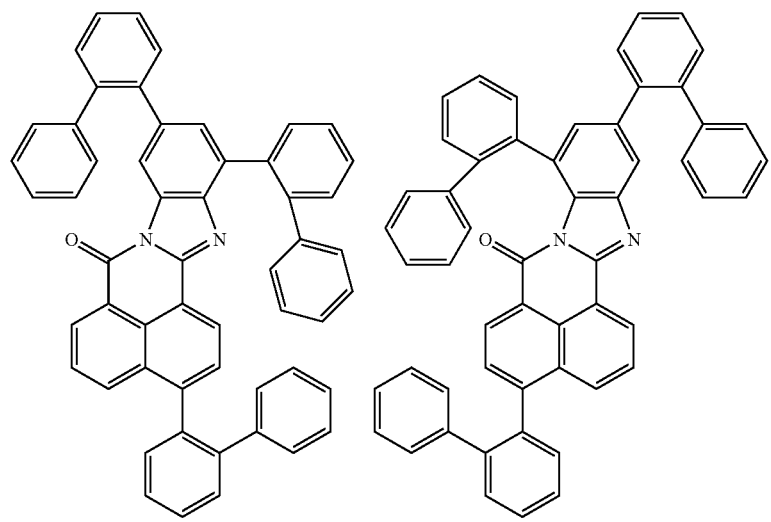
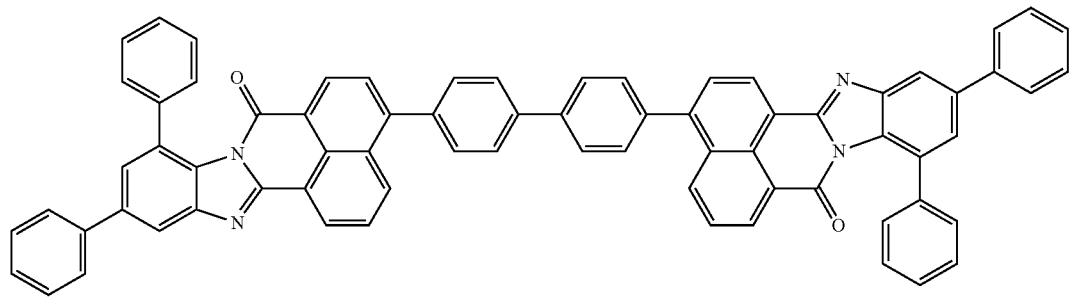

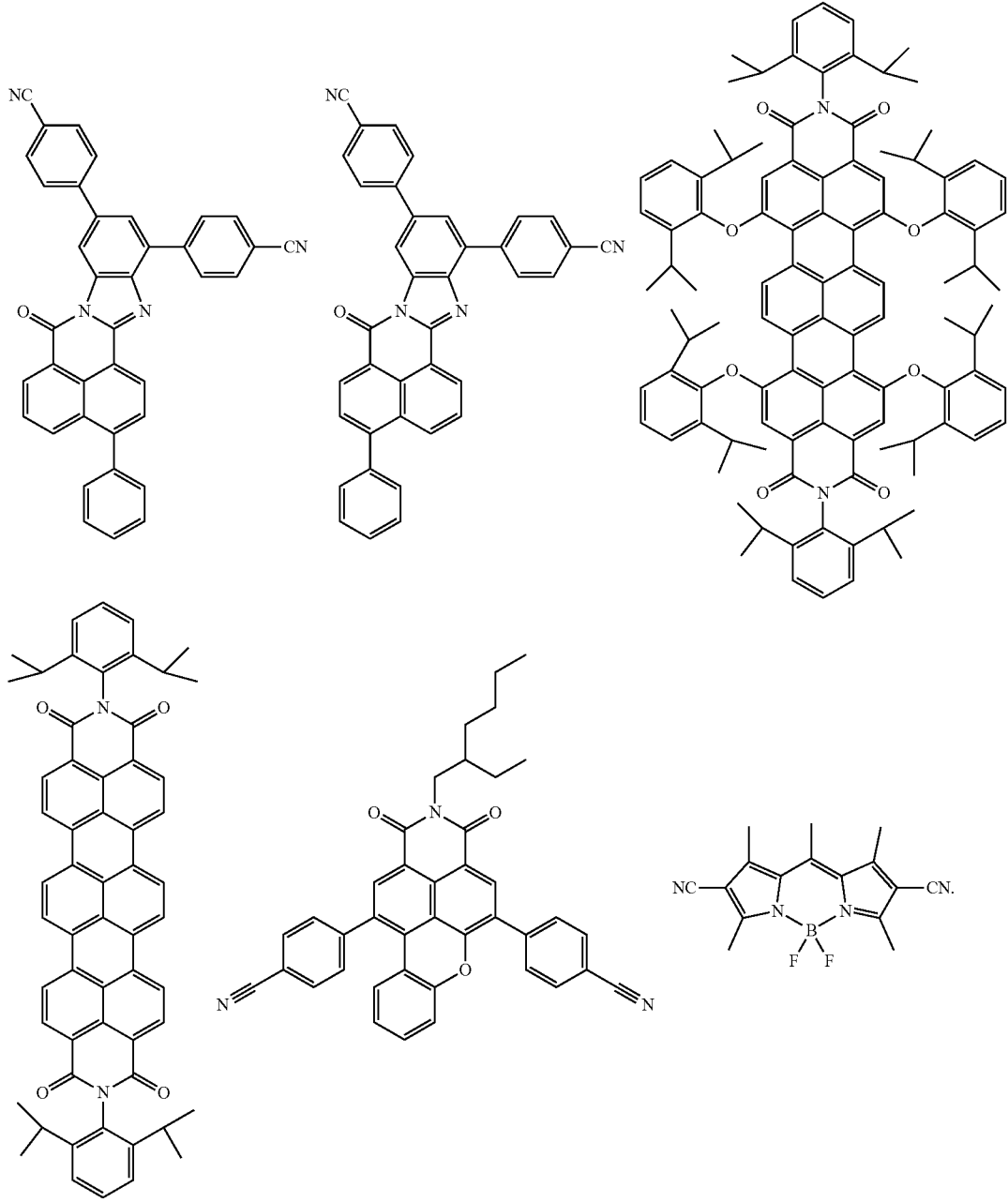

The residues mentioned in the specification of the present application generally have the following preferred meanings, if said residues are not further specified in specific embodiments mentioned:

The expression "halogen" denotes in each case fluorine, bromine, chlorine or iodine, particularly chlorine, bromide or iodine.

In the context of the invention, the expression "in each case unsubstituted or substituted alkyl, cycloalkyl and aryl" represents unsubstituted or substituted alkyl, unsubstituted or substituted cycloalkyl and unsubstituted or substituted aryl.

Likewise, in the context of the invention, the expression "in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkyloxy, $C_6$-$C_{24}$-aryl and $C_6$-$C_{24}$-aryloxy" represents unsubstituted or substituted $C_1$-$C_{30}$-alkyl, unsubstituted or substituted polyalkyleneoxy, unsubstituted or substituted $C_1$-$C_{30}$-alkoxy, unsubstituted or substituted $C_1$-$C_{30}$-alkylthio, unsubstituted or substituted $C_3$-$C_{20}$-cycloalkyl, unsubstituted or substituted $C_3$-$C_{20}$-cycloalkyloxy, unsubstituted or substituted $C_6$-$C_{24}$-aryl and unsubstituted or substituted $C_6$-$C_{24}$-aryloxy.

For the purpose of the present invention, the term "aliphatic radical" refers to an acyclic saturated or unsaturated, straight-chain or branched hydrocarbon radical. Usually the aliphatic radical has 1 to 100 carbon atoms. Examples for an aliphatic radical are alkyl, alkenyl and alkynyl.

For the purpose of the present invention, the term "cycloaliphatic radical" refers to a cyclic, nonaromatic saturated or unsaturated hydrocarbon radical having usually 3 to 20 ring carbon atoms. Examples are cycloalkanes, cycloalkenes, and cycloalkynes. The cycloaliphatic radical may also comprise heteroatoms or heteroatom groups selected from N, O, S and $SO_2$.

The term "alkyl" as used herein and in the alkyl moieties of alkoxy, alkylthio, alkylsulfinyl, alkylsulfonyl, alkylamino, dialkylamino, alkylcarbonyl, alkoxycarbonyl and the like refers to saturated straight-chain or branched hydrocarbon radicals having usually 1 to 100 ("$C_1$-$C_{100}$-alkyl"), 1 to 30 ("$C_1$-$C_{30}$-alkyl"), 1 to 18 ("$C_1$-$C_{18}$-alkyl"), 1 to 12 ("$C_1$-$C_{12}$-alkyl"), 1 to 8 ("$C_1$-$C_8$-alkyl") or 1 to 6 ("$C_1$-$C_6$-alkyl") carbon atoms. Alkyl is preferably $C_1$-$C_{30}$-alkyl, more preferably $C_1$-$C_{20}$-alkyl. Examples of alkyl groups are especially methyl, ethyl, n-propyl, isopropyl, n-butyl, isobutyl, secbutyl, tert-butyl, n-pentyl, 1-methylbutyl, 1-ethylpropyl, neo-pentyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 1-propylbutyl, 2-ethylpentyl, n-octyl, 1-methylheptyl, 2-methylheptyl, 1-ethylhexyl, 2-ethylhexyl, 1-propylpentyl, 2-propylpentyl, n-nonyl, etc.

Substituted alkyl groups, depending on the length of the alkyl chain, have one or more (e.g. 1, 2, 3, 4, 5 or more than 5) substituents. These are preferably each independently of each other selected from unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —$COOR^{Ar1}$, $NE^1E^2$, —$NR^{Ar1}COR^{Ar2}$, —$CONR^{Ar1}R^{Ar2}$, —$SO_2NR^{Ar1}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted alkyl groups have one or more, for example 1, 2 or 3 substituent(s) selected from unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{A1'}R^{Ar2}$, —$SO_2NR^{A1'}R^{Ar2}$, and —$SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

Special embodiments of substituted alkyl groups are alkyl groups, wherein one hydrogen atom has been replaced by an aryl radical ("aralkyl", also referred to hereinafter as aryl-alkyl or arylalkylene), in particular a phenyl radical. The aryl radical in turn may be unsubstituted or substituted, suitable substituents are the substituents mentioned below for aryl. Particular examples of aryl-$C_1$-$C_4$-alkyl include benzyl, 1-phenethyl, 2-phenetyl, 1-phenylpropyl, 2-phenylpropyl, 3-phenyl-1-propyl, 2-phenyl-2-propyl, naphthylmethyl, naphthylethyl etc.

Further special embodiments of substituted alkyl groups are alkyl groups where some or all of the hydrogen atoms in these groups may be replaced by halogen atoms as mentioned above, for example $C_1$-$C_4$-haloalkyl.

The term "alkenyl" as used herein refers to straight-chain or branched hydrocarbon groups having usually 2 to 100 ("$C_2$-$C_{100}$-alkenyl"), 2 to 18 ("$C_2$-$C_{18}$-alkenyl"), 2 to 10 ("$C_2$-$C_{10}$-alkenyl"), 2 to 8 ("$C_2$-$C_8$-alkenyl"), or 2 to 6 ("$C_2$-$C_6$-alkenyl") carbon atoms and one or more, e.g. 2 or 3, double bonds in any position. Substituted alkenyl groups, depending on the length of the alkenyl chain, have one or more (e.g. 1, 2, 3, 4, 5 or more than 5) substituents. These are preferably each independently of each other selected from unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —$COOR^{Ar1}$, $NE^1E^2$, —$NR^{Ar1}COR^{Ar2}$, —$CONR^{Ar1}R^{Ar2}$, —$SO_2NR^{Ar1}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted alkenyl groups have one or more, for example 1, 2 or 3 substituent(s) selected from unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{A1'}R^{Ar2}$, —$SO_2NR^{Ar1}R^{Ar2}$, and —$SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

The term "alkynyl" as used herein (also referred to as alkyl whose carbon chain may comprise one or more triple bonds) refers to straight-chain or branched hydrocarbon groups having usually 2 to 100 ("$C_2$-$C_{100}$-alkynyl"), 2 to 18 ("$C_2$-$C_{18}$-alkynyl"), 2 to 10 ("$C_2$-$C_{10}$-alkynyl"), 2 to 8 ("$C_2$-$C_8$-alkynyl"), or 2 to 6 ("$C_2$-$C_6$-alkynyl") carbon atoms and one or more, e.g. 2 or 3, triple bonds in any position. Substituted alkynyl groups, depending on the length of the alkynyl chain, have one or more (e.g. 1, 2, 3, 4, 5 or more than 5) substituents. These are preferably each independently of each other selected from unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, alkylcarbonyloxy, formyl, acyl, COOH, carboxylate, —COOR$^{Ar1}$, NE$^1$E$^2$, —NR$^{Ar1}$COR$^{Ar2}$, —CONR$^{A1r}$R$^{Ar2}$, —SO$_2$NR$^{Ar1}$R$^{Ar2}$ and —SO$_3$R$^{Ar2}$, where E$^1$ and E$^2$ are hydrogen, unsubstituted or substituted C$_1$-C$_{18}$-alkyl, unsubstituted or substituted C$_2$-C$_{18}$-alkenyl, unsubstituted or substituted C$_2$-C$_{18}$-alkynyl, unsubstituted or substituted C$_3$-C$_{20}$-cycloalkyl or unsubstituted or substituted C$_6$-C$_{10}$-aryl, and R$^{Ar}$ and R$^{Ar2}$, independently of each other, are hydrogen, unsubstituted or substituted C$_1$-C$_{18}$-alkyl, unsubstituted or substituted C$_3$-C$_{20}$-cycloalkyl, unsubstituted or substituted heterocyclyl, unsubstituted or substituted C$_6$-C$_{20}$-aryl or unsubstituted or substituted heteroaryl. In particular, substituted alkynyl groups have one or more, for example 1, 2 or 3 substituent(s) selected from unsubstituted or substituted cycloalkyl, unsubstituted or substituted aryl, fluorine, chlorine, bromine, hydroxyl, alkoxy, polyalkyleneoxy, mercapto, alkylthio, cyano, nitro, NE$^1$E$^2$, —NR$^{Ar1}$COR$^{Ar2}$, —CONR$^{A1r}$R$^{Ar2}$, —SO$_2$NR$^{Ar1}$R$^{Ar2}$, and —SO$_3$R$^{Ar2}$, where E$^1$, E$^2$, independently of each other, are hydrogen, unsubstituted or substituted C$_1$-C$_{18}$-alkyl, unsubstituted or substituted C$_2$-C$_{18}$-alkenyl, unsubstituted or substituted C$_2$-C$_{18}$-alkynyl, unsubstituted or substituted C$_3$-C$_{20}$-cycloalkyl or unsubstituted or substituted C$_6$-C$_{10}$-aryl, and R$^{Ar}$ and R$^{Ar2}$, each independently of each, are hydrogen, unsubstituted or substituted C$_1$-C$_{18}$-alkyl, unsubstituted or substituted C$_3$-C$_{20}$-cycloalkyl, unsubstituted or substituted heterocyclyl, unsubstituted or substituted C$_6$-C$_{20}$-aryl or unsubstituted or substituted heteroaryl.

The term "alkoxy" as used herein refers to an alkyl group bound through an oxygen atom, that is, an "alkoxy" group may be represented as —O-alkyl where alkyl is as defined above. C$_1$-C$_2$-Alkoxy is methoxy or ethoxy. C$_1$-C$_4$-Alkoxy is, for example, methoxy, ethoxy, n-propoxy, 1-methylethoxy (isopropoxy), butoxy, 1-methylpropoxy (sec-butoxy), 2-methylpropoxy (isobutoxy) or 1,1-dimethylethoxy (tert-butoxy).

Accordingly, the term "unsubstituted or substituted alkoxy" as used herein refers to —O-alkyl where alkyl is unsubstituted or substituted as defined above.

The term "polyoxyalkylene" as used herein refers to an alkyl group bound through an oxygen atom to the remainder of the molecule, where alkyl is interrupted by one or more non-adjacent oxygen atoms and alkyl is as defined above.

Accordingly, the term "unsubstituted or substituted polyalkyleneoxy" as used herein refers to —O— alkyl where alkyl is interrupted by one or more non-adjacent oxygen atoms and alkyl is unsubstituted or substituted as defined above.

The term "alkylthio" as used herein refers to an alkyl group bound through a sulfur atom, that is, an "alkylthio" group may be represented as —S-alkyl where alkyl is as defined above. C$_1$-C$_2$-Alkylthio is methylthio or ethylthio. C$_1$-C$_4$-Alkylthio is, for example, methylthio, ethylthio, npropylthio, 1-methylethylthio (isopropylthio), butylthio, 1-methylpropylthio (sec-butylthio), 2-methylpropylthio (isobutylthio) or 1,1-dimethylethylthio (tert-butylthio).

Accordingly, the term "unsubstituted or substituted alkylthio" as used herein refers to —S-alkyl where alkyl is unsubstituted or substituted as defined above.

The term "cycloalkyl" as used herein refers to mono- or bi- or polycyclic saturated hydrocarbon radicals having usually 3 to 24 (C$_3$-C$_{24}$-cycloalkyl), 3 to 20 ("C$_3$-C$_{20}$-cycloalkyl") atoms, preferably 3 to 8 ("C$_3$-C$_8$-cycloalkyl") or 3 to 6 carbon atoms ("C$_3$-C$_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 to 12 carbon atoms comprise bicyclo[2.2.1]heptyl, bicyclo[3.1.1]heptyl, bicyclo[2.2.2]octyl, bicyclo[3.3.0]octyl, bicyclo[3.2.1]octyl, bicyclo[3.3.1]nonyl, bicyclo[4.2.1]nonyl, bicyclo[4.3.1]decyl, bicyclo[3.3.2]decyl, bicyclo[4.4.0]decyl, bicyclo[4.2.2]decyl, bicyclo[4.3.2] undecyl, bicyclo[3.3.3]undecyl, bicyclo[4.3.3]dodecyl, and perhydronaphthyl. Examples of polycyclic rings are perhydroanthracyl, perhydrofluorenyl, perhydrochrysenyl, perhydropicenyl, and adamantyl.

Substituted cycloalkyl groups may, depending on the ring size, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —COOR$^{Ar1}$, -NE$^1$E2, —NR$^{Ar1}$COR$^{Ar2}$ CONR$^{Ar1}$R$^{Ar2}$, —SO$_2$NR$^{A1r}$R$^{Ar2}$ and —SO$_3$R$^{Ar2}$, where E$^1$ and E$^2$ are hydrogen, unsubstituted or substituted C$_1$-C$_{18}$-alkyl, unsubstituted or substituted C$_2$-C$_{18}$-alkenyl, unsubstituted or substituted C$_2$-C$_{18}$-alkynyl, unsubstituted or substituted C$_3$-C$_{20}$-cycloalkyl or unsubstituted or substituted C$_6$-C$_{10}$-aryl, and R$^{Ar1}$ and R$^{Ar2}$, independently of each other, are hydrogen, unsubstituted or substituted C$_1$-C$_{18}$-alkyl, unsubstituted or substituted C$_3$-C$_{20}$-cycloalkyl, unsubstituted or substituted heterocyclyl, unsubstituted or substituted C$_6$-C$_{20}$-aryl or unsubstituted or substituted heteroaryl. In particular, substituted cycloalkyl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, NE$^1$E$^2$, —NR$^{Ar1}$COR$^{Ar2}$, —CONR$^{A1r}$R$^{Ar2}$, —SO$_2$NR$^{Ar1}$R$^{Ar2}$, and —SO$_3$R$^{Ar2}$, where E$^1$, E$^2$, independently of each other, are hydrogen, unsubstituted or substituted C$_1$-C$_{18}$-alkyl, unsubstituted or substituted C$_2$-C$_{18}$-alkenyl, unsubstituted or substituted C$_2$-C$_{18}$-alkynyl, unsubstituted or substituted C$_3$-C$_{20}$-cycloalkyl or unsubstituted or substituted C$_6$-C$_{10}$-aryl, and R$^{Ar1}$ and R$^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

The term "cycloalkyloxy" as used herein refers to a cycloalkyl group bound through an oxygen atom, that is, a "cycloalkyloxy" group may be represented as —O-cycloalkyl where cycloalkyl is as defined above.

Accordingly, the term "unsubstituted or substituted cycloalkyloxy" as used herein refers to —O— cycloalkyl where cycloalkyl is unsubstituted or substituted as defined above.

The term "cycloalkylthio" as used herein refers to a cycloalkyl group bound through a sulfur atom, that is, a "cycloalkylthio" group may be represented as —S-cycloalkyl where cycloalkyl is as defined above.

Accordingly, the term "unsubstituted or substituted cycloalkylthio" as used herein refers to —S— cycloalkyl where cycloalkyl is unsubstituted or substituted as defined above.

The term "heterocycloalkyl" refers to nonaromatic, partially unsaturated or fully saturated, heterocyclic rings having generally 5 to 8 ring members, preferably 5 or 6 ring members, comprising besides carbon atoms as ring members, one, two, three or four heteroatoms or heteroatomcontaining groups selected from O, N, $NR^{cc}$, S, SO and $S(O)_2$ as ring members, wherein $R^{cc}$ is hydrogen, $C_1$-$C_{20}$-alkyl, $C_3$-$C_{24}$-cycloalkyl, heterocycloalkyl, $C_6$-$C_{24}$-aryl or heteroaryl. Examples of heterocycloalkyl groups are especially pyrrolidinyl, piperidinyl, imidazolidinyl, pyrazolidinyl, oxazolidinyl, morpholinyl, thiazolidinyl, isothiazolidinyl, isoxazolidinyl, piperazinyl, tetrahydrothiophenyl, dihydrothien-2-yl, tetrahydrofuranyl, dihydrofuran-2-yl, tetrahydropyranyl, 2-oxazolinyl, 3-oxazolinyl, 4-oxazolinyl and dioxanyl.

Substituted heterocycloalkyl groups may, depending on the ring size, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —$COOR^{Ar1}$, -$NE^1E2$, —$NR^{Ar1}COR^{Ar2}$, —$CONR^{A1r}R^{Ar2}$, —$SO_2NR^{A1r}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted heterocycloalkyl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{Ar1}R^{Ar2}$, —$SO_2NR^{A1r}R^{Ar2}$, and —$SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

For the purpose of the present invention, the term "aryl" refers to phenyl and bi- or polycyclic carbocycles having at least one fused phenylene ring, which is bound to the remainder of the molecule. Examples of bi- or polycyclic carbocycles having at least one phenylene ring include naphthyl, tetrahydronaphthyl, indanyl, indenyl, anthracenyl, fluorenyl etc. Preferably, the term "aryl" denotes phenyl and naphthyl.

Substituted aryls may, depending on the number and size of their ring systems, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —$COR^{Ar1}$, -$NE^1E^2$, —$NR^{Ar1}COR^{Ar2}$, —$CONR^{A1r}R^{Ar2}$, —$SO_2NR^{A1r}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted aryl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{Ar1}R^{Ar2}$, —$SO_2NR^{Ar1}R^{Ar2}$, and —$SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, each independently of each, are hydrogen, unsubstituted or substituted $C_1$-$C_{18}$-alkyl, unsubstituted or substituted $C_3$-$C_{20}$- cycloalkyl, unsubstituted or substituted heterocyclyl, unsubstituted or substituted $C_6$-$C_{20}$-aryl or unsubstituted or substituted heteroaryl.

Substituted aryl is preferably aryl substituted by at least one alkyl group ("alkaryl", also referred to hereinafter as alkylaryl). Alkaryl groups may, depending on the size of the aromatic ring system, have one or more (e.g. 1, 2, 3, 4, 5, 6, 7, 8, 9 or more than 9) alkyl substituents. The alkyl substituents may be unsubstituted or substituted. In this regard, reference is made to the above statements regarding unsubstituted and substituted alkyl. A special embodiment relates to alkaryl groups, wherein alkyl is unsubstituted. Alkaryl is preferably phenyl which bears 1, 2, 3, 4 or 5, preferably 1, 2 or 3, more preferably 1 or 2 alkyl substituents. Aryl which bears one or more alkyl radicals, is, for example, 2-, 3- and 4-methylphenyl, 2,4-, 2,5-, 3,5- and 2,6-dimethylphenyl, 2,4,6-trimethylphenyl, 2-, 3- and 4-ethylphenyl, 2,4-, 2,5-, 3,5- and 2,6-diethylphenyl, 2,4,6-triethylphenyl, 2-, 3- and 4-n-propylphenyl, 2-, 3- and 4-iso-propylphenyl, 2,4-, 2,5-, 3,5- and 2,6-di-n-propylphenyl, 2,4,6-tripropylphenyl, 2-, 3- and 4-isopropylphenyl, 2,4-, 2,5-, 3,5- and 2,6-diisopropylphenyl, 2,4,6-triisopropylphenyl, 2-, 3- and 4-butylphenyl, 2,4-, 2,5-, 3,5- and 2,6-dibutylphenyl, 2,4,6-tributylphenyl, 2-, 3- and 4-isobutylphenyl, 2,4-, 2,5-, 3,5- and 2,6-diisobutylphenyl, 2,4,6-triisobutylphenyl, 2-, 3- and 4-sec-butylphenyl, 2,4-, 2,5-, 3,5- and 2,6-di-sec-butylphenyl, 2,4,6-tri-sec-butylphenyl, 2-, 3- and 4-tert-butylphenyl, 2,4-, 2,5-, 3,5- and 2,6-di-tert-butylphenyl and 2,4,6-tri-tert-butylphenyl.

$C_6$-$C_{24}$-aryloxy: $C_6$-$C_{24}$-aryl as defined above, which is bonded to the skeleton via an oxygen atom (—O—). Preference is given to phenoxy and naphthyloxy.

Accordingly, the term "unsubstituted or substituted aryloxy" as used herein refers to —O-aryl where aryl is unsubstituted or substituted as defined above.

$C_6$-$C_{24}$-arylthio: $C_6$-$C_{24}$-aryl as defined above, which is bonded to the skeleton via a sulfur atom (—S—). Preference is given to phenylthio and naphthylthio.

Accordingly, the term "unsubstituted or substituted arylthio" as used herein refers to —S-aryl where aryl is unsubstituted or substituted as defined above.

In the context of the present invention, the expression "hetaryl" (also referred to as heteroaryl) comprises heteroaromatic, mono- or polycyclic groups. In addition to the ring carbon atoms, these have 1, 2, 3, 4 or more than 4 heteroatoms as ring members. The heteroatoms are preferably selected from oxygen, nitrogen, selenium and sulfur. The hetaryl groups have preferably 5 to 18, e.g. 5, 6, 8, 9, 10, 11, 12, 13 or 14, ring atoms.

Monocyclic hetaryl groups are preferably 5- or 6-membered hetaryl groups, such as 2-furyl (furan-2-yl), 3-furyl (furan-3-yl), 2-thienyl (thiophen-2-yl), 3-thienyl (thiophen-3-yl), 1H-pyrrol-2-yl, 1H-pyrrol-3-yl, pyrrol-1-yl, imidazol-2-yl, imidazol-1-yl, imidazol-4-yl, pyrazol-1-yl, pyrazol-3-yl, pyrazol-4-yl, pyrazol-5-yl, 3-isoxazolyl, 4-isoxazolyl, 5-isoxazolyl, 3-isothiazolyl, 4-isothiazolyl, 5-isothiazolyl, 2-oxazolyl, 4-oxazolyl, 5-oxazolyl, 2-thiazolyl, 4-thiazolyl, 5-thiazolyl, 1,2,4-oxadiazol-3-yl, 1,2,4-oxadiazol-5-yl, 1,3,4-oxadiazol-2-yl, 1,2,4-thiadiazol-3-yl, 1,2,4-thiadiazol5-yl, 1,3,4-thiadiazol-2-yl, 4H-[1,2,4]-triazol-3-yl, 1,3,4-triazol-2-yl, 1,2,3-triazol-1-yl, 1,2,4-triazol1-yl, pyridin-2-yl, pyridin-3-yl, pyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl and 1,2,4-triazin-3-yl.

Polycyclic hetaryl groups have 2, 3, 4 or more than 4 fused rings. The fused-on rings may be aromatic, saturated or partly unsaturated. Examples of polycyclic hetaryl groups are quinolinyl, isoquinolinyl, indolyl, isoindolyl, indolizinyl, benzofuranyl, isobenzofuranyl, benzothiophenyl, benzoxazolyl, benzisoxazolyl, benzthiazolyl, benzoxadiazolyl, benzothiadiazolyl, benzoxazinyl, benzopyrazolyl, benzimidazolyl, benzotriazolyl, benzotriazinyl, benzoselenophenyl, thienothiophenyl, thienopyrimidyl, thiazolothiazolyl, dibenzopyrrolyl (carbazolyl), dibenzofuranyl, dibenzothiophenyl, naphtho[2,3-b]thiophenyl, naphtha[2,3-b]furyl, dihydroindolyl, dihydroindolizinyl, dihydroisoindolyl, dihydroquinolinyl and dihydroisoquinolinyl.

Substituted hetaryl groups may, depending on the number and size of their ring systems, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —COOR$^{Ar1}$, -NE$^1$E$^2$,
—NR$^{Ar1}$COR$^{Ar2}$, —CONR$^{A1r}$R$^{Ar2}$, —SO$_2$NR$^{Ar1}$R$^{Ar2}$ and —SO$_3$R$^{Ar2}$, where E$^1$ and E$^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and R$^{Ar}$ and R$^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted hetaryl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, NE$^1$E$^2$, —NR$^{Ar1}$COR$^{Ar2}$, —CONR$^{A1r}$R$^{Ar2}$, —SO$_2$NR$^{Ar1}$R$^{Ar2}$, and —SO$_3$R$^{Ar2}$, where E$^1$, E$^2$, R$^{Ar}$ and R$^{Ar2}$ are as defined above.

Fused ring systems can comprise alicyclic, aliphatic heterocyclic, aromatic and heteroaromatic rings and combinations thereof, hydroaromatic joined by fusion. Fused ring systems comprise two, three or more (e.g. 4, 5, 6, 7 or 8) rings. Depending on the way in which the rings in fused ring systems are joined, a distinction is made between ortho-fusion, i.e. each ring shares at least one edge or two atoms with each adjacent ring, and peri-fusion in which a carbon atom belongs to more than two rings. Preferred fused ring systems are ortho-fused ring systems.

When #or * appear in a formula showing a substructure of a compound of the present invention, it denotes the attachment bond in the remainder molecule.

The organic fluorescent colorants B (B1 to B18) are characterized by short luminescence lifetimes. The luminescence lifetime (decay time, emissive lifetime $\tau_0$) is according to the present invention the quotient of the decay time measured (excited-state lifetime $\tau_v$) and the quantum yield of the luminescence, i.e. the emissive lifetime (luminescent lifetime) to is calculated by $\tau_0 = t/QY$. The conditions of the measurement of QY, $\tau_0$ and $\tau_v$ are given in the example part.

Preferably, the luminescence lifetime to of the organic fluorescent colorants B (B1 to B18) is 0.1 ns to 10 ns, more preferably 0.2 ns to 7 ns.

It is a particular advantage of the organic fluorescent colorants B (B1 to B18) to have a very short luminescence lifetime (decay time) and a high quantum yield. Such short luminescent lifetimes support high rates of data transmission.

Detector

The detector is preferably a photodiode (PD) or an array of photodiodes (PDs), more preferably a small area photodiode. Suitable detectors are detectors usually employed in a receiver in an optical data communication system and are known to a person skilled in the art.

In the luminescent collector present in the receiver according to the present invention at least one detector is present, preferably one or two detectors, more preferably one detector.

Receiver

The optical data communication system comprises a receiver (R) to detect at least a part of the modulated electromagnetic radiation emitted by the transmitter (T). The receiver (R) according to the present invention comprises a luminescent collector. At the luminescent collector, the optical signal is collected and converted back to electrical current.

The receiver (R) is usually located to be irradiated by the modulated electromagnetic radiation (optical signal).

The present invention therefore further relates to a receiver comprising at least one organic fluorescent colorant B selected from the group consisting of B1, B2, B3, B4, B5, B7, B8, B11, B12, B13, B14, B15, B16, B17 and B18.

An example for a structure of a suitable receiver is for example mentioned in T. G. Tiecke et al., Optica, Vol. 3, No. 7, July 2016, 787-792 and in US 2017/0346556 A. The detector (corresponding to the luminous collector according to the present invention) in Tiecke et al. contains a spherical bundle of special fluorescent fibers. The bundle, between the size of a golf ball and tennis ball, is able to absorb (blue laser) light from any direction and re-emit it as green light. The green light is funneled to a small receiver that converts the light back to data.

Further examples for suitable receivers are given in US 2017/075191 A1, Collins et al., Optics Letters, Vol. 39, No. 7, Apr. 1, 2014, 1756-1759, Mulyawan et al., IEEE Photonics Technology Letters, Vol. 29, No. 3, Feb. 1, 2017 and Manousiadis et al., Optica, Vol. 3, No. 7, July 2016, 702-706. The receiver according to the present invention comprises a luminescence collector comprising the wavelength shifting materials comprising at least one organic fluorescent colorant B selected from the group consisting of B1, B2, B3, B4, B5, B7, B8, B11, B12, B13, B14, B15, B16, B17 and B18 and a detector, preferably photodiode. The organic fluorescent colorant B selected from the group consisting of B1, B2, B3, B4, B5, B7, B8, B11, B12, B13, B14, B15, B16, B17 and B18 preferably absorbs the modulated electromagnetic radiation emitted by a transmitter (T), i.e. a photon having a wavelength in a first wavelength band, and emits one or more photons having a wavelength in a second wavelength band.

The current signal may be electronically pre-amplified by means of a transimpedance amplifier (TIA), which is optionally present in the receiver. The transimpedance amplifier (TIA) is preferably coupled to the output of the detector.

The receiver (R) usually further comprises a data analyzer that is coupled to the detector, preferably the photodiode, respectively to the optionally present TIA. The data analyzer is adapted to extract data from the detected modulated electromagnetic radiation as it is known in the art. The data analyzer may comprise for example a digital signal processor (DSP) with an analogto-digital converter (ADC) for transformation of the analog current signal into a digital signal and demodulation of the information bits. The demodulated information bits form the output (E). In the case that the output (E) is digital signal, the conversion of the signal to a digital signal is omitted.

Further, an optical filter may be arranged before the detector, preferably the photodiode (PD or array of PDs), to select the modulated electromagnetic radiation emitted by the transmitter (T) in the optical spectrum. In addition, the optical filter greatly reduces the interference from ambient light.

To collect the modulated electromagnetic radiation and concentrate it onto a usually small detector, traditional optics, like focusing elements, as known by a person skilled in the art may be used in addition to the wavelength shifting material. In some embodiments, the focusing element includes a lens.

The receiver therefore may additionally comprise a focusing element focusing and/or otherwise directing the photons having a wavelength in the second wavelength band to a detector. In some embodiments, the focusing element includes a lens. In some embodiments, the focusing element includes a compound parabolic concentrator (CPC). In some embodiments, the focusing element includes a further wavelength shifting material configured to absorb photons having wavelengths in the second wavelength band and emit photons in a third wavelength band. In these embodiments, the detector is configured to detect the photons having wavelengths in the third wavelength band. In the last-mentioned embodiments, the wavelength shifting material may be configured to absorb and emit photons having wavelengths in multiple different (nonoverlapping) wavelength bands. For example, the wavelength shifting material may include one or more types of dyes. Suitable dyes, in addition to organic fluorescent colorants B disclosed in the present application, are known to a person skilled in the art.

The output of the detector is preferably coupled to a transimpedance amplifier (TIA) (as mentioned above) that converts a current signal produced by the detector into a voltage.

From this point on, the receiver resembles a standard receiver topology as known in the art.

The surface of one or more of the components of the optical data communication system according to the present invention, especially the surface of one or more of the components of the receiver and/or one or more components of the transmitter may be coated and/or structured. Suitable structures and coatings are known by a person skilled in the art.

One or more components of the receiver may be for example coated with an antireflection coating and/or a coating for improving properties like demolding, heat resistance, chemical resistance, corrosion resistance, low friction performance, and weather resistance, for example a coating comprising $SiO_2$ and/or fluoropolymers (fluorocoating).

Especially, the fibers in the optical data communication system, especially in the receiver, are in one preferred embodiment coated by a cladding. A cladding is a layer surrounding the fiber core ("coating") with a thickness of typically 1 to 10 percent of the fiber radius. Its refractive index $n_{clad}$ is lower than $n_{core}$. Typical materials for claddings of fibers, especially plastic fibers, are PMMA or fluorinated polymers (FP) (fluoropolymers). Suitable Fluoropolymers are known by a person skilled in the art. An optical fiber may have one cladding or multiple claddings each with a lower refractive index than the underlying one. The claddings provide interfaces with decreasing refractive indices allowing repeated TIR (total internal reflection) which is used to confine and propagate light inside fiber. Fibers with only one cladding are called singleclad fibers while those with additional claddings are referred to as multiclad fibers.

Optical Data Communication System

The present invention further relates to an optical data communication system comprising
  at least one transmitter (T), and
  at least one receiver (R);
wherein at least one organic fluorescent colorant B selected from the group consisting of B1, B2, B3, B4, B5, B7, B8, B11, B12, B13, B14, B15, B16, B17 and B18 is present in the receiver.

A suitable receiver and suitable organic fluorescent colorants B are mentioned above.

In the optical data communication system according to the present invention, preferably an electrical signal is transformed to an optical signal in a transmitter. The modulated optical signal then propagates before arriving at a receiver. In the receiver, the optical signal is transformed back to an electrical signal.

Preferably, the optical data communication system according to the present invention is a free space optical data communication system. In said free space optical data communication system, the modulated optical signal propagates through a free-space path before arriving at a receiver.

The optical data communication system, preferably the free space optical data communication system, according to the present invention is useful in indoor as well as in outdoor environments. The general setup for optical data communication systems, preferably for free space optical data communication systems, for indoor and outdoor environment are known by a person skilled in the art and for example described in "Principles of LED light communications", S. Dimitrov, H. Haas, Cambridge University Press 2015, Chapter 2.1 to Chapter 2.4.

Preferably, the optical data communication system according to the present invention comprises:
  (i) an input (A),
  (ii) a transmitter (T),
  (iii) an optical path (C),
  (iv) a receiver (R), and
  (v) an output (E),
    wherein at least one organic fluorescent colorant B selected from the group consisting of B1, B2, B3, B4, B5, B7, B8, B11, B12, B13, B14, B15, B16, B17 and B18 is present in the receiver of the optical data communication system.

The components (A), (T), (C) and (E) of the optical data communication system according to the present invention are described below and the component (R) is described above.

In FIG. 1 a general example for an optical data communication system is shown. In FIG. 1:
  A is an input (A),
  B is a transmitter (T),
  C is an optical path (C),
  D is a receiver (R), and
  E is an output (E).

Transmitter (T)

In the transmitter an electrical signal is transformed to an optical signal. Generally, transmitters useful in an optical data communication system, especially optical wireless communication (OWC) system, according to the present invention are known to a person skilled in the art. See for example "Principles of LED light communications", S. Dimitrov, H. Haas, Cambridge University Press 2015, Chapter 2.1 to Chapter 2.4.

The transmitter generally comprises a digital signal processor (DSP) with a digital-to-analog converter (DAC), which is employed for the modulation of the digital information bits (input (A)) and their transformation into an analog current signal. The current drives an optical emitter, i.e. a light source (L). In the case that the input (A) is already an analog signal, the conversion of the signal to an analog signal is omitted.

Light Source (L)

The light source (L) is usually either one or more light-emitting diodes (LED) or one or more laser diodes (LD), preferably one or more LEDs.

The light source (L) preferably generates light of a single wavelength. However, it is also possible to employ a light source (L) generating white light. Suitable LEDs and LDs for generating light of a single wavelength or white light are known by a person skilled in the art.

Modulator (M)

Furthermore, the transmitter (T) preferably comprises a modulator (M), preferably being adapted to modulate the first electromagnetic radiation emitted by the radiation source (L1) depending on data to be transmitted.

The modulator (M) is coupled to the input (A). The input (A) transfers the data to be transmitted to the modulator (M) that converts such data into a modulation signal.

For example, a blue LED forming the radiation source (L1) emits blue light as first electromagnetic radiation that is modulated in accordance with the data to be transmitted. Such modulated blue light may converted by a frequency converter (L2) into modulated white light that forms a modulated second electromagnetic radiation.

The second electromagnetic radiation is modulated in correspondence to the modulation of the first electromagnetic radiation, i.e. the modulation used for data transmission is maintained by the frequency converter (L2).

Optical carrier modulation and demodulation are usually achieved through intensity modulation for example with direct detection (IM/DD). The desired waveform is modulated onto the instantaneous power of the optical carrier, and the detector generates a current proportional to the received instantaneous power; that is, only the intensity of the optical wave is detected, and there is no frequency or phase information (as for example mentioned in H. Elgala et al., Indoor optical wireless communication: Potential and state-of-the-art, TOPICS IN OPTICAL COMMUNICATIONS, Article in IEEE Communications Magazine October 2011).

Suitable modulation technics are for example also described in H. Elgala et al., Indoor optical wireless communication: Potential and state-of-the-art, TOPICS IN OPTICAL COMMUNICATIONS, Article in IEEE Communications Magazine October 2011:

High average power efficiency can be achieved by employing single-carrier (SC) pulsed modulation techniques in which the time-dependent characteristics of the optical pulse is used to convey information. Among several techniques, two schemes are widely used, on-off keying (OOK) and pulse-position modulation (PPM). OOK is one of the oldest formats and is the simplest in terms of hardware implementation and integration. It also exhibits a good compromise between complexity and performance. In PPM, an optical pulse is transmitted in one out of S slots per symbol time. The occupied slot position denotes the bit combination conveyed by the symbol. PPM expands the signal bandwidth compared to OOK, but pro-vides higher power efficiency. Besides, the use of PPM imposes more system complexity than OOK since both slotand symbol-level synchronizations, critical to system performance, are required at the receiver. Multiple-Subcarrier Modulation MSM techniques for OW (optical wireless) links are also generally suitable. OFDM is a practical realization of multiple-subcarrier modulation (MSM). OFDM is a parallel data transmission scheme in which high data rates can be achieved by transmitting orthogonal subcarriers. OFDM systems do not require complex channel equalizers, the timevarying channel can easily be estimated using frequency-domain channel estimation, and adaptive modulation can be applied based on the uplink/downlink (UL/DL) requested data rates and quality of service (QoS). Also, the possibility to combine OFDM with any multiple access scheme makes it an excellent preference for indoor OW applications.

Preferably the first electromagnetic radiation is modulated. Such modulation may be implemented by control of the radiation source. According to another embodiment, the first electromagnetic radiation may also be modulated after this radiation has been emitted by the radiation source.

Input (A) and output (E)

Input (A) and output (E) are usually information to be transferred, in the form of electrical digital or analog signals. Usually, the information to be transferred is in form of digital information bits.

Optical path (C)

The optical path (C) may in general be any optical path suitable for optical communication known by a person skilled in the art. Preferably, the optical path (C) is the free space, i.e. an optical wireless channel.

The optical path is in an indoor and/or in an outdoor environment. Preferably, the optical path is in an indoor environment.

Outdoor optical wireless communications can be divided into ultra long-range free space links, medium-/long range links and short-range links. The ultra long-range free space links are for example used for networking a constellation of satellites. The medium-/long range links are for example used for inter-building networks or mobile backhaul. The short-range links are used for example car-to-car communications.

Indoor optical wireless communication can be divided into short-range links and ultra-short range links. Short range links are for example optical WLAN, in-flight communications, car-toinfrastructure communications, indoor positioning and wireless automation. Indoor optical wireless communication is applied for example in homes, offices and warehouses ranging from TV control to IrDA (Infrared Data Association) ports on portable electronic devices such as mobile phones, digital cameras, personal digital assistants and laptops. Ultra short range links are for example inter-chip interconnections and in-body networks.

More preferably, the optical path is the free space in an indoor environment.

Further Optional Components

In addition, the optical data communication system according to the present invention may further comprise an optical system in order to further shape the modulated electromagnetic radiation emitted by the transmitter (T). For example, an optical amplifier lens, a collimator, and/or a diffusor can be employed to concentrate or broaden the modulated electromagnetic radiation.

EXAMPLES

The following figures and examples serve to illustrate the invention and should not be interpreted as limiting.

The following organic fluorescent colorants (dyes) 1 to 25 were tested in the examples.

Dye 1:

(colorant from group B13)

N,N'-bis(2,6-diisopropylphenyl)-1,6,7,12-tetra-phenoxyperylene-3,4:9,10-tetracarboximide Dye 1 can be purchased from, e.g. from BASF SE.

Dye 2:

(colorant from group B12)

diisobutyl 4,10-dicyanoperylene-3,9-dicarboxylate mixture with diisobutyl 4,9-dicyanoperylene3,10-dicarboxylate

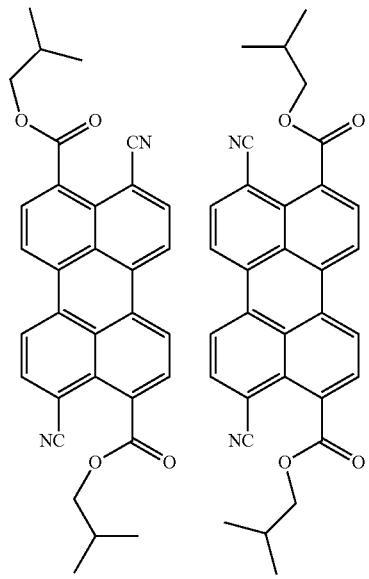

Dye 2 can be purchased, e.g. from BASF SE.

Dye 3:

(colorant from group B8)

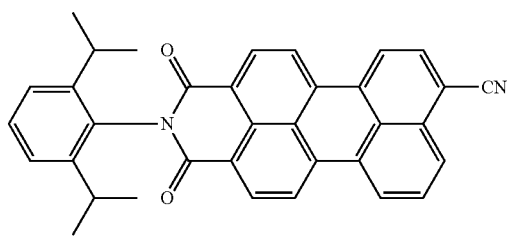 [SMILES: CC(C)c1cccc(C(C)C)c1N1C(=O)c2ccc3c4cccc5c(C#N)ccc(c6ccc(c2c36)C1=O)c54]

Dye 3 can be purchased, e.g. from BASF SE
Dye 4:
N,N'-Bis(2,6-diisopropylphenyl)-3,4,9,10-perylenetetrac-
arboxylic diimide
(colorant from group B8)

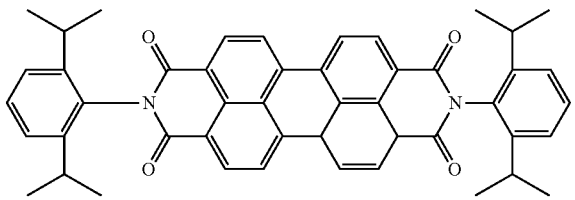 [SMILES: CC(C)c1cccc(C(C)C)c1N1C(=O)c2ccc3c4c(ccc(c24)C1=O)C1C=CC2C(=O)N(c4c(C(C)C)cccc4C(C)C)C(=O)c4ccc-3c1c42]

Dye 4 can be purchased, e.g. from BASF SE.
Dye 5:
(colorant from group B13)

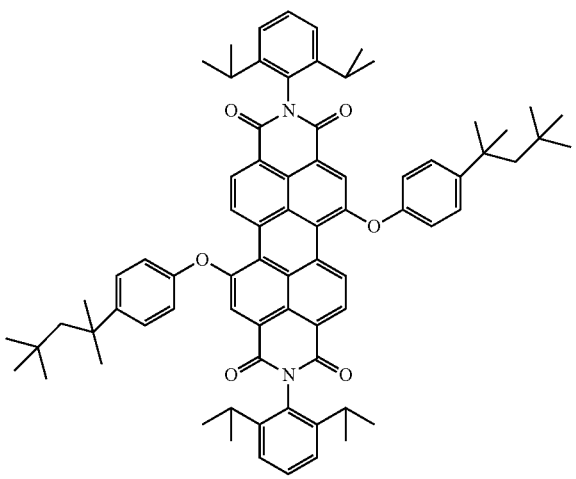 [SMILES: CC(C)c1cccc(C(C)C)c1N1C(=O)c2ccc3c4c(Oc5ccc(C(C)(C)CC(C)(C)C)cc5)cc5c6c(ccc(c7c(Oc8ccc(C(C)(C)CC(C)(C)C)cc8)cc(c2c37)C1=O)c64)C(=O)N(c1c(C(C)C)cccc1C(C)C)C5=O]

Dye 5 can be prepared in analogy to the methods described in EP 3072887.
Dye 6:
(colorant from aroup B13)

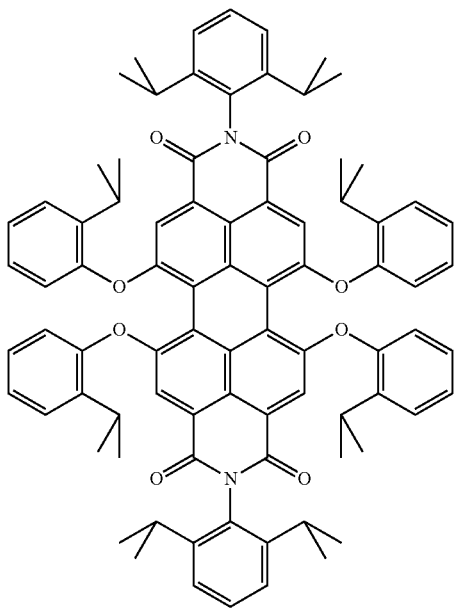 [SMILES: CC(C)c1ccccc1Oc1cc2c3c(cc(Oc4ccccc4C(C)C)c4c5c(Oc6ccccc6C(C)C)cc6c7c(cc(Oc8ccccc8C(C)C)c(c1c34)c75)C(=O)N(c1c(C(C)C)cccc1C(C)C)C6=O)C(=O)N(c1c(C(C)C)cccc1C(C)C)C2=O]

A mixture of 2.2.g (2.6 mmol) of 1,6,7,12-tetrachloro-N,N'-2,6-diisopropylphenylperylene3,4,9,10-tetracarboxylic acid diimide, 4.25 g (31.2 mmol) of 2-isopropylphenol, 2.52 g (18.2 mmol) of $K_2CO_3$ and 170 mL of N-methylpyrrolidone were heated to 90° C. for 17 hours. Afterwards the mixture was heated to 110° C. for 10 hours. Further 2.12 g (15.6 mmol) of 2-isopropylphenol and 1.26 g of $K_2CO_3$ were added and heating continued for 23 hours. Further 2.12 g (15.6 mmol) of 2-isopropylphenol and 1.26 g of $K_2CO_3$ were added and heating continued for 6 hours. The product was precipitated with 1 L of diluted HCl. After extraction with dichloromethane 7.5 g of a liquid crude material was obtained which was further purified by column chromatography using toluene dicholoromethane. 0.28 g of pure title compound were isolated.

$R_f$ (petroleum ether/ethylacetate 8:1)=0.3.

Lambda max emission: 616 nm (in polycarbonate).

Dye 7

(colorant from group B11)

diisobutyl perylene-3,9-dicarboxylate mixture with diisobutyl perylene-3,10-dicarboxylate

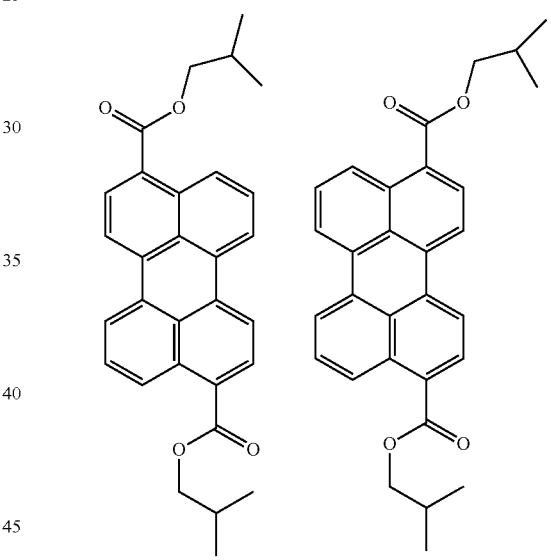

Dye 7 can be purchased, e.g. from BASF SE.
Dye 8:
(colorant from group B5)

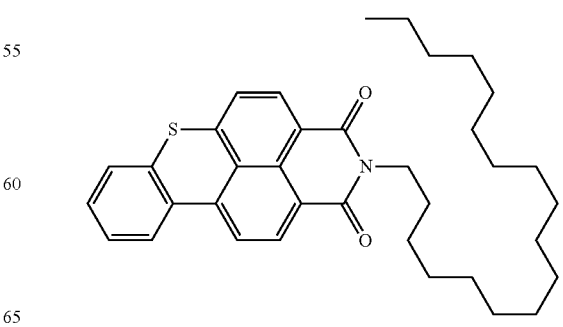

Dye 8 can be prepared as described in WO 2014/131628.

Dye 9:

(colorant from group B7)

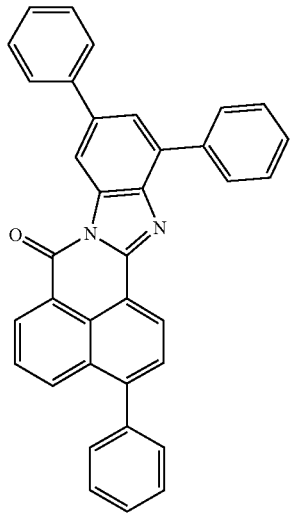 [SMILES: O=c1c2cccc3c(-c4ccccc4)ccc(c32)c2nc3c(-c4ccccc4)cc(-c4ccccc4)cc3n12]

Dye 9 can be prepared as described in example 10 of WO 2012/168395.

Dye 10:

(colorant from group B3)

Mixture of compounds (10.a) and (10.b)

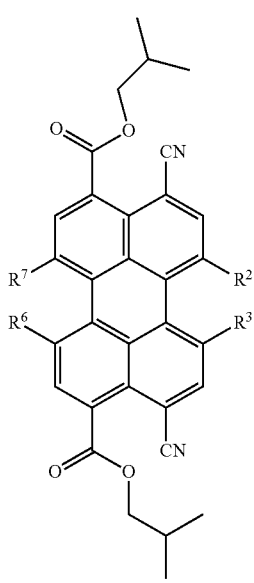

(10.a)

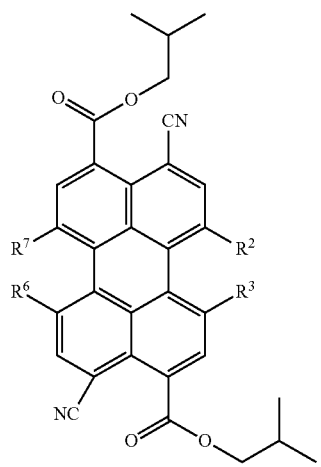

(10.b)

in which three of the $R^2$, $R^3$, $R^6$ and $R^7$ substituents are hydrogen; and one of the $R^2$, $R^3$, $R^6$ and $R^7$ substituents is cyano.

Dye 10 can be prepared as described in example 3 of WO 2015/169935.

Dye 11:

(colorant from group B1)

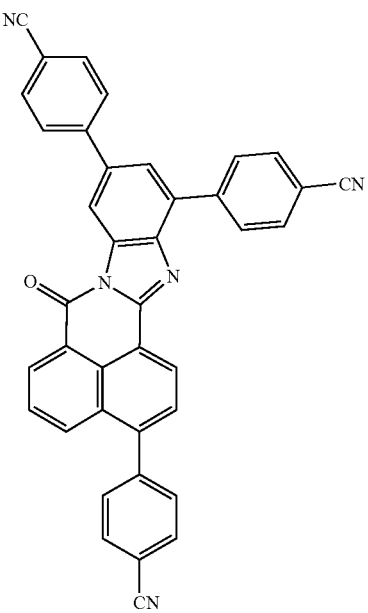 [SMILES: N#Cc1ccc(-c2cc(-c3ccc(C#N)cc3)c3nc4c5ccc(-c6ccc(C#N)cc6)c6cccc(c(=O)n4c3c2)c65)cc1]

11.1 Preparation of

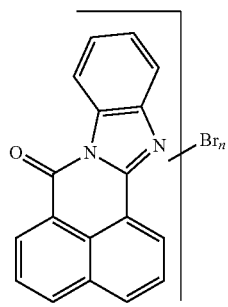

n = 3

Following the procedure described in example 6 of WO 2012/168395, a mixture of the title compound and of the corresponding mono- and di- and tetrabrominated compounds were obtained. The tribrominated compound constitutes about 40% by weight.

11.2 Preparation of the Title Compound

A mixture of 2.5 g (0.005 mol) g of the tribrominated compound of example 11.1, 4.41 g (0.03 mol) of 4-cyanophenylboronic acid, 2.07 g (0.015 mol) of potassium carbonate dissolved in 5 mL of water and 0.174 g (0.00015 mol) of tetrakistriphenylphosphinepalladium(0) was heated at 90° C. for 4 hours. After cooling to room temperature, the residue was filtered off, washed with methanol and water and dried in vacuum to give 2.29 g of a crude product. The compound was purified by column chromatography (silica gel; toluene/ethyl acetate 20:1) to afford 0.92 g (32%) of a yellow solid.

$R_f$(toluene/ethyl acetate 10:1)=0.3.

Lambda max emission=508 nm (polycarbonate).

Dye 12:

(colorant from group B2)

mixture of

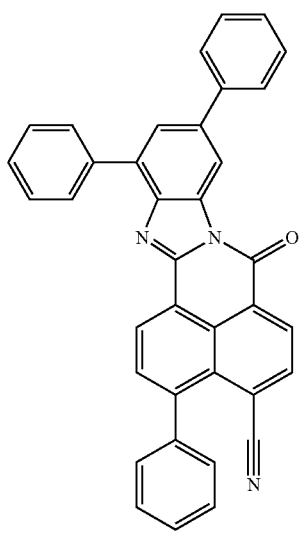

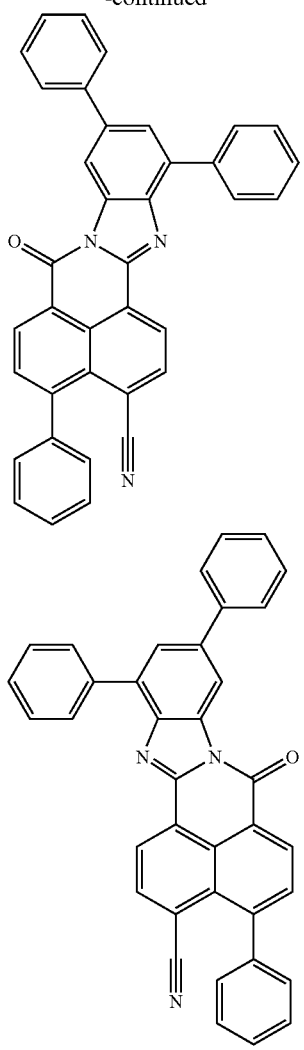

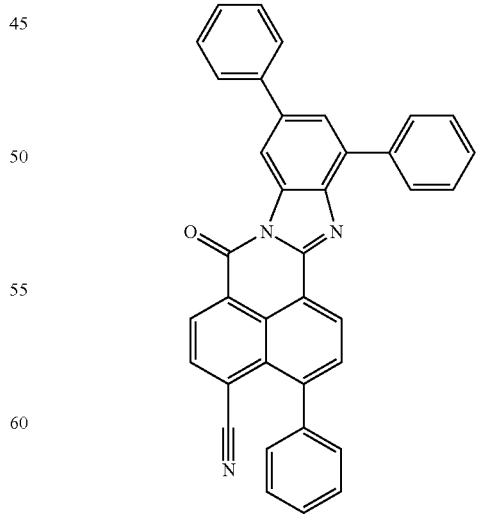

Dye 12 can be prepared as described in example 3 of WO 2015/019270.

Dye 13:
(colorant from group B4)

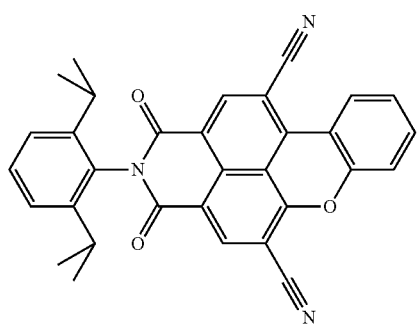 [SMILES: CC(C)c1cccc(C(C)C)c1-n1c(=O)c2cc(C#N)c3oc4ccccc4c4c(C#N)cc(c1=O)c2c34]

Dye 13 can be prepared as described in example 1 of WO 2016/151068.

Dye 14:
(colorant from group B13)

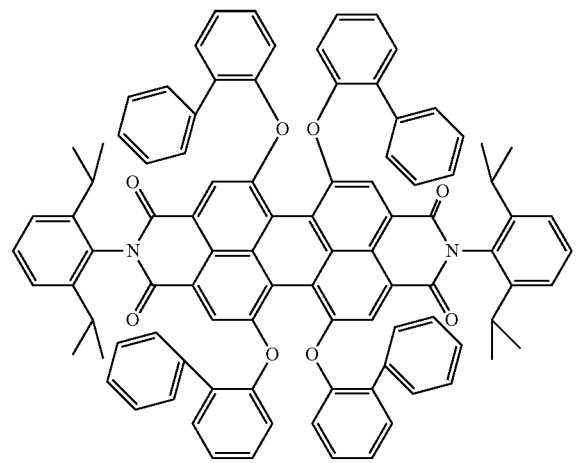 [SMILES: CC(C)c1cccc(C(C)C)c1N1C(=O)c2cc(Oc3ccccc3-c3ccccc3)c3c4c(Oc5ccccc5-c5ccccc5)cc5c6c(cc(Oc7ccccc7-c7ccccc7)c(c7c(Oc8ccccc8-c8ccccc8)cc(c2c37)C1=O)c64)C(=O)N(c1c(C(C)C)cccc1C(C)C)C5=O]

A mixture of 5 g (5.9 mmol) of N,N'-(2,6-diisopropylphenyl)-1,6,7,12,-tetrachloroperylenetetracarboxylic diimide, 4.23 g of (24.9 mmol) biphenyl-2-ol, 138.21 g (16.9 mmol) of potassium carbonate and 30 mL of N-methyl-2-pyrrolidone (NMP) were stirred at room temperature for 24 h and then for 48 h at 115° C. After cooling to 80° C. the reaction mixture was added dropwise to a mixture of 10 mL of acetic acid and 20 mL of water within 15 min, cooled to room temperature over a period of 2 h and then filtered. The residue was washed with 300 mL of a mixture of ethanol/water (1:1) and then with 600 mL of a mixture of ethanol/water/NMP (4:4:1). The residue was dissolved in a mixture of 35 mL of ethanol and 5 mL of NMP under reflux, then cooled to room temperature and separated to obtain 5.6 g (62%) of a red dye which was purified by chromatography using cyclohexane/ethyl acetate. The yield was 2.06 g (23%). $R^f$ (cylohexane/ethyl acetate 10:1)=0.29.

Dye 15:
(colorant from group B14)

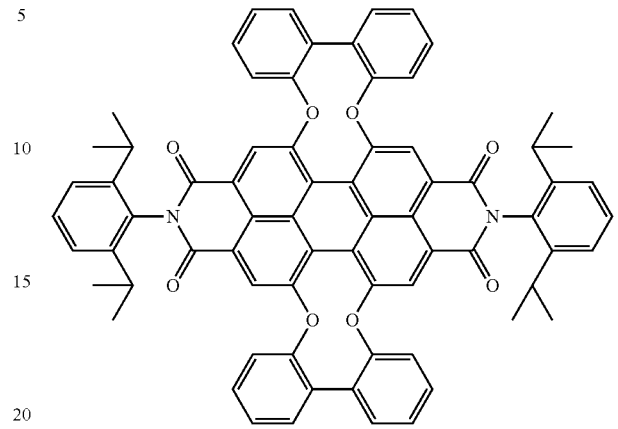

Dye 15 can be prepared as described in example 1 of WO 2017/121833 A1.

Dye 16:
(colorant from group B5)

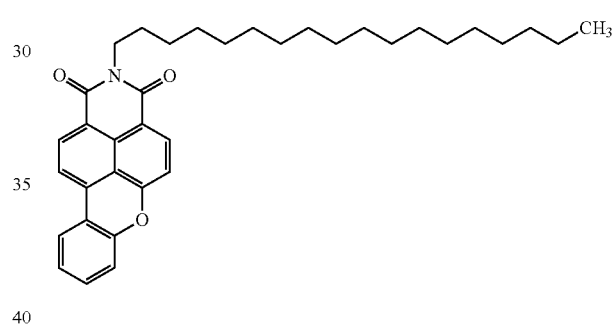

Dye 16 can be prepared in analogy to the compounds described in WO 2014/131628.

Dye 17:
(colorant from group B4)

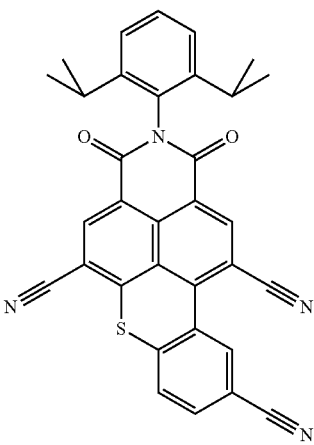 [SMILES: CC(C)c1cccc(C(C)C)c1-n1c(=O)c2cc(C#N)c3sc4ccc(C#N)cc4c4c(C#N)cc(c1=O)c2c34]

Dye 17 can be prepared as described in example 6 of WO 2016/151068.

Dye 18:
(colorant from group B4)

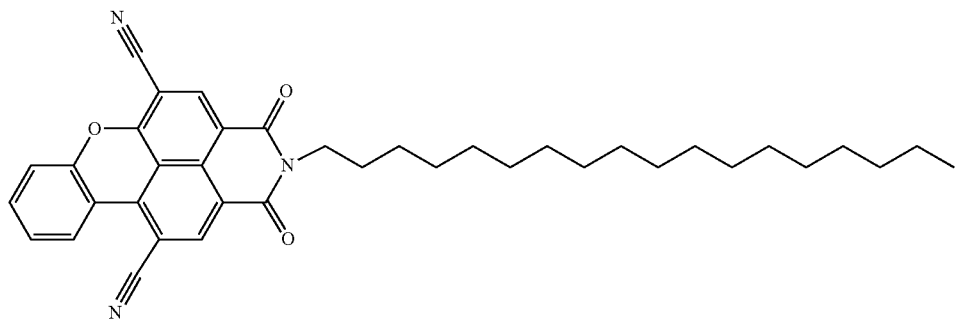 [SMILES: CCCCCCCCCCCCCCCCCCn1c(=O)c2cc(C#N)c3oc4ccccc4c4c(C#N)cc(c1=O)c2c34]

Dye 18 can be prepared as described in example 5 of WO 2016/151068.

Dye 19:
(colorant from group B1)
mixture of compounds

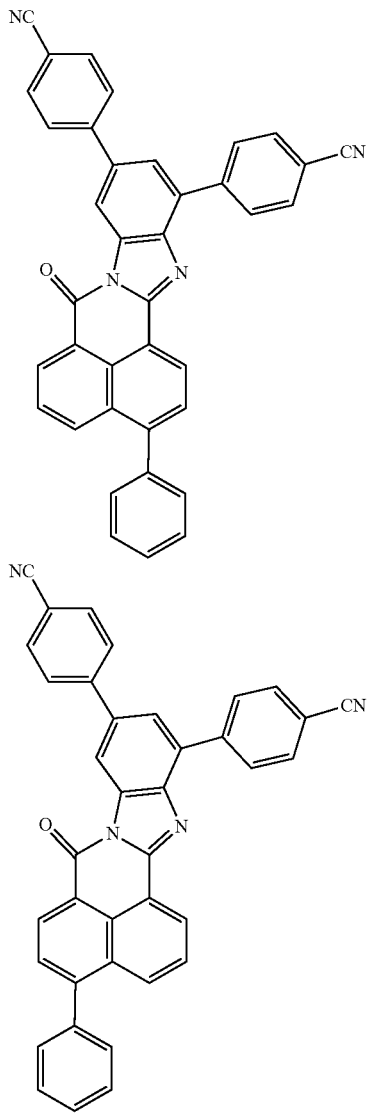

19.1 2,4-Dibromo-6-nitroaniline

A mixture of 10 g (0.072 mol) of 2-nitroaniline, 100 mL of glacial acid, 14.5 mL (0.29 mol; 46.4 g) of bromine were heated at about 45° C. After 2 hours, further 3.0 mL (0.06 mol) of bromine were added and the reaction mixture was stirred for two further hours. Excess bromine was outgassed. To the reaction mixture water was added. The precipitate was sucked off, washed with water and dried to give 21.0 g (98%) of a yellow solid.

$R_f$(toluene/etyl acetate 10:1)=0.8.

19.2 4-[4-Amino-3-(4-cyanophenyl)-5-nitro-phenyl]benzonitrile A mixture of 367 mL of toluene, 19.45 g (0.066 mol) of the compound of 19.1, 21.72 g (0.242 mol) of 4-cyanophenylboronic acid, 31.6 g (0.114 mol) of potassium carbonate dissolved in 50 mL of water, 6.02 g (0.0066 mol) of tris(dibenzylideneacetone)dipalladium and 26 mL (0.0264 mol) of a tri-tert-butylphosphine solution in toluene were heated under nitrogen at 80 to 90° C. for 3 hours. The reaction mixture was cooled to room temperature. The precipitate was filtered, washed with water and dried to 21.6 g (96%) of a yellow solid.

$R_f$(toluene/ethyl acetate 10:1)=0.29.

19.3 4-[3,4-Diamino-5-(4-cyanophenyl)phenyl]benzonitrile

A mixture of 19.9 g (0.0584 mol) of the compound of 19.2, 400 mL of ethanol, 100 mL of N-methylpyrrolidone and 44.0 g (0.2328 mol) of zinc(II) chloride were heated under reflux at 85° C. for 2 hours. After cooling to room temperature and filtration, ethanol was removed from the filtrate by distillation. The title compound was precipitated by addition of water and ethanol. The precipitate was filtered off, washed with hot water and dried in vacuum to give 25.9 g (143%) of a yellow compound containing inorganic salts.

$R_f$(toluene/ethyl acetate 10:1)=0.1.

19.4 Mixture of

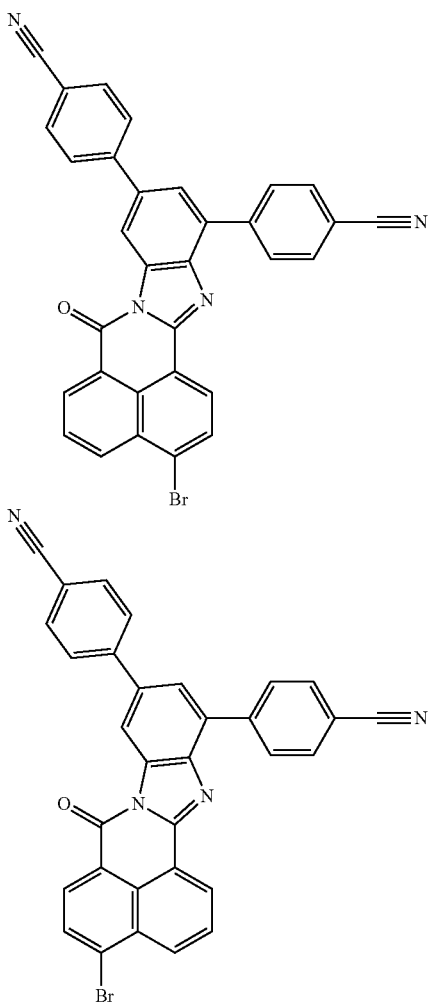

A mixture of 250 mL of quinoline, 8.8 g (0.032 mol) of 4-bromo-1,8-naphthalic anhydride, 11.0 g (0.032 mol; 90% purity) of the mixture from 19.3, 6.0 g (0.032 mol) of zinc acetate was heated at 130° C. for 2 hours under nitrogen. After cooling to room temperature, 200 mL of methanol were added. The mixture was stirred over night followed by filtration. The residue was washed with methanol and water. 11.45 g (65%) of a yellow precipitate were obtained.

$R_f$(toluene/ethyl acetate 10:1)=0.5.

19.5 Mixture of the Title Compounds

A mixture of 11.0 g (0.02 mol) of the mixture of compounds from 19.4, 2.68 g (0.02 mol) of phenylboronic acid, 5.52 g (0.04 mol) of potassium carbonate, 30 mL of water, 250 mL of toluene and 0.23 g (0.0002 mol) of tetrakistriphenylphosphinepalladium was heated at 90° C. for 2 hours. After cooling to room temperature, the residue was filtered off, washed with methanol and water and dried in vacuum to give 10.5 (95%) of a yellow-black residue. This residue was dissolved in 400 mL of toluene by heating under reflux, 2.0 g of activated charcoal were added, the mixture was stirred for 30 minutes followed by hot filtration. The filtrate was allowed to cool up over night and the precipitate was filtered off. Yield: 2.3 g of the title compound which is free of palladium.

$R_f$(toluene/ethyl acetate 10:1)=0.5.

Lambda max emission: 519 nm (in polycarbonate).

Dye 20:

(colorant from group B5)

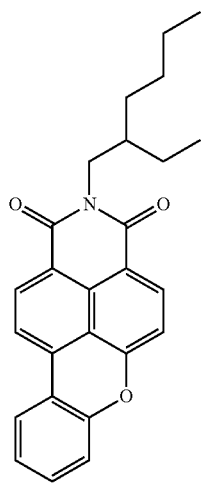 [SMILES: CCCCC(CC)Cn1c(=O)c2ccc3oc4ccccc4c4ccc(c1=O)c2c34]

Dye 20 can be prepared as described in WO 2014/131628.

Dye 21:

(colorant from group B15)

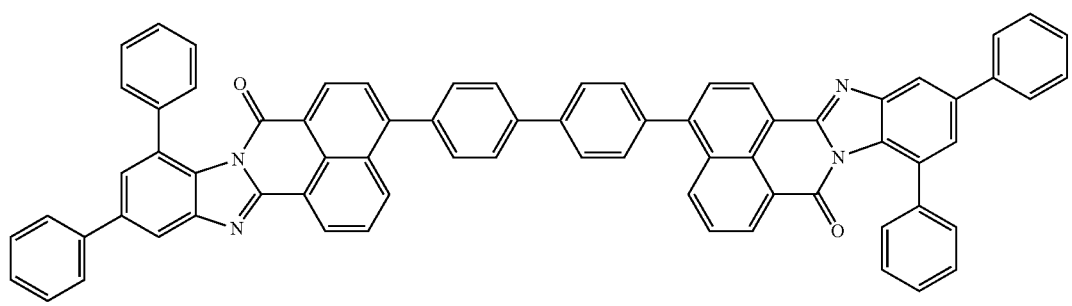 [SMILES: O=c1c2ccc(-c3ccc(-c4ccc(-c5ccc6c7c5cccc7c(=O)n5c6nc6cc(-c7ccccc7)cc(-c7ccccc7)c65)cc4)cc3)c3cccc(c32)c2nc3cc(-c4ccccc4)cc(-c4ccccc4)c3n12]

Dye 21 can be prepared in analogy to the methods described in WO 2012/168395.
Dye 22:
(colorant from group B7)
Mixture of
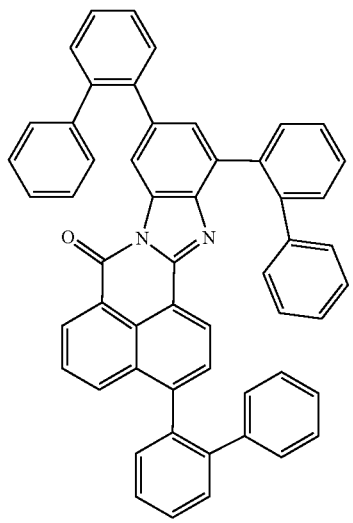
and
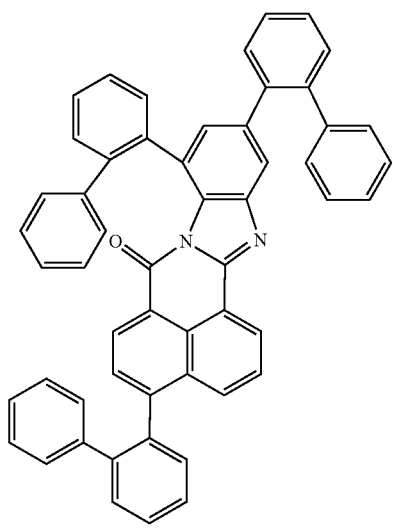
Dye 22 can be prepared as described in WO 2012/168395.
Dye 23:
(colorant from group B1)
Mixture of
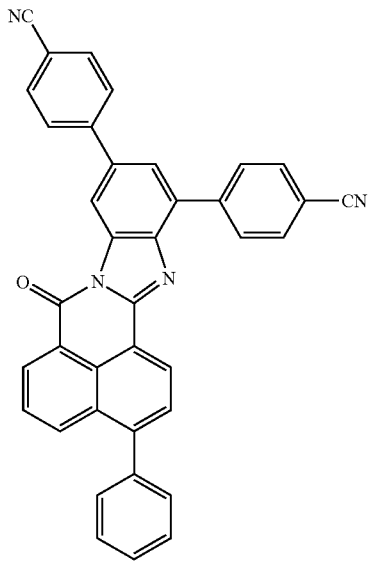
and
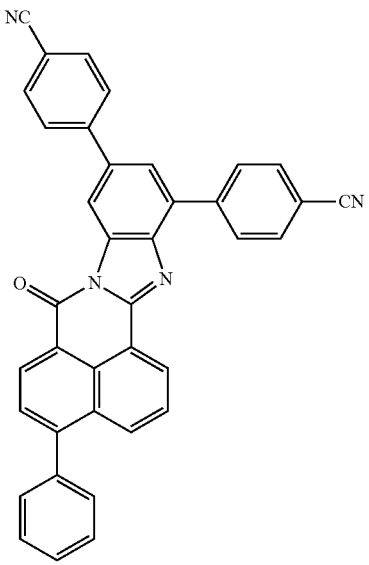
Dye 23 can be prepared as described in European patent application 17151931.7
Dye 24:
(colorant from group B16)

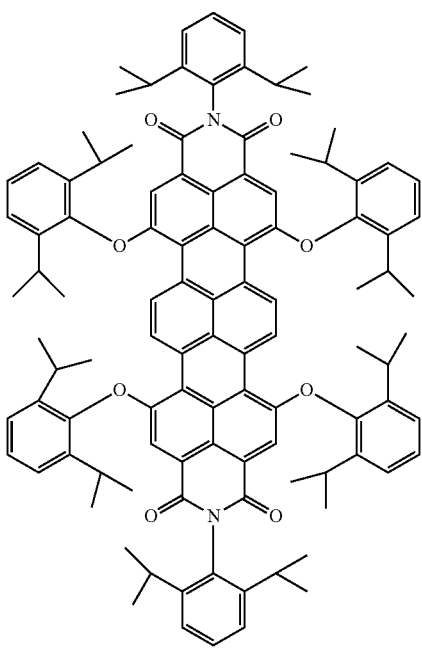 [SMILES: CC(C)c1cccc(C(C)C)c1Oc1cc2c3c(cc(Oc4c(C(C)C)cccc4C(C)C)c4c5ccc6c7c(Oc8c(C(C)C)cccc8C(C)C)cc8c9c(cc(Oc%10c(C(C)C)cccc%10C(C)C)c(c%10ccc(c1c34)c5c%106)c97)C(=O)N(c1c(C(C)C)cccc1C(C)C)C8=O)C(=O)N(c1c(C(C)C)cccc1C(C)C)C2=O]

Dye 24 can be prepared as described in example 2 of WO 2007/006717.

Dye 25:

(colorant from group B16)

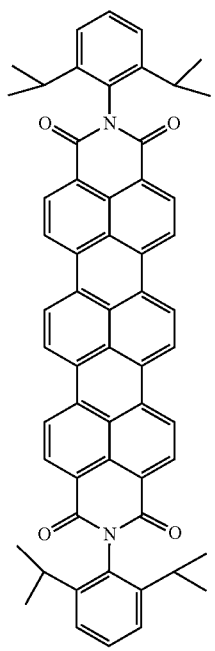 [SMILES: CC(C)c1cccc(C(C)C)c1N1C(=O)c2ccc3c4ccc5c6ccc7c8c(ccc(c9ccc(c%10ccc(c2c3%10)C1=O)c4c59)c86)C(=O)N(c1c(C(C)C)cccc1C(C)C)C7=O]

Dye 25 can be prepared as described in Chem. Eur. J. 1997, 3, S. 219-225.

Dye 26:

(colorant from group B17)

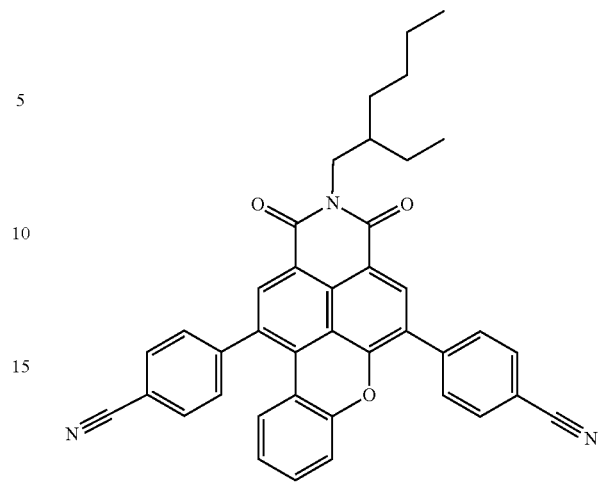

Dye 26 can be prepared as described in EP17208597.9.

Dye 27:

(colorant from group B18)

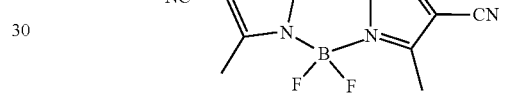

Dye 27 can be prepared as described in EP18179281.3.

Properties of the dyes 1 to 27 (organic fluorescent colorants B)

Production of analysis samples comprising the dyes:

The organic fluorescent colorants (dyes) synthesized according to the examples were used to produce wavelength shifting materials. For this purpose, they were incorporated as described hereinafter into a matrix composed of a polymer. The polymer used was PMMA (Plexiglas® 6N from Evonik), polystyrene (PS168 N from BASF) and PC (Macrolon® 2808 from Bayer). About 2.5 g of polymer and 0.008%-0.06% by weight of the dye was dissolved in about 5 mL of methylene chloride, and 0.5% by weight of $TiO_2$ (Kronos 2220) was dispersed therein, based in each case on the amount of polymer used. The solution/dispersion obtained was coated onto a glass surface using an applicator frame (wet film thickness 400 μm). After the solvent had dried off, the film was detached from the glass and dried in a vacuum drying cabinet at 50° C. overnight. Two circular film pieces having a diameter of 15 mm were punched out of each film of thickness 80 to 85 μm, and these served as analysis samples.

Measurement of Quantum Yields

Fluorescence quantum yields (QY) of the analysis samples were measured with the C9920-02 quantum yield measuring system (from Hamamatsu). This was done by illuminating each of the samples with light of 445 to 455 nm in an integrating sphere (Ulbricht sphere). By comparison with the reference measurement in the Ulbricht sphere without sample, the unabsorbed fraction of the excitation light and the fluorescent light emitted by the sample are determined by means of a CCD spectrometer. Integration of the intensities of the spectrum of the unabsorbed excitation light and of that of the emitted fluorescent light gives the degree of absorption and fluorescence intensity, respectively and thus the fluorescence quantum yield of each sample can be calculated.

Determination of the excited-state lifetime $\tau_v$ and the emissive lifetime $\tau_0$ The excited-state lifetime ($\tau_v$) of the prepared thin films is measured by exciting the thin films with a pulsed diode laser with an excitation wavelength of 450 nm (Picoquant) operated at 10 kHz (85 µW, 105 µW/cm$^2$) and detecting the emission with time correlated single photon counting (TCSPC). This wavelength was chosen in order to be close to the lighting application, where a blue LED with 450 nm emission maximum is used. A mono-exponential fit to the decay curve was used to determine the excited-state lifetime ($\tau_v$).

The emissive lifetime to is calculated by $\tau_0=\tau_v/QY$. This value is important to compare between different materials as only radiative decay processes are considered here.

The following table summarizes the results. Excitation was at 450 nm, the decay rate was determined at the emission maximum which is given in the second column. Some of the materials were measured in different matrices, and some samples were also measured without adding TiO$_2$ into the film to see the influence of the scattering agent.

| wavelength shifting material | Emission maximum/ nm[4] | $\tau_v$/ns[2] | $\tau_0$/ns[3] | QY/%[1] |
|---|---|---|---|---|
| 0.03% dye 1 in PC | 606 | 6.0 | 6.8 | 88.7 |
| 0.03% dye 1 in PS | 600 | 5.9 | 6.5 | 90.5 |
| 0.03% dye 2 in PS without TiO$_2$ | 520 | 5.2 | | |
| 0.03% dye 2 in PS | 520 | 4.0 | 4.3 | 92.7 |
| 0.03% dye 3 in PS without TiO$_2$ | 520 | 6.0 | 7.1 | 83.6 |
| 0.03% dye 3 in PS | 520 | 4.7 | 5.3 | 88.5 |
| 0.03% dye 4 in PS | 540 | 5.1 | 5.5 | 91.9 |
| 0.03% dye 4 in PS | 576 | 4.9 | 5.3 | 91.9 |
| 0.03% dye 4 in PMMA | 540 | 5.1 | 5.4 | 94.8 |
| 0.03% dye 4 in PMMA | 576 | 4.9 | 5.2 | 94.8 |
| 0.03% dye 4 in PMMA | 618 | 5.0 | 5.3 | 94.8 |
| 0.04% dye 5 in PC | 576 | 5.3 | | — |
| 0.03% dye 5 in PS | 566 | 4.9 | 5.2 | 94.3 |
| 0.015% dye 6 in PS | 600 | 5.3 | 5.5 | 95.2 |
| 0.05% dye 7 in PMMA | 520 | 6.0 | 6.4 | 93.2 |
| 0.03% dye 7 in PC | 540 | 5.6 | 6.0 | 92.8 |
| 0.02% dye 7 in PS | 540 | 5.4 | 5.8 | 92.7 |
| 0.02% dye 8 in PMMA | 525 | 6.7 | 7.6 | 88.6 |
| 0.02% dye 9 in PS | 520 | 4.9 | 5.7 | 85.8 |
| 0.02% dye 9 in PS without TiO$_2$ | 520 | 6.2 | | |
| 0.01% dye 10 in PMMA | 506 | 5.5 | 6.1 | 90.0 |
| 0.01% dye 10 in PMMA | 530 | 5.8 | 6.4 | 90.0 |
| 0.01% dye 10 in PC | 508 | 5.2 | 5.8 | 89.3 |
| 0.01% dye 10 in PC | 533 | 5.3 | 6.0 | 89.3 |
| 0.01% dye 10 in PS | 534 | 5.3 | 5.9 | 89.9 |
| 0.01% dye 10 in PS | 506 | 5.2 | 5.8 | 89.9 |
| 0.04% dye 11 in PC | 560 | 4.7 | 5.3 | 87.9 |
| 0.04% dye 11 in PS | 560 | 4.6 | 5.3 | 86.6 |
| 0.01% dye 12 in PS | 550 | 5.3 | 6.0 | 87.4 |
| 0.01% dye 12 in PC | 540 | 5.3 | 6.1 | 86.7 |
| 0.01% dye 13 in PS | 540 | 7.1 | 7.8 | 90.4 |
| 0.01% dye 13 in PC | 540 | 7.1 | 7.7 | 91.8 |
| 0.03% dye 14 in PC | 560 | 6.5 | 6.9 | 94.7 |
| 0.03% dye 14 in PS | 560 | 6.4 | 6.8 | 95.2 |
| 0.035% dye 15 in PC | 573 | 5.8 | 6.0 | 97.4 |
| 0.035% dye 15 in PC | 610 | 6.0 | 6.1 | 97.4 |
| 0.035% dye 15 in PS | 610 | 6.0 | 6.0 | 99.4 |
| 0.035% dye 15 in PS | 573 | 6.0 | 6.0 | 99.4 |
| 0.0176% dye 16 in PC | 530 | 5.4 | 5.7 | 94.7 |
| 0.012% dye 16 in PS | 525 | 5.2 | 5.6 | 93.6 |
| 0.0192% dye 17 in PC | 535 | 7.5 | 9.0 | 82.9 |
| 0.017% dye 17 in PS | 535 | 7.3 | 8.8 | 83.4 |
| 0.123% dye 18 in PC | 502 | 7.1 | 7.6 | 93.7 |
| 0.123% dye 18 in PC | 532 | 7.6 | 8.1 | 93.7 |

| wavelength shifting material | Emission maximum/ nm[4] | $\tau_v$/ns[2] | $\tau_0$/ns[3] | QY/%[1] |
|---|---|---|---|---|
| 0.022% dye 19 in PC | 560 | 4.6 | 5.3 | 87.4 |
| 0.018% dye 19 in PS | 560 | 4.4 | 5.0 | 88.2 |
| 0.012% dye 20 in PS | 525 | 5.4 | 5.7 | 93.8 |
| 0.016% dye 20 in PC | 525 | 5.5 | 5.8 | 94.3 |
| 0.008% dye 21 in PC | 540 | 4.7 | 6.0 | 78.5 |
| 0.034% dye 22 PC | 520 | 5.5 | 6.4 | 86.3 |
| 0.02% dye 23 PC | 520 | 4.4 | 4.7 | 92.1 |
| 0.032% dye 26 PC | 509 | 7.8 | 8.3 | 94.9 |
| 0.05% 27 in PC | 532 | 5.7 | 6.4 | 89.0 |

[1] Fluorescence quantum yield
[2] Excited-state lifetime
[3] Emissive lifetime
[4] Emission maximum of the dye In addition, for the dyes 24 and 25 excitation was done at 635 nm, as they absorb very little at 450 nm. The following table summarizes the results.

| wavelength shifting material | Emission maximum/ nm[4] | $\tau_v$/ns[2] | $\tau_0$/ns[3] | QY/%[1] |
|---|---|---|---|---|
| 0.04% dye 24 in PS | 715 | 4.2 | 7.5 | 55.5 |
| 0.06% dye 24 in PC | 715 | 3.9 | 10.9 | 35.2 |
| 0.041% dye 25 in PC | 688 | 4.4 | 10.5 | 42.0 |
| 0.041% dye 25 in PS | 680 | 4.1 | 8.0 | 51.0 |
| 0.041% dye 25 in PS | 720 | 4.3 | 8.5 | 51.0 |

[1] Fluorescence quantum yield
[2] Excited-state lifetime
[3] Emissive lifetime
[4] Emission maximum of the dye Photostability of the Dyes The following data is measured with blue light illumination (450 nm) at 120 mW/cm$^2$. Example 24 and 25 are illuminated with white light at 100 mW/cm$^2$ as their absorption at 450 nm is negligible. T80 in days is the time that the product of fluorescence and absorption decreases to 80% of its initial value. The concentration of the dyes is chosen in a way so that they absorb about 50% of incoming blue light.

TABLE 2

| wavelength shifting material | T80/days |
|---|---|
| 0.036% dye 1 in PC | 252 |
| 0.01% dye 2 in PC in N$_2$ atmosphere | 9 |
| 0.04% dye 4 in PC | 32 |
| 0.03% dye 6 in PC | 255 |
| 0.02% dye 8 in PC | 8 |
| 0.015% dye 9 in PC | 20 |
| 0.04% dye 11 in PC | 15 |
| 0.01% dye 12 in PC | 24 |
| 0.02% dye 13 in PC | 6 |
| 0.048% dye 14 in PC | 200 |
| 0.04% dye 15 in PC | 211 |
| 0.018% dye 16 in PC | 3 |
| 0.019% dye 17 in PC | 8 |
| 0.123% dye 18 in PC | 14 |
| 0.022% dye 19 in PC | 14 |
| 0.016% dye 20 in PC | 4 |
| 0.008% dye 21 in PC | 8 |
| 0.034% dye 22 PC | 20 |
| 0.02% dye 23 PC | 14 |
| 0.06% dye 24 in PC | >500 |
| 0.04% dye 25 in PC | >500 |
| 0.02% dye 26 in PC | 8 |
| 0.05% dye 27 in PC | 19 |

Receiver Examples

For the fabrication of a wavelength-shifting material several concentrations of dye 9/dye 24 were extruded into PMMA and a waveguide plate 10 cm×10 cm×1 mm was fabricated. The dye concentration was varied to investigate the effect of light absorption on collection efficiency. A photodiode was attached to one side of the waveguide plate.

| Example | Conc. Dye 9 with respect to PMMA | OD[1)] at 405 nm | Abs[2)] in % | Decay time[3)]/ns |
|---|---|---|---|---|
| 1 | 0.0070 | 0.33 | 53.8% | 6.0 |
| 2 | 0.0093 | 0.45 | 64.7% | |
| 3 | 0.0141 | 0.47 | 66.2% | |
| 4 | 0.0234 | 1.09 | 91.9% | |
| 5 | 0.0304 | 1.32 | 95.2% | |
| 6 | 0.0467 | 1.74 | 98.2% | 6.4 |

| Example | Conc. Dye 24 with respect to PMMA | OD at 700 nm | abs in % | Decay time/ns |
|---|---|---|---|---|
| 7 | 0.0025 | 0.16 | 31.0% | 4.5 |
| 8 | 0.0033 | 0.16 | 30.3% | |
| 9 | 0.0049 | 0.24 | 42.4% | |
| 10 | 0.0082 | 0.36 | 56.6% | |
| 11 | 0.0107 | 0.54 | 71.4% | |
| 12 | 0.0164 | 0.72 | 81.1% | 4.5 |

[1)]OD (optical density) measured with a Zeiss MC5601 UV-NIR absorption spectrometer
[2)]Abs. means the absorption in % measured with a Zeiss MC5601 UV-NIR absorption spectrometer
[3)]The decay time in ns is measured by TCSPC as described above

The invention claimed is:

1. A receiver comprising a luminescent collector, wherein an optical signal is collected and converted to electrical current, comprising
   i) at least one wavelength shifting material
   and
   ii) at least one detector,
   wherein the wavelength shifting material comprises
   ia) a polymeric matrix material, and
   ib) at least one organic fluorescent colorant B selected from the group consisting of
   (B1) a naphthoylbenzimidazole compound of formula (I)

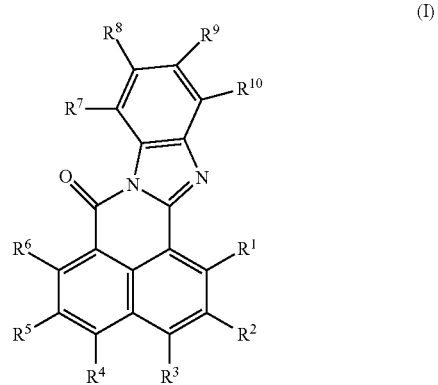

(I)

wherein
at least one of the radicals $R^1$, $R^2$, $R^3$, $R^4$, $R^5$, $R^6$, $R^7$, $R^1$, $R^9$ and $R^{10}$ independently of each other is aryl which carries one, two or three cyano groups and 0, 1, 2, 3 or 4 substituents $R^{Ar}$ and the remaining radicals $R^1$, $R^2$, $R^3$, $R^4$, $R^5$, $R^6$, $R^7$, $R^1$, $R^9$ and $R^1$ independently of each other are selected from hydrogen and aryl which is unsubstituted or carries 1, 2, 3, 4 or 5 substituents Rr,
where
$R^{Ar}$ independently of each other and independently of each occurrence is selected from halogen,
$C_1$-$C_{30}$-alkyl, $C_2$-$C_{30}$-alkenyl, $C_2$-$C_{30}$-alkynyl, where the three latter radicals are unsubstituted or carry one or more $R^a$ groups,
$C_3$-$C_8$-cycloalkyl, 3- to 8-membered heterocyclyl, where the two latter radicals are unsubstituted or carry one or more $R^b$ groups,
aryl and heteroaryl, where the two latter radicals are unsubstituted or carry one or more $R^c$ groups,
where
$R^a$ independently of each other and independently of each occurrence is selected from cyano, halogen, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{b1}$ groups, and where aryl and heteroaryl are unsubstituted or bear one or more $R^{c1}$ groups;
$R^b$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{b1}$ groups, and where aryl and heteroaryl are unsubstituted or bear one or more $R^{c1}$ groups;
$R^c$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{b1}$ groups, and where aryl and heteroaryl are unsubstituted or bear one or more $R^{c1}$ groups;
$R^{b1}$ independently of each other and independently of each occurrence is selected from halogen, $C_1$-$C_{18}$-alkyl and $C_1$-$C_{18}$-haloalkyl,
$R^{c1}$ independently of each other and independently of each occurrence is selected from halogen, $C_1$-$C_{18}$-alkyl and $C_1$-$C_{18}$-haloalkyl;
and mixtures thereof;
(B2) a cyanated naphthoylbenzimidazole compound of formula (II)

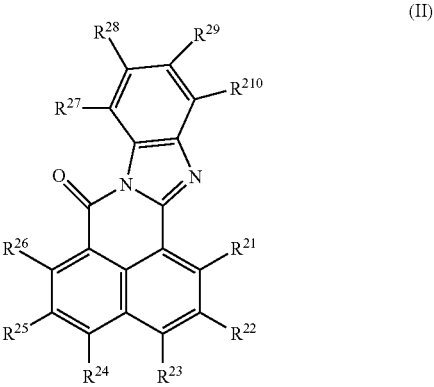

(II)

wherein
$R^{21}$, $R^{22}$, $R^{23}$, $R^{24}$, $R^{25}$, $R^{26}$, $R^{27}$, $R^{28}$, $R^{29}$ and $R^{210}$ are each independently hydrogen, cyano or aryl which is unsubstituted or has one or more identical or different substituents $R^{24r}$, where each $R^{2Ar}$ is independently selected from cyano, hydroxyl, mercapto, halogen, $C_1$-$C_{20}$-alkoxy, $C_1$-$C_{20}$-alkylthio, nitro, —$NR^{2Ar2}R^{2Ar3}$,
—$NR^{2Ar2}COR^{2Ar3}$, —$CONR^{2Ar2}R^{2Ar3}$,
$SO_2NR^{2Ar2}R^{2Ar3}$, —$COOR^{2Ar2}$, —$SO_3R^{2Ar2}$,
$C_1$-$C_{30}$-alkyl, $C_2$-$C_{30}$-alkenyl, $C_2$-$C_{30}$-alkynyl, where the three latter radicals are unsubstituted or bear one or more $R^{2a}$ groups,
$C_3$-$C_8$-cycloalkyl, 3- to 8-membered heterocyclyl, where the two latter radicals are unsubstituted or bear one or more $R^{2b}$ groups,
aryl, U-aryl, heteroaryl and U-heteroaryl, where the four latter radicals are unsubstituted or bear one or more $R^{2b}$ groups,
where
each $R^{2a}$ is independently selected from cyano, hydroxyl, oxo, mercapto, halogen, $C_1$-$C_{20}$-alkoxy, $C_1$-$C_{20}$-alkylthio, nitro,
—$NR^{2A2}R^{Ar3}$, —$NR^{2A2}COR^{2Ar3}$, —$CONR^{2A2}R^{Ar3}$, —$SO_2NR^{2Ar2}R^{Ar3}$,
—$COOR^{2Ar2}$, —$SO_3R^{2Ar2}$, $C_3$-$C_8$-cycloalkyl, 3- to 8-membered heterocyclyl, aryl and heteroaryl, where the cycloalkyl, heterocyclyl, aryl and heteroaryl radicals are unsubstituted or bear one or more $R^{2b}$ groups:
each $R^{2b}$ is independently selected from cyano, hydroxyl, oxo, mercapto, halogen, $C_1$-$C_{20}$-alkoxy, $C_1$-$C_{20}$-alkylthio, nitro,
—$NR^{2Ar2}R^{2Ar3}$, —$NR^{2Ar2}COR^{2Ar3}$, —$CONR^{2Ar2}R^{2Ar3}$, —$SO_2NR^{2Ar2}R^{2Ar3}$,
—$COOR^{2Ar2}$, —$SO_3R^{2Ar2}$, $C_1$-$C_{18}$-alkyl, $C_2$-$C_{18}$-alkenyl, $C_2$-$C_{18}$-alkynyl, $C_3$-$C_8$-cycloalkyl, 3 to 8-membered heterocyclyl, aryl and heteroaryl, where the four latter radicals are unsubstituted or bear one or more $R^{2b}$ groups,
each $R^{2b}$ is independently selected from cyano, hydroxyl, mercapto, oxo, nitro, halogen, —$NR^{2Ar2}R^{2A3}$, —$NR^{2Ar2}$, $COR^{2Ar3}$,
—$CONR^{2Ar2}R^{2Ar3}$, —$SO_2NR^{2Ar2}R^{2Ar3}$, —$COOR^{2Ar2}$, —$SO_3R^{2Ar2}$,
—$SO_3R^{2Ar2}$, $C_1$-$C_{18}$-alkyl, $C_2$-$C_{18}$-alkenyl, $C_2$-$C_{18}$-alkynyl, $C_1$-$C_{12}$-alkoxy, and $C_1$-$C_{12}$-alkylthio,
U is an —O—, —S—, —$NR^{2Ar1}$—, —CO—, —SO— or —$SO^2$— moiety;
$R^{2Ar1}$, $R^{2Ar2}$, $R^{2Ar3}$ are each independently hydrogen, $C_1$-$C_{18}$-alkyl, 3- to 8-membered cycloalkyl, 3- to 8-membered heterocyclyl, aryl or heteroaryl, where alkyl is unsubstituted or bears one or more $R^{2a}$ groups, where 3- to 8-membered cycloalkyl, 3- to 8-membered heterocyclyl, aryl and heteroaryl are unsubstituted or bear one or more $R^{2b}$ groups;
with the proviso that the compound of formula II comprises at least one cyano group,
and mixtures thereof;

(B3) a cyanated perylene compound of formula (III)

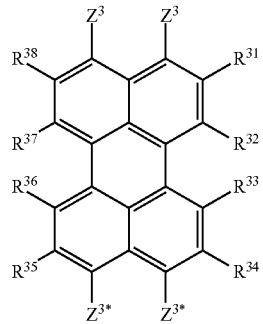

(III)

in which
one of the $Z^3$ substituents is cyano and the other $Z^3$ substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_6$-$C_{14}$-aryl, where
$C_1$-$C_{18}$-alkyl, $C_2$-$C_{18}$-alkenyl, $C_2$-$C_{18}$-alkynyl are unsubstituted or bear one or more identical or different $Z^{3a}$ substituents,
$C_3$-$C_{12}$-cycloalkyl is unsubstituted or bears one or more identical or different $Z^{3b}$ substituents, and
$C_6$-$C_{14}$-aryl is unsubstituted or bears one or more identical or different $Z^{31}$ substituents:
one of the $Z^{3*}$ substituents is cyano and the other $Z^{3*}$ substituent is $CO_2R^{39}$, $CONR^{310}R^{311}$,
$C_1$-$C_{18}$-alkyl, $C_2$-$C_{18}$-alkenyl, $C_2$-$C_{18}$-alkynyl, $C_3$-$C_{12}$-cycloalkyl or $C_6$-$C_{14}$-aryl, where
$C_1$-$C_{18}$-alkyl, $C_2$-$C_{18}$-alkenyl, $C_2$-$C_{18}$-alkynyl are unsubstituted or bear one or more identical or different $Z^{3a}$ substituents,
$C_3$-$C_{12}$-cycloalkyl is unsubstituted or bears one or more identical or different $Z^{3b}$ substituents, and
$C_6$-$C_{14}$-aryl is unsubstituted or bears one or more identical or different $Z^{3Ar}$ substituents;
$R^{31}$, $R^{32}$, $R^{33}$, $R^{34}$, $R^{35}$, $R^{36}$, $R^{37}$ and $R^{38}$ are each independently selected from hydrogen, cyano, bromine and chlorine,
with the proviso that 1, 2, 3, 4, 5, 6, 7 or 8 of the $R^{31}$, $R^{32}$, $R^{33}$, $R^{34}$, $R^{35}$, $R^{36}$, $R^{37}$ or $R^{38}$ substituents are cyano;
where
$R^{39}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where
$C_1$-$C_{10}$-alkyl, $C_2$-$C_{10}$-alkenyl, $C_2$-$C_{10}$-alkynyl are unsubstituted or bear one or more identical or different $R^{3a}$ substituents,
$C_3$-$C_{12}$-cycloalkyl is unsubstituted or bears one or more identical or different $R^{3b}$ substituents and
$C_6$-$C_{14}$-aryl is unsubstituted or bears one or more identical or different $R^{3'}$ substituents;
$R^{310}$ and $R^{311}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where
$C_1$-$C_{10}$-alkyl, $C_2$-$C_{10}$-alkenyl, $C_2$-$C_{10}$-alkynyl are unsubstituted or bear one or more identical or different $R^{3a}$ substituents,
$C_3$-$C_{12}$-cycloalkyl is unsubstituted or bears one or more identical or different $R^{3b}$ substituents and
$C_6$-$C_{14}$-aryl is unsubstituted or bears one or more identical or different $R^{3Ar}$ substituents;

each $Z^{3a}$ is independently halogen, hydroxyl, $NR^{310a}R^{311a}$, $C_1$-$C_{10}$-alkoxy, $C_1$-$C_{10}$-haloalkoxy, $C_1$-$C_{10}$-alkylthio, $C_3$-$C_{12}$-cycloalkyl, $C_6$-$C_{14}$-aryl, $C(=O)R^{39a}$; $C(=O)OR^{39a}$ or $C(O)NR^{310a}R^{311a}$ where $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

each $Z^{3b}$ and each $Z^{3Ar}$ is independently halogen, hydroxyl, $NR^{310a}R^{311a}$ $C_1$-$C_{10}$-alkyl, $C_1$-$C_{10}$-alkoxy, $C_1$-$C_{10}$-haloalkoxy, $C_1$-$C_{10}$-alkylthio, $C(=O)R^{39a}$; $C(=O)OR^{39a}$ or $C(O)NR^{310a}R^{311a}$;

each $R^{3a}$ is independently halogen, hydroxyl, $C_1$-$C_{10}$-alkoxy, $C_3$-$C_{12}$-cycloalkyl or $C_6$-$C_{14}$-aryl;

each $R^{3b}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

each $R^{3Ar}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

$R^{39a}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl; and $R^{310a}$, $R^{311a}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, and mixtures thereof;

(B4) a cyanated compound of formula (IV)

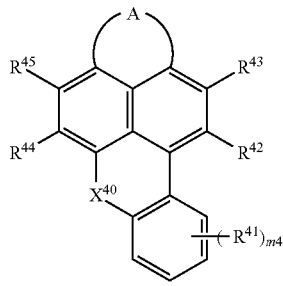

(IV)

wherein m4 is 0, 1, 2, 3 or 4;

each $R^{41}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy in the six last-mentioned radicals are unsubstituted or substituted with 1, 2, 3, 4 or 5 identical or different radicals $R^{41a}$ and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from O, S and $NR^{4c}$;

at least one of the radicals $R^{42}$, $R^{43}$, $R^{44}$ and $R^{45}$ is CN, and the remaining radicals, independently from each other, are selected from hydrogen, chlorine and bromine;

$X^{40}$ is O, S, SO or $SO_2$;

A is a diradical selected from diradicals of the general formulae (A.1), (A.2), (A.3), and (A.4)

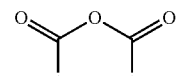

(A.1)

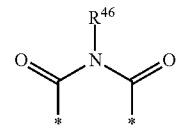

(A.2)

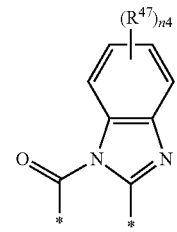

(A.3)

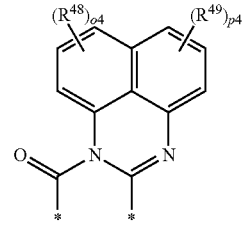

(A.4)

wherein in each case denotes the point of attachments to the remainder of the molecule;

n4 is 0, 1, 2, 3 or 4:

o4 is 0, 1, 2 or 3;

p4 is 0, 1, 2 or 3;

$R^{46}$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and arylalkylene in the three last-mentioned radicals are unsubstituted or substituted with 1, 2, 3, 4 or 5 identical or different radicals $R^{46a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^{4c}$;

each $R^{47}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{47a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

each $R^{48}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{48a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

each $R^{49}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{49a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

$R^{41a}$, $R^{46a}$, $R^{47a}$, $R^{48a}$, $R^{49a}$ are independently of one another selected from $C_1$-$C_{24}$-alkyl, $C_1$-$C_{24}$-fluoroalkyl, $C_1$-$C_{24}$-alkoxy, fluorine, chlorine and bromine:

$R^{4a}$, $R^{4b}$, $R^{4c}$ are independently of one another are selected from hydrogen, $C_1$-$C_{20}$-alkyl, $C_3$-$C_{24}$-cycloalkyl, heterocycloalkyl, heteroaryl and $C_6$-$C_{24}$-aryl:

and mixtures thereof;

(B5) a benz(othi)oxanthene compound of formula (V)

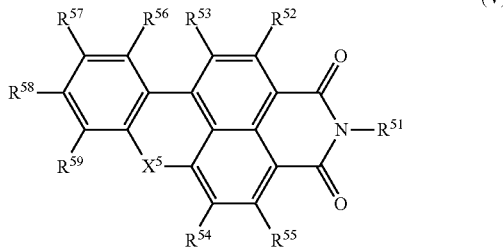

(V)

wherein
XV is oxygen or sulfur;
$R^5$ is $C_1$-$C_{24}$-alkyl which is unsubstituted or substituted by one or more $R^{5a}$ groups or $R^{51}$ is phenyl which is unsubstituted or carries 1, 2, 3, 4, or 5 substituents selected from halogen, $R^{511}$, $OR^{552}$, $NHR^{552}$ and $NR^{552}R^{557}$;

$R^{51a}$ is independently of each other and independently of each occurrence selected from cyano, halogen, $C_3$-$C_8$-cycloalkyl, 3- to 8-membered heterocyclyl, aryl and heteroaryl, where $C_3$-$C_8$-cycloalkyl, 3- to 8-membered heterocyclyl, aryl and heteroaryl are unsubstituted or bear one or more substituents selected from halogen, $C_1$-$C_{18}$-alkyl and $C_1$-$C_{18}$-haloalkyl, $R^{52}$, $R^{53}$, $R^{54}$, $R^{55}$, $R^{56}$, $R^{57}$, $R^{58}$ and $R^{59}$ are independently of each other selected from hydrogen, halogen, $R^{553}$, $OR^{553}$, $NHR^{55}$ and $NR^{553}R^{554}$;

wherein
$R^{511}$ is selected from $C_1$-$C_{20}$-alkyl, $C_6$-$C_{24}$-aryl and heteroaryl;
$R^{552}$ and $R^{557}$ are independently of each other selected from $C_1$-$C_{18}$-alkyl, $C_6$-$C_{24}$-aryl and heteroaryl; and
$R^{553}$ and $R^{554}$ are independently of each other selected from $C_1$-$C_{18}$-alkyl, $C_6$-$C_{24}$-aryl and heteroaryl;
and mixtures thereof;

(B6) a benzimidazoxanthenisoquinoline compound of formulae (VIA) or (VIB)

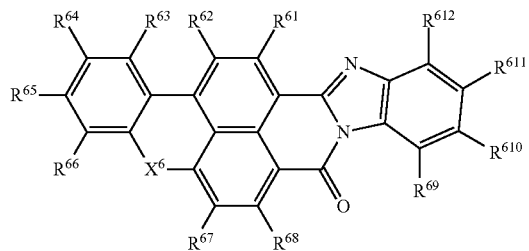

(VIA)

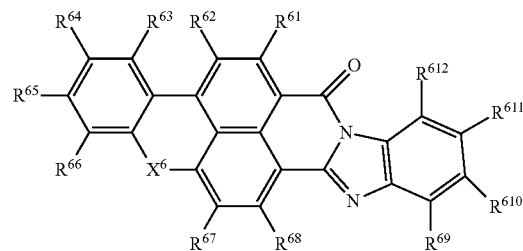

(VIB)

wherein
X6 is oxygen or sulfur:
$R^{61}$, $R^{62}$, $R^{63}$, $R^{64}$, $R^{65}$, $R^{66}$, $R^{67}$, $R^{68}$, $R^{69}$, $R^{610}$, $R^{611}$ and $R^{612}$ are independently of each other selected from hydrogen, halogen, $R^{661}$, $OR^{661}$, $NR^{661}$ and $NR^{661}R^{662}$
wherein
each $R^{661}$ is selected from $C_1$-$C_{18}$-alkyl, $C_6$-$C_{24}$-aryl and heteroaryl; and
each $R^{662}$ is selected from $C_1$-$C_{18}$-alkyl, $C_6$-$C_{24}$-aryl and heteroaryl;
and mixtures thereof;

(B7) fluorescent compound comprising at least one structural unit of formula (VII)

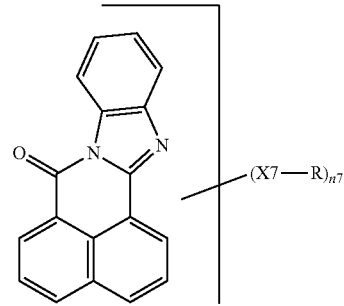

(VII)

where one or more CH groups of the six-membered ring of the benzimidazole structure shown may be replaced by nitrogen and where the symbols are each defined as follows:
n7 is a number from 0 to (10-p7) for each structural unit of the formula (VII): where
p7 is the number of CH units which have been replaced by nitrogen in the six-membered ring of the benzimidazole structure shown
X7 is a chemical bond, O, S, SO, $SO_2$, $NR^{71}$; and
R is an aliphatic radical, cycloaliphatic radical, aryl, heteroaryl, each of which may bear substituents, an aromatic or heteroaromatic ring or ring system, each of which is fused to other aromatic rings of the structural unit of the formula (VII), is F, Cl, Br, CN, H when X7 is not a chemical bond:

where two R radicals may be joined to give one cyclic radical and where X7 and R, when n7>one, may be the same or different:

$R^{71}$ is each independently hydrogen, $C_1$-$C_{18}$-alkyl or cycloalkyl, the carbon chain of which may comprise one or more —O—, —S—, —CO—, —SO— and/or —$SO_2$— moieties and which may be mono- or polysubstituted:

aryl or heteroaryl which may be mono- or polysubstituted; and mixtures thereof;

(B8) a perylene compound of formulae (VIII) or (IX)

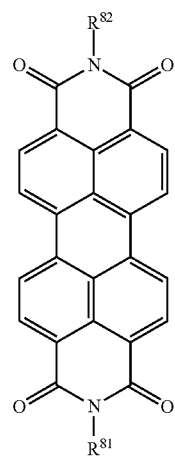

(VIII)

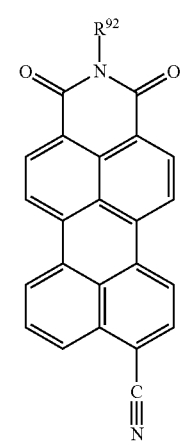

(IX)

where $R^{81}$, $R^{82}$ are each independently $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl:

$R^{92}$ is $C_1$-$C_{30}$-alkyl, $C_3$-$C_8$-cycloalkyl, aryl, heteroaryl, aryl-$C_1$-$C_{10}$-alkylene, where the aromatic ring in the three latter radicals is unsubstituted or mono- or polysubstituted by $C_1$-$C_{10}$-alkyl:

(B9) a naphthalene monoimide compound of formula (X)

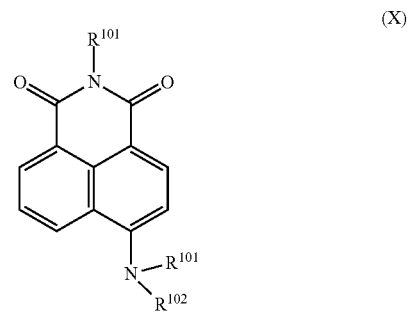

(X)

wherein each $R^{101}$ independently of each other is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

$R^{102}$ is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

(B10) 7-(diethylamino)-3-(6-methylbenzo[d]oxazol-2-yl)-2H-chromen-2-one:

(B11) a perylene compound of formulae (XIA) or (XIB)

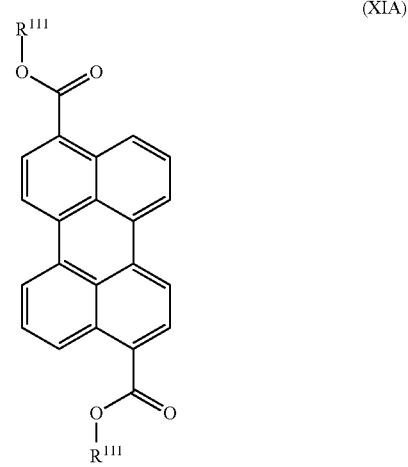

(XIA)

-continued

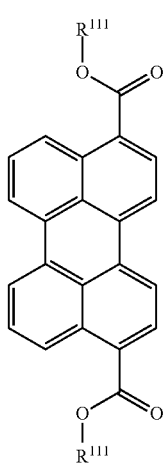

(XIB)

wherein
each $R^{111}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;
and mixtures thereof;
(B12) a cyanated perylene compound of formulae (XIIA) or (XIIB)

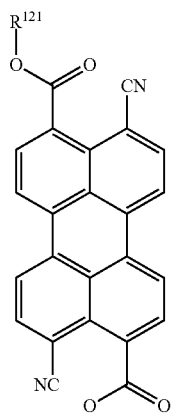

(XIIA)

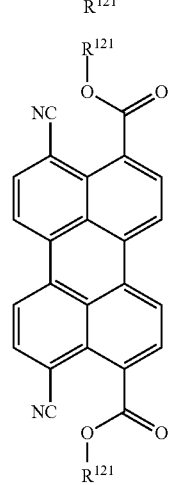

(XIIB)

wherein
each $R^{121}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;
and mixtures thereof;
(B13) a perylene bisimide compound of formula (XIII)

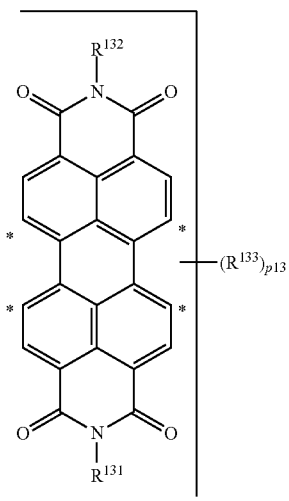

(XIII)

wherein
p13 is 1, 2, 3 or 4;
$R^{131}$ and $R^{132}$ independently of each other are $C_1$-$C_{10}$-alkyl, which is unsubstituted or substituted by $C_6$-$C_{10}$-aryl which in turn is unsubstituted or substituted by 1, 2 or 3 $C_1$-$C_{10}$-alkyl, $C_2$-$C_{20}$-alkyl, which is interrupted by one or more oxygen, $C_3$-$C_8$-cycloalkyl, which is unsubstituted or substituted by 1, 2 or 3 $C_1$-$C_{10}$-alkyl, or $C_6$-$C_{10}$-aryl which is unsubstituted or substituted by 1, 2 or 3 $C_1$-$C_{10}$-alkyl;
each $R^{133}$ independently of each other is fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy,
where the $R^{133}$ radicals are at the positions indicated by *;
and mixtures thereof;

(B14) a perylene compound of formula (XIV)

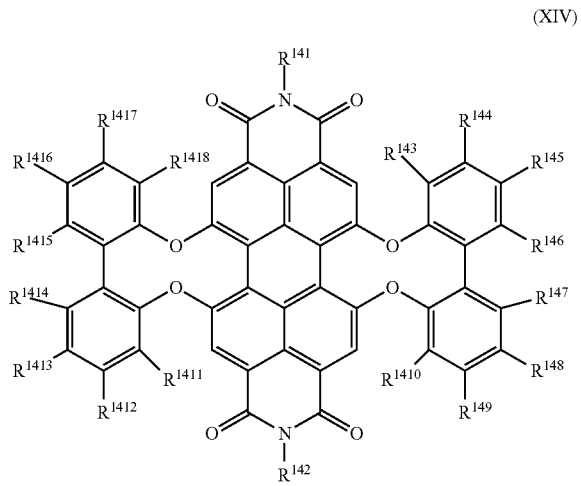

(B15) a compound of the formula (XV)

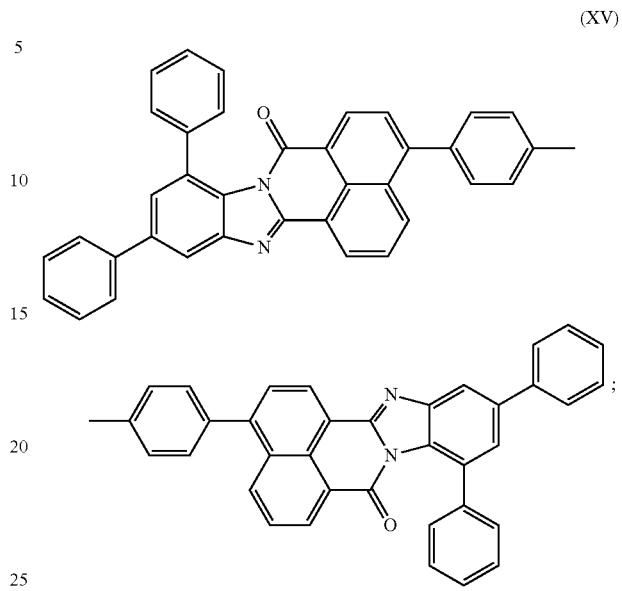

(B16) a terrylene bisimide compound of formula (XVI)

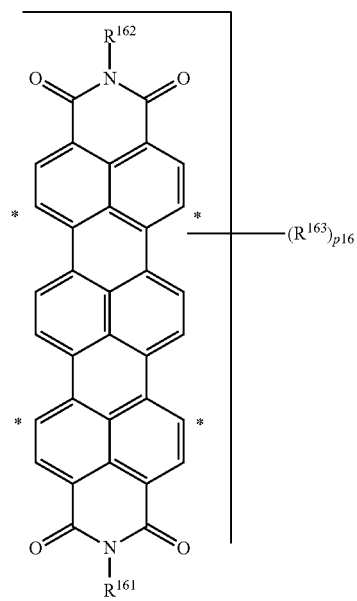

wherein $R^{141}$ and $R^{142}$, independently of each other, are selected from hydrogen, in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkyloxy, $C_6$-$C_{24}$-aryl and $C_6$-$C_{24}$-aryloxy:

$R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ independently of each other, are selected from hydrogen, halogen, cyano, hydroxyl, mercapto, nitro, -$NE^{141}E^{142}$, —$NR^{Ar141}COR^{Ar142}$; —$CONR^{Ar141}R^{Ar142}$, —$SO_2NR^{A141}R^{A142}$, —$CO$-$OR^{Ar141}$, —$SO_3R^{Ar142}$, in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkoxy, $C_6$-$C_{24}$-aryl, $C_6$-$C_{24}$-aryloxy and $C_6$-$C_{24}$-arylthio, where $R^{143}$ and $R^{144}$, $R^{144}$ and $R^{145}$, $R^{145}$ and $R^{146}$, $R^{146}$ and $R^{147}$, $R^{147}$ and $R^{148}$, $R^{148}$ and $R^{149}$, $R^{149}$ and $R^{1410}$, $R^{1411}$ and $R^{1412}$, $R^{1412}$ and $R^{1413}$, $R^{1413}$ and $R^{1414}$, $R^{1414}$ and $R^{1415}$, $R^{1415}$ and $R^{1416}$, $R^{1416}$ and $R^{1417}$ and/or $R^{1417}$ and $R^{1418}$ together with the carbon atoms of the biphenylyl moiety to which they are bonded, may also form a further fused aromatic or non-aromatic ring system wherein the fused ring system is unsubstituted or substituted;

where $E^{141}$ and $E^{142}$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl:

$R^{Ar141}$ and $R^{Ar142}$, each independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl;

and mixtures thereof;

wherein p16 is 0, 1, 2, 3 or 4;

$R^{161}$ and $R^{162}$ independently of each other are $C_1$-$C_{10}$-alkyl, which is unsubstituted or substituted by $C_6$-$C_{10}$-aryl which in turn is unsubstituted or substituted by 1, 2 or 3 $C_1$-$C_{10}$-alkyl, $C_2$-$C_{20}$-alkyl, which is interrupted by one or more oxygen, $C_3$-$C_8$-cycloalkyl, which is unsubstituted or substituted by 1, 2 or 3 $C_1$-$C_{10}$-alkyl, or $C_6$-$C_{10}$-aryl which is unsubstituted or substituted by 1, 2 or 3 $C_1$-$C_{10}$-alkyl;

$R^{163}$ if present, independently of each other is fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy, where the $R^{163}$ radicals are at the positions indicated by *; and mixtures thereof;

(B17) a cyanoaryl substituted benz(othi)oxanthene compound of formula (XVII)

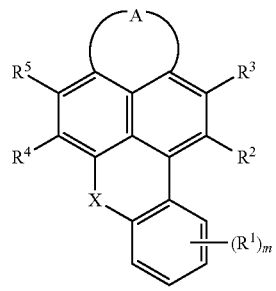

(XVII)

wherein
m is 0, 1, 2, 3 or 4:
each $R^1$ independently from each other is selected from the group consisting of bromine, chlorine, cyano, —$NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy and -aryl-alkylene in the six last-mentioned radicals are unsubstituted or substituted with 1, 2, 3, 4 or 5 identical or different radicals Ria and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from the group consisting of O, S and $NR^c$;
$R^2$, $R^3$, $R^4$ and $R^5$ are selected from the group consisting of hydrogen, chlorine, bromine and $C_6$-$C_{24}$-aryl, which carries one, two or three cyano groups;
with the proviso that at least one of the radicals $R^1$, $R^2$, $R^3$, $R^4$ and $R^5$ is $C_6$-$C_{24}$-aryl, which carries one, two or three cyano groups;
X is O, S, SO or $SO_2$;
A is a diradical selected from the group consisting of diradicals of the general formulae (A.1), (A.2), (A.3), and (A.4)

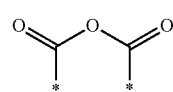
(A.1)

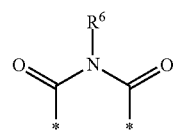
(A.2)

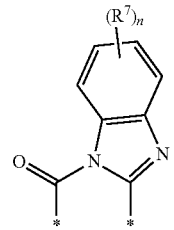
(A.3)

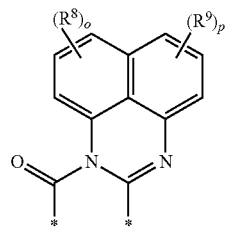
(A.4)

wherein
in each case denotes the point of attachments to the remainder of the molecule;
n is 0, 1, 2, 3 or 4;
o is 0, 1, 2 or 3;
p is 0, 1, 2 or 3;
$R^6$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and arylalkylene in the three last-mentioned radicals are unsubstituted or substituted with 1, 2, 3, 4 or 5 identical or different radicals $R^{6a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from the group consisting of O, S and $NR^c$;
each $R^7$ independently from each other is selected from the group consisting of bromine, chlorine, cyano, —$NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{7a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from the group consisting of O, S and $NR^c$;
each $R^8$ independently from each other is selected from the group consisting of bromine, chlorine, cyano, $NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{8a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from the group consisting of O, S and $NR^c$;

each $R^9$ independently from each other is selected from the group consisting of bromine, chlorine, cyano, $NR^aR^b$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and arylalkylene in the six last-mentioned radicals are unsubstituted or substituted with 1, 2, 3, 4 or 5 identical or different radicals $R^{9a}$ and where $C_1$-$C_{24}$-alkyl, $C_1$-$C_{24}$-haloalkyl, $C_1$-$C_{24}$-alkoxy, $C_1$-$C_{24}$-haloalkoxy and the alkylene moiety of $C_6$-$C_{24}$-aryl-$C_1$-$C_{10}$-alkylene may be interrupted by one or more groups selected from the group consisting of O, S and $NR^c$;

$R^{1a}$, $R^{6a}$, $R^{7a}$, $R^{8a}$, $R^{9a}$ are independently of one another selected from the group consisting of $C_1$-$C_{24}$-alkyl, $C_1$-$C_{24}$-fluoroalkyl, $C_1$-$C_{24}$-alkoxy, fluorine, chlorine, bromine and cyano;

$R^a$, $R^b$, $R^c$ are independently of one another are selected from the group consisting of hydrogen, $C_1$-$C_{20}$-alkyl, $C_3$-$C_{24}$-cycloalkyl, heterocycloalkyl, hetaryl and $C_6$-$C_{24}$-aryl, (B18) a cyano-substituted BODIPY (boron-dipyrromethene) dye selected from a compound of formulae (XVIIIa), (XVIIIb), (XVIIIc) or mixtures thereof

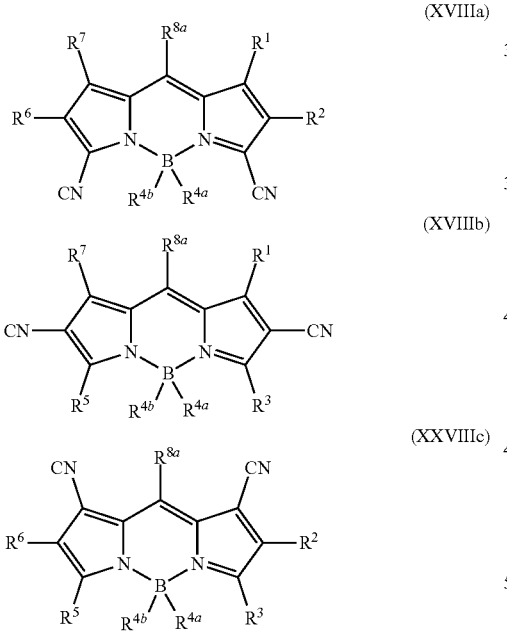

wherein $R^1$, $R^2$, $R^3$, $R^5$, $R^6$ and $R^7$, if present, in formulae (XVIIIa), (XVIIIb) and (XVIIIc) independently of each other are selected from hydrogen, $C_1$-$C_{20}$-alkyl or $C_6$-$C_{14}$-aryl-$C_1$-$C_{10}$-alkylene, wherein the aryl moiety in $C_6$-$C_{14}$-aryl-$C_1$-$C_{10}$-alkylene is unsubstituted or substituted by k identical or different substituents $R^9$;

$R^{4a}$, $R^{4b}$, in formulae (XVIIIa), (XVIIIb) and (XVIIIc), independently of each other, are selected from fluorine, chlorine, cyano or $OR^{10}$, $R^{8a}$ in formula (XVIIIa) is $C_1$-$C_{20}$-alkyl;
$R^{8b}$ in formula (XVIIIb) is $C_1$-$C_{20}$-alkyl; and
$R^{8c}$ in formula (XVIIIc) is $C_1$-$C_{20}$-alkyl, $C_6$-$C_{10}$-aryl or $C_6$-$C_{10}$-aryl-$C_1$-$C_{10}$-alkylene, wherein the aryl moieties in the two aforementioned radicals are unsubstituted or substituted by k identical or different substituents $R^9$;

wherein k is an integer from 1, 2, 3, 4, 5 or 6;

$R^9$ is $C_1$-$C_{10}$-alkyl, $C_1$-$C_{10}$-alkoxy, CN, halogen, phenyl or phenoxy; and $R^{10}$ is $C_1$-$C_{10}$-alkyl or hydroxy-$C_1$-$C_{10}$-alkyl.

2. The receiver according to claim 1, wherein the polymeric matrix of the luminescent collector is selected from the group consisting of polystyrene, polycarbonate, polymethylmethacrylate, polyvinylpyrrolidone, polymethacrylate, polyvinyl acetate, polyvinyl chloride, polybutene, silicone, polyacrylate, epoxy resin, polyvinyl alcohol, poly(ethylene vinylalcohol)-copolymer (EVA, EVOH), polyacrylonitrile, polyvinylidene chloride (PVDC), polystyrene acrylonitrile (SAN), polybutylene terephthalate (PBT), polyethylene terephthalate (PET), polyvinyl butyrate (PVB), polyvinyl chloride (PVC), polyamides, polyoxymethylenes, polyimides, polyetherimides, 2,5-furandicarboxylate polyester, UV curable or thermally curable resists and mixtures thereof.

3. The receiver according to claim 1, wherein the organic fluorescent colorant B1 of the luminescent collector is molecularly dissolved in the polymeric matrix.

4. The receiver according to claim 1, wherein the concentration of the organic fluorescent colorant (B) of the luminescent collector is in the range from 0.0001 to 5% by weight based on amount of matrix polymer.

5. The receiver according to claim 1, wherein the wavelength shifting material of the luminescent collector is present in form of sheets which may be curved and/or flexible, or is composed of one or more fibers.

6. The receiver according to claim 1, wherein (B1) is a compound of is a compound of formula (I-A)

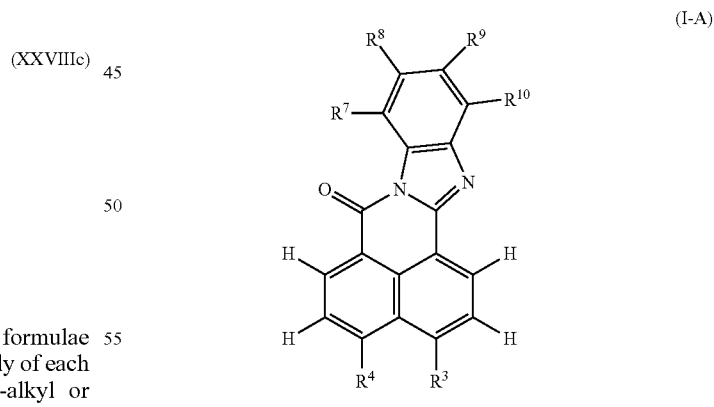

$R^3$ and $R^4$ are each independently hydrogen, phenyl, phenyl which carries 1 or 2 cyano groups or phenyl which carries 1, 2 or 3 substituents selected from $C_1$-$C_{10}$-alkyl; and $R^7$, $R^8$, $R^9$ and $R^{10}$ are each independently hydrogen, phenyl, phenyl which carries 1 or 2 cyano groups or phenyl which carries 1, 2 or 3 substituents selected from $C_1$-$C_{10}$-alkyl;

(B2) is selected from a compound of formula (II-A)

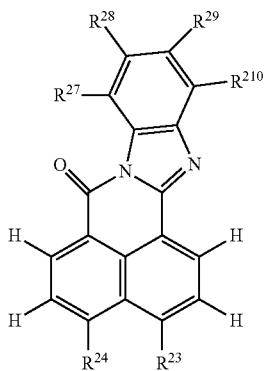

(II-A)

and mixtures thereof,
in which
$R^{23}$ and $R^{24}$ are each independently cyano, phenyl, 4-cyanophenyl or phenyl which carries 1, 2 or 3 substituents selected from $C_1$-$C_{10}$-alkyl, especially cyano, phenyl or 4-cyanophenyl; and
$R^{27}$, $R^{28}$, $R^{29}$ and $R^{210}$ are each independently hydrogen, cyano, phenyl, 4-cyanophenyl or phenyl which carries 1, 2 or 3 substituents selected from $C_1$-$C_{10}$-alkyl, especially hydrogen, cyano, phenyl or 4-cyanophenyl;
(B3) is selected from the group consisting of compounds of formulae (III-a), (III-b), (III-c) and (IIII-d):

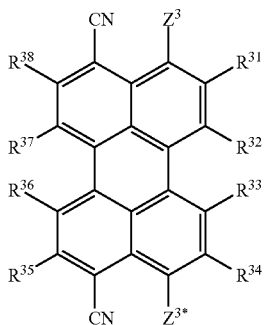

(III-a)

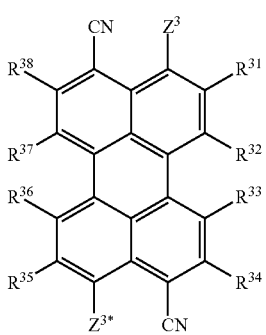

(III-b)

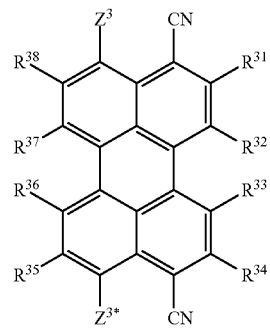

(III-c)

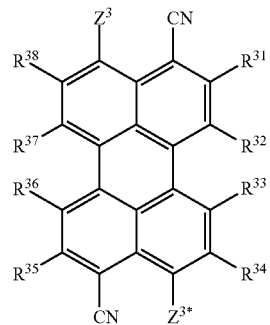

(III-d)

individually and mixtures thereof;
(B4) is a compound of formula (IV), wherein $X^{40}$ is O or $X^{40}$ is S;
(B5) is a benzothioxanthene compound of formula (V), wherein $X^5$ is O or S, $R^{51}$ is $C_1$-$C_{24}$-alkyl and $R^{52}$-$R^{59}$ are hydrogen;
(B6) is a benzimidazoxanthenisoquinoline compound of formula (VIA) and (VIB);
(B7) is a compound selected from compounds of formulae (VII-5), (VII-6), (VII-7), (VII8), (VII-56), (VII-57), (VII-58) and (VII-59) and mixtures thereof

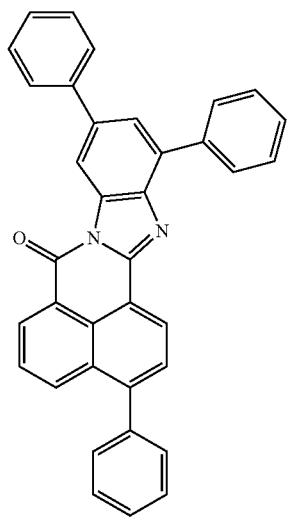

(VII-5)

(VII-6)
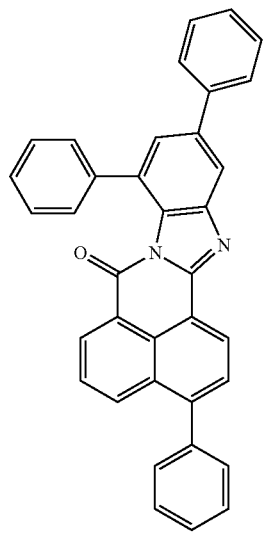
(VII-7)
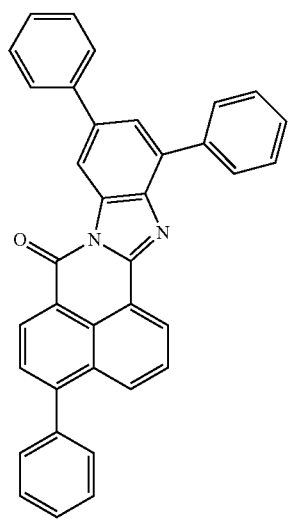
(VII-8)
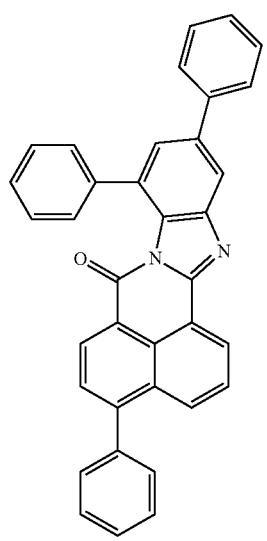
(VII-56)
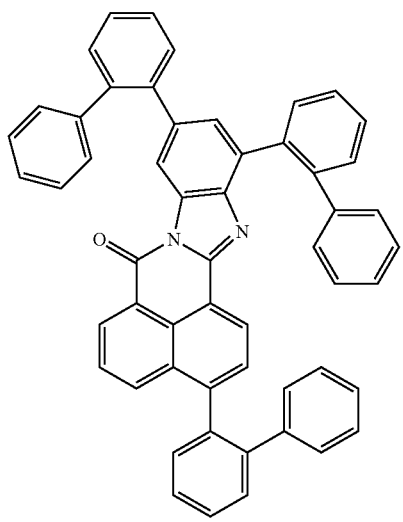
(VII-57)
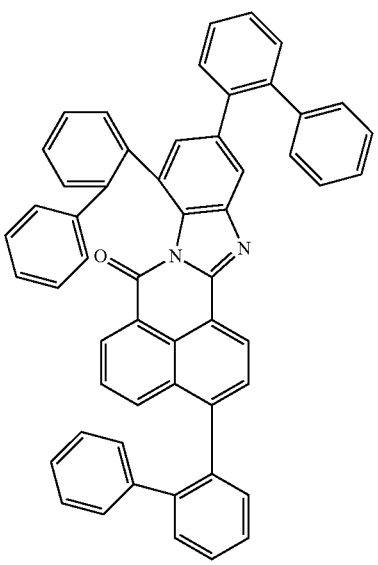

161
-continued

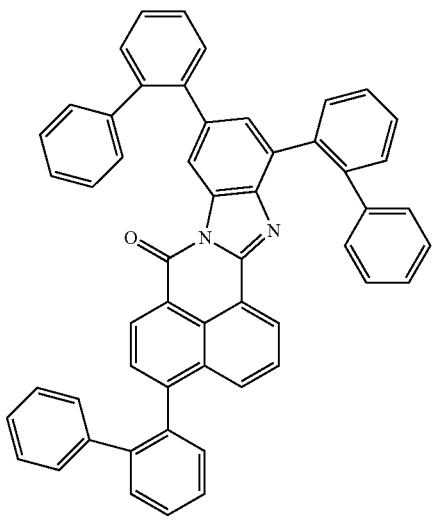
(VII-58)

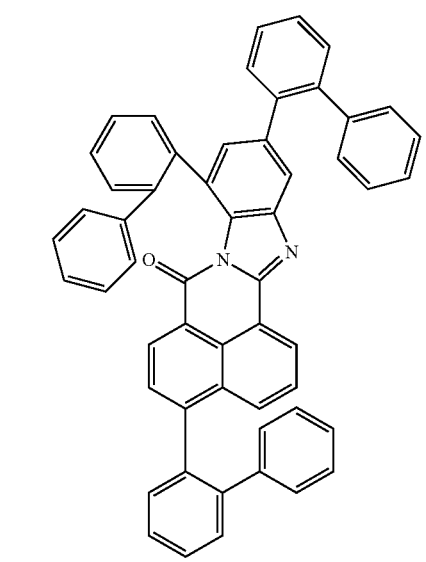
(VII-59)

and mixtures thereof;

162

(B8) is selected from compounds (VIII-1)

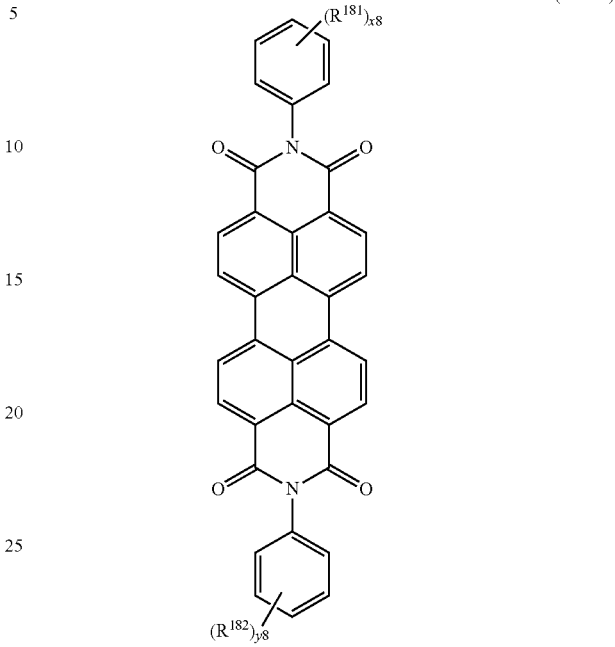
(VIII-1)

wherein
x8 is 1, 2 or 3,
y8 is 1, 2 or 3,
$R^{181}$ is $C_1$-$C_4$-alkyl, and
$R^{182}$ is $C_1$-$C_4$-alkyl;

(B9) is a 4-amino substituted naphthalimide compound of formula (X), wherein $R^{101}$ is linear or branched $C_1$-$C_{10}$-alkyl, $C_2$-$C_{10}$-alkyl which is interrupted by one or more oxygen, or $C_3$-$C_8$-cycloalkyl and $R^{102}$ is hydrogen or linear or branched $C_1$-$C_{10}$-alkyl;

(B10) is 7-(Diethylamino)-3-(6-methylbenzo[d]oxazol-2-yl)-2H-chromen-2-one:

(B11) is a compound of formulae (XIA) or (XIB), wherein $R^{111}$ is linear $C_1$-$C_{10}$-alkyl or branched $C_3$-$C_{10}$-alkyl;

(B12) is a compound of formulae (XIIA) or (XIIB), wherein $R^{121}$ is linear $C_1$-$C_{10}$-alkyl or branched $C_3$-$C_{10}$-alkyl;

(B13) is a compound of formula (XIII), wherein $R^{131}$ and $R^{132}$ are each independently selected from $C_1$-$C_{10}$-alkyl, 2,6-di($C_1$-$C_{10}$-alkyl)aryl and 2,4-di($C_1$-$C_{10}$-alkyl)aryl, $R^{133}$ is phenoxy, which is unsubstituted or substituted by 1 or 2 identical or different substituents selected from fluorine, chlorine, $C_1$-$C_{10}$-alkyl and phenyl and p13 is 2, 3 or 4, in particular 2 or 4;

(B14) is a compound of formula (XIV), where $R^{141}$ and $R^{142}$ are, independently of each other, selected from phenyl which is unsubstituted or substituted by 1, 2 or 3 $C_1$-$C_6$-alkyl;

and $R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ are each hydrogen;

(B15) is a compound of the formula (XV-1)
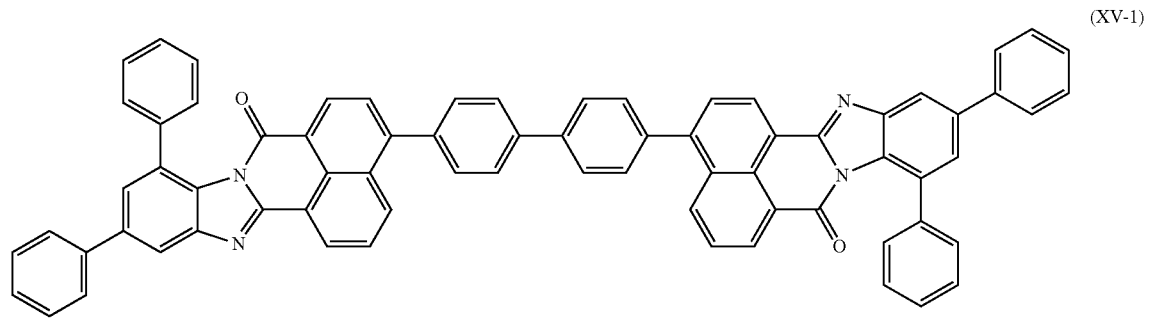 [SMILES: O=c1c2ccc(-c3ccc(-c4ccc(-c5ccc6c7c5cccc7c(=O)n5c6nc6cc(-c7ccccc7)cc(-c7ccccc7)c65)cc4)cc3)c3cccc(c32)c2nc3cc(-c4ccccc4)cc(-c4ccccc4)c3n12]
and
(B16) is selected from compounds (XVI-1) and compounds (XVI-2)
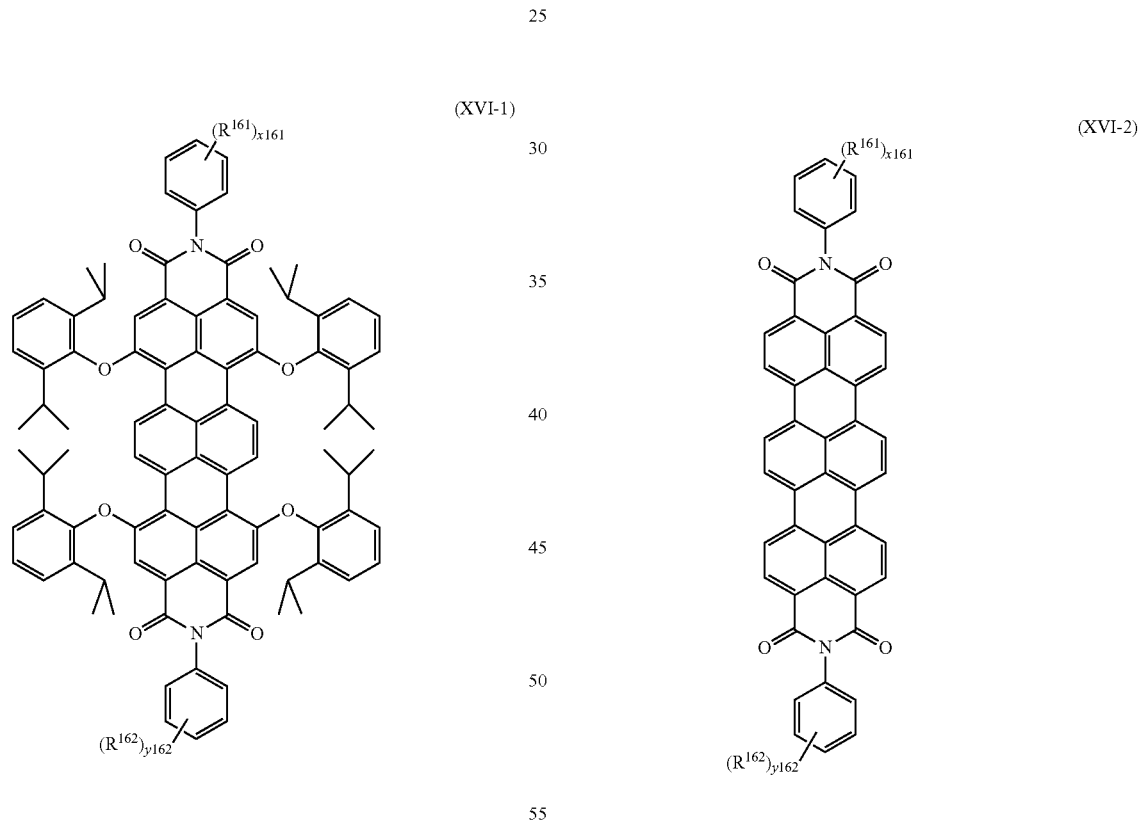
wherein
x161 is 1, 2 or 3,
y162 is 1, 2 or 3,
$R^{161}$ is $C_1$-$C_4$-alkyl, and
$R^{162}$ is $C_1$-$C_4$-alkyl;
wherein
x161 is 1, 2 or 3,
y162 is 1, 2 or 3,
$R^{161}$ is $C_1$-$C_4$-alkyl, and
$R^{162}$ is $C_1$-$C_4$-alkyl;

(B17) is selected from the following compounds:

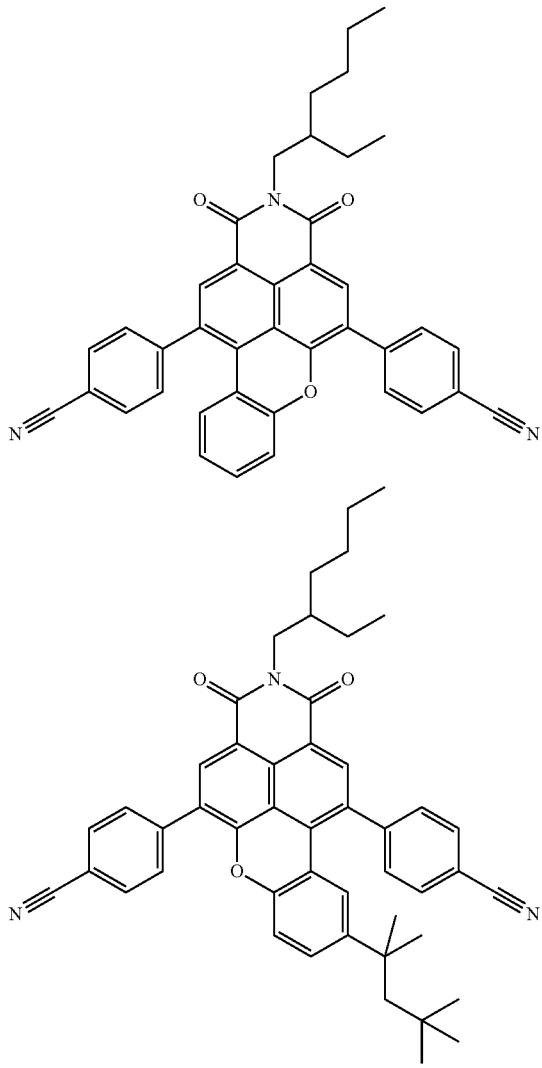

(B18) is selected from the following compounds

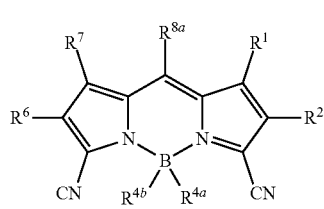
(XVIIIa)

TABLE A

| Compound | R¹ | R² | R⁴ᵃ | R⁴ᵇ | R⁶ | R⁷ | R⁸ᵃ |
|---|---|---|---|---|---|---|---|
| XVIIIa-1 | CH₃ | CH₃ | F | F | CH₃ | CH₃ | CH₃ |
| XVIIIa-2 | CH₃ | CH₃ | Cl | Cl | CH₃ | CH₃ | CH₃ |
| XVIIIa-3 | CH₃ | CH₃ | CN | CN | CH₃ | CH₃ | CH₃ |
| XVIIIa-4 | CH₃ | CH₃ | OCH₃ | OCH₃ | CH₃ | CH₃ | CH₃ |
| XVIIIa-5 | CH₃ | CH₃ | 2-htp | 2-htp | CH₃ | CH₃ | CH₃ |
| XVIIIa-6 | C₂H₅ | C₂H₅ | F | F | C₂H₅ | C₂H₅ | C₂H₅ |
| XVIIIa-7 | C₂H₅ | C₂H₅ | Cl | Cl | C₂H₅ | C₂H₅ | C₂H₅ |
| XVIIIa-8 | C₂H₅ | C₂H₅ | CN | CN | C₂H₅ | C₂H₅ | C₂H₅ |
| XVIIIa-9 | C₂H₅ | C₂H₅ | OCH₃ | OCH₃ | C₂H₅ | C₂H₅ | C₂H₅ |
| XVIIIa-10 | C₂H₅ | C₂H₅ | 2-htp | 2-htp | C₂H₅ | C₂H₅ | C₂H₅ |
| XVIIIa-11 | CH₃ | C₂H₅ | F | F | C₂H₅ | CH₃ | CH₃ |
| XVIIIa-12 | CH₃ | C₂H₅ | Cl | Cl | C₂H₅ | CH₃ | CH₃ |
| XVIIIa-13 | CH₃ | C₂H₅ | CN | CN | C₂H₅ | CH₃ | CH₃ |
| XVIIIa-14 | CH₃ | C₂H₅ | OCH₃ | OCH₃ | C₂H₅ | CH₃ | CH₃ |
| XVIIIa-15 | CH₃ | C₂H₅ | 2-htp | 2-htp | C₂H₅ | CH₃ | CH₃ |
| XVIIIa-16 | CH₃ | H | F | F | H | CH₃ | CH₃ |
| XVIIIa-17 | CH₃ | H | Cl | Cl | H | CH₃ | CH₃ |
| XVIIIa-18 | CH₃ | H | CN | CN | H | CH₃ | CH₃ |
| XVIIIa-19 | CH₃ | H | OCH₃ | OCH₃ | H | CH₃ | CH₃ |
| XVIIIa-20 | CH₃ | H | 2-htp | 2-htp | H | CH₃ | CH₃ |

2-htp: 2-hydroxy-1,1,2-trimethylpropoxy

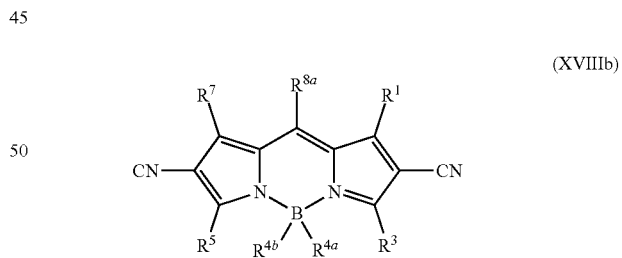
(XVIIIb)

TABLE B

| Compound | R¹ | R² | R⁴ᵃ | R⁴ᵇ | R⁶ | R⁷ | R⁸ᵃ |
|---|---|---|---|---|---|---|---|
| XVIIIb-1 | CH₃ | CH₃ | F | F | CH₃ | CH₃ | CH₃ |
| XVIIIb-2 | CH₃ | CH₃ | Cl | Cl | CH₃ | CH₃ | CH₃ |
| XVIIIb-3 | CH₃ | CH₃ | CN | CN | CH₃ | CH₃ | CH₃ |
| XVIIIb-4 | CH₃ | CH₃ | OCH₃ | OCH₃ | CH₃ | CH₃ | CH₃ |
| XVIIIb-5 | CH₃ | CH₃ | 2-htp | 2-htp | CH₃ | CH₃ | CH₃ |
| XVIIIb-6 | C₂H₅ | C₂H₅ | F | F | C₂H₅ | C₂H₅ | C₂H₅ |
| XVIIIb-7 | C₂H₅ | C₂H₅ | Cl | Cl | C₂H₅ | C₂H₅ | C₂H₅ |
| XVIIIb-8 | C₂H₅ | C₂H₅ | CN | CN | C₂H₅ | C₂H₅ | C₂H₅ |

TABLE B-continued

| Compound | $R^1$ | $R^2$ | $R^{4a}$ | $R^{4b}$ | $R^6$ | $R^7$ | $R^{8a}$ |
|---|---|---|---|---|---|---|---|
| XVIIIb-9 | $C_2H_5$ | $C_2H_5$ | $OCH_3$ | $OCH_3$ | $C_2H_5$ | $C_2H_5$ | $C_2H_5$ |
| XVIIIb-10 | $C_2H_5$ | $C_2H_5$ | 2-htp | 2-htp | $C_2H_5$ | $C_2H_5$ | $C_2H_5$ |
| XVIIIb-11 | $CH_3$ | $C_2H_5$ | F | F | $C_2H_5$ | $CH_3$ | $CH_3$ |
| XVIIIb-12 | $CH_3$ | $C_2H_5$ | Cl | Cl | $C_2H_5$ | $CH_3$ | $CH_3$ |
| XVIIIb-13 | $CH_3$ | $C_2H_5$ | CN | CN | $C_2H_5$ | $CH_3$ | $CH_3$ |
| XVIIIb-14 | $CH_3$ | $C_2H_5$ | $OCH_3$ | $OCH_3$ | $C_2H_5$ | $CH_3$ | $CH_3$ |
| XVIIIb-15 | $CH_3$ | $C_2H_5$ | 2-htp | 2-htp | $C_2H_5$ | $CH_3$ | $CH_3$ |
| XVIIIb-16 | $CH_3$ | H | F | F | H | $CH_3$ | $CH_3$ |
| XVIIIb-17 | $CH_3$ | H | Cl | Cl | H | $CH_3$ | $CH_3$ |
| XVIIIb-18 | $CH_3$ | H | CN | CN | H | $CH_3$ | $CH_3$ |
| XVIIIb-19 | $CH_3$ | H | $OCH_3$ | $OCH_3$ | H | $CH_3$ | $CH_3$ |
| XVIIIb-20 | $CH_3$ | H | 2-htp | 2-htp | H | $CH_3$ | $CH_3$ |

2-htp: 2-hydroxy-1,1,2-trimethylpropoxy

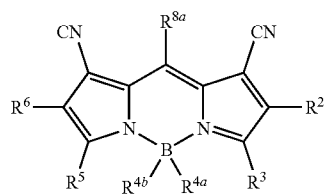

(XVIIIc)

TABLE C

| Compound | $R^2$ | $R^3$ | $R^{4a}$ | $R^{4b}$ | $R^5$ | $R^6$ | $R^{8c}$ |
|---|---|---|---|---|---|---|---|
| XVIIIc-1 | $CH_3$ | $CH_3$ | F | F | $CH_3$ | $CH_3$ | $CH_3$ |
| XVIIIc-2 | $CH_3$ | $CH_3$ | Cl | Cl | $CH_3$ | $CH_3$ | $CH_3$ |
| XVIIIc-3 | $CH_3$ | $CH_3$ | CN | CN | $CH_3$ | $CH_3$ | $CH_3$ |
| XVIIIc-4 | $CH_3$ | $CH_3$ | $OCH_3$ | $OCH_3$ | $CH_3$ | $CH_3$ | $CH_3$ |
| XVIIIc-5 | $CH_3$ | $CH_3$ | 2-htp | 2-htp | $CH_3$ | $CH_3$ | $CH_3$ |
| XVIIIc-6 | $C_2H_5$ | $C_2H_5$ | F | F | $C_2H_5$ | $C_2H_5$ | $C_2H_5$ |
| XVIIIc-7 | $C_2H_5$ | $C_2H_5$ | Cl | Cl | $C_2H_5$ | $C_2H_5$ | $C_2H_5$ |
| XVIIIc-8 | $C_2H_5$ | $C_2H_5$ | CN | CN | $C_2H_5$ | $C_2H_5$ | $C_2H_5$ |
| XVIIIc-9 | $C_2H_5$ | $C_2H_5$ | $OCH_3$ | $OCH_3$ | $C_2H_5$ | $C_2H_5$ | $C_2H_5$ |
| XVIIIc-10 | $C_2H_5$ | $C_2H_5$ | 2-htp | 2-htp | $C_2H_5$ | $C_2H_5$ | $C_2H_5$ |
| XVIIIc-11 | $C_6H_5$ | $CH_3$ | F | F | $CH_3$ | $C_6H_5$ | $CH_3$ |
| XVIIIc-12 | $C_6H_5$ | $CH_3$ | Cl | Cl | $CH_3$ | $C_6H_5$ | $CH_3$ |
| XVIIIc-13 | $C_6H_5$ | $CH_3$ | CN | CN | $CH_3$ | $C_6H_5$ | $CH_3$ |
| XVIIIc-14 | $C_6H_5$ | $CH_3$ | $OCH_3$ | $OCH_3$ | $CH_3$ | $C_6H_5$ | $CH_3$ |
| XVIIIc-15 | $C_6H_5$ | $CH_3$ | 2-htp | 2-htp | $CH_3$ | $C_6H_5$ | $CH_3$ |
| XVIIIc-16 | $CH_3$ | $CH_3$ | F | F | $CH_3$ | $CH_3$ | $C_6H_5$ |
| XVIIIc-17 | $CH_3$ | $CH_3$ | Cl | Cl | $CH_3$ | $CH_3$ | $C_6H_5$ |
| XVIIIc-18 | $CH_3$ | $CH_3$ | CN | CN | $CH_3$ | $CH_3$ | $C_6H_5$ |
| XVIIIc-19 | $CH_3$ | $CH_3$ | $OCH_3$ | $OCH_3$ | $CH_3$ | $CH_3$ | $C_6H_5$ |
| XVIIIc-20 | $CH_3$ | $CH_3$ | 2-htp | 2-htp | $CH_3$ | $CH_3$ | $C_6H_5$ |
| XVIIIc-21 | $CH_3$ | $CH_3$ | F | F | $CH_3$ | $CH_3$ | $4\text{-}CH_3C_6H_4$ |
| XVIIIc-22 | $CH_3$ | $CH_3$ | Cl | Cl | $CH_3$ | $CH_3$ | $4\text{-}CH_3C_6H_4$ |
| XVIIIc-23 | $CH_3$ | $CH_3$ | CN | CN | $CH_3$ | $CH_3$ | $4\text{-}CH_3C_6H_4$ |
| XVIIIc-24 | $CH_3$ | $CH_3$ | $OCH_3$ | $OCH_3$ | $CH_3$ | $CH_3$ | $4\text{-}CH_3C_6H_4$ |
| XVIIIc-25 | $CH_3$ | $CH_3$ | 2-htp | 2-htp | $CH_3$ | $CH_3$ | $4\text{-}CH_3C_6H_4$ |
| XVIIIc-26 | $CH_3$ | $CH_3$ | F | F | $CH_3$ | $CH_3$ | $CH_2C_6H_5$ |
| XVIIIc-27 | $CH_3$ | $CH_3$ | Cl | Cl | $CH_3$ | $CH_3$ | $CH_2C_6H_5$ |
| XVIIIc-28 | $CH_3$ | $CH_3$ | CN | CN | $CH_3$ | $CH_3$ | $CH_2C_6H_5$ |
| XVIIIc-29 | $CH_3$ | $CH_3$ | $OCH_3$ | $OCH_3$ | $CH_3$ | $CH_3$ | $CH_2C_6H_5$ |
| XVIIIc-30 | $CH_3$ | $CH_3$ | 2-htp | 2-htp | $CH_3$ | $CH_3$ | $CH_2C_6H_5$ |

2-htp: 2-hydroxy-1,1,2-trimethylpropoxy.

7. The receiver according to claim 1, wherein the organic fluorescent colorants (f) are selected from the following compounds and mixtures thereof:

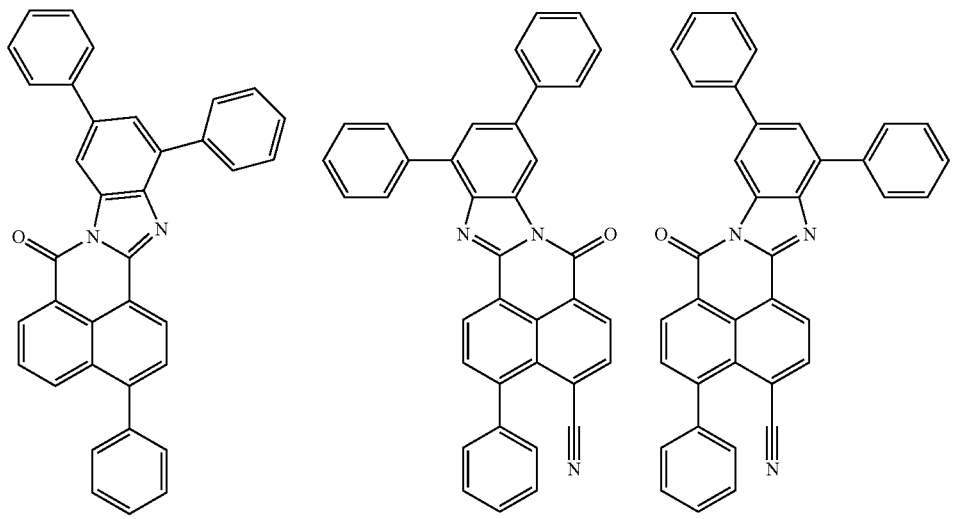

-continued
169
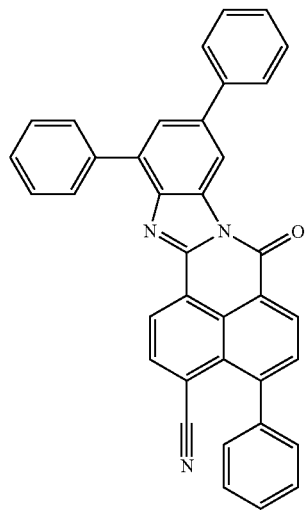
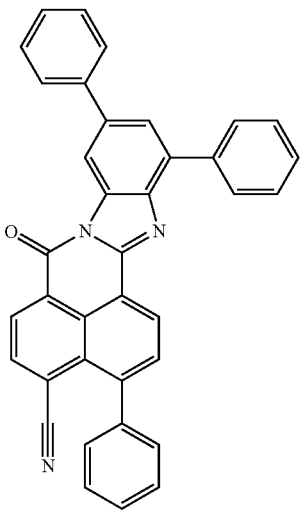
170
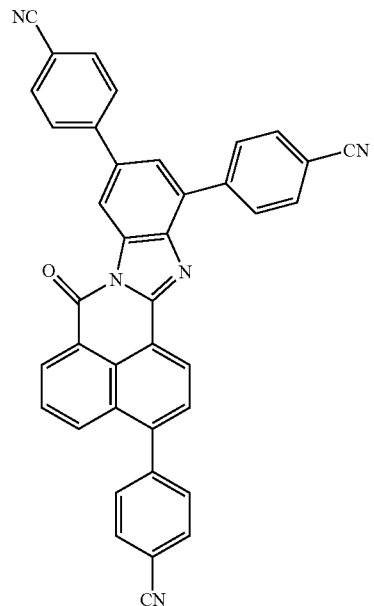
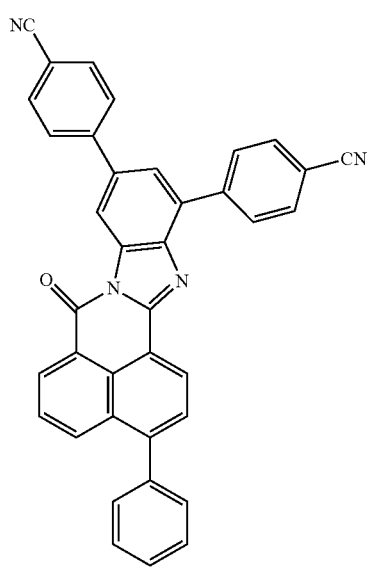
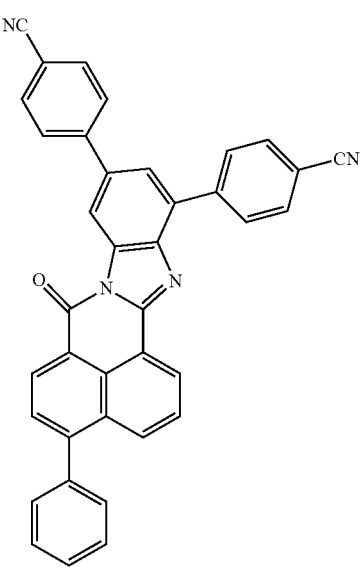
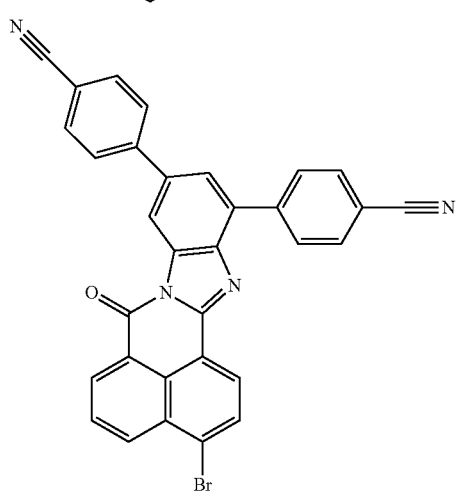
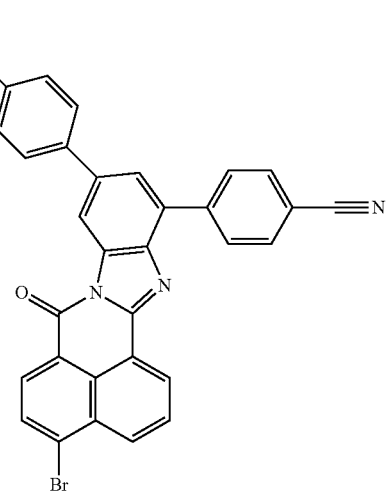

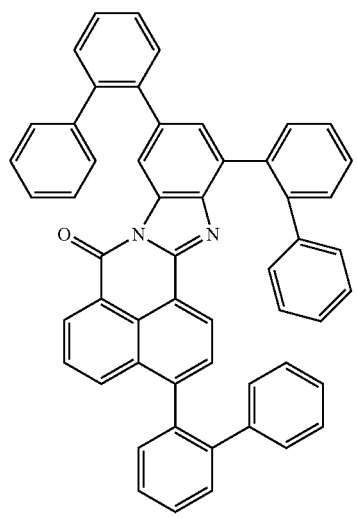
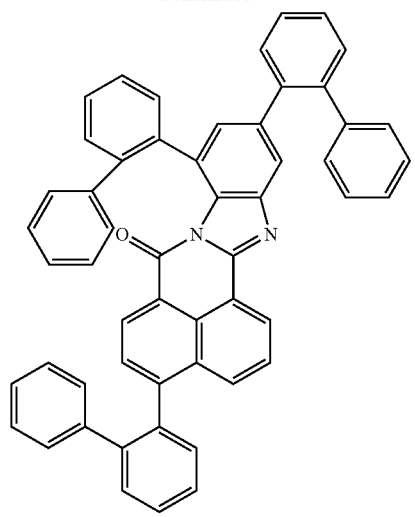
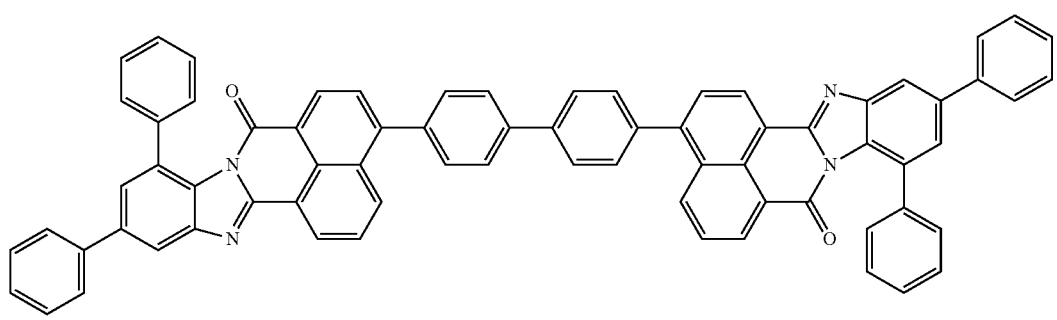
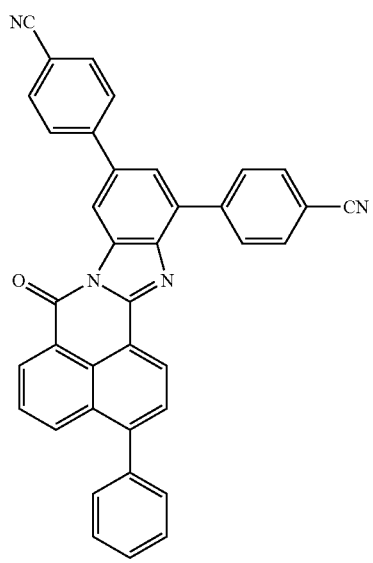
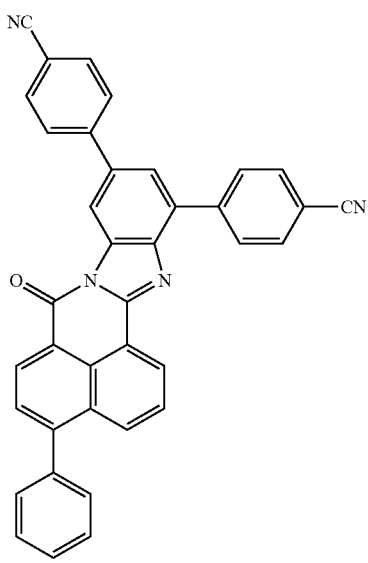

173 174
-continued
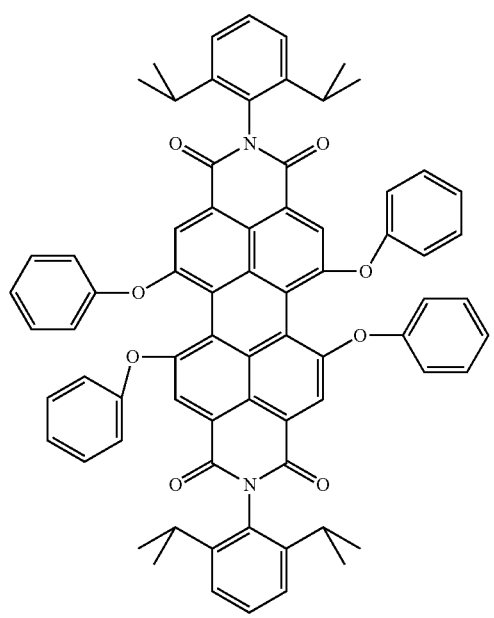 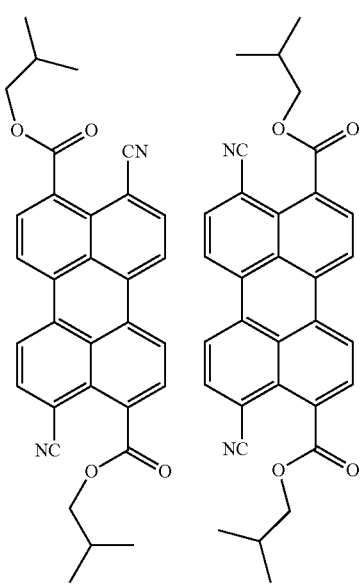
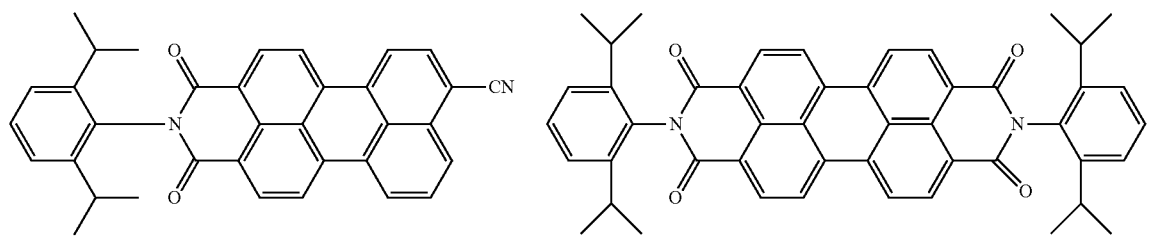
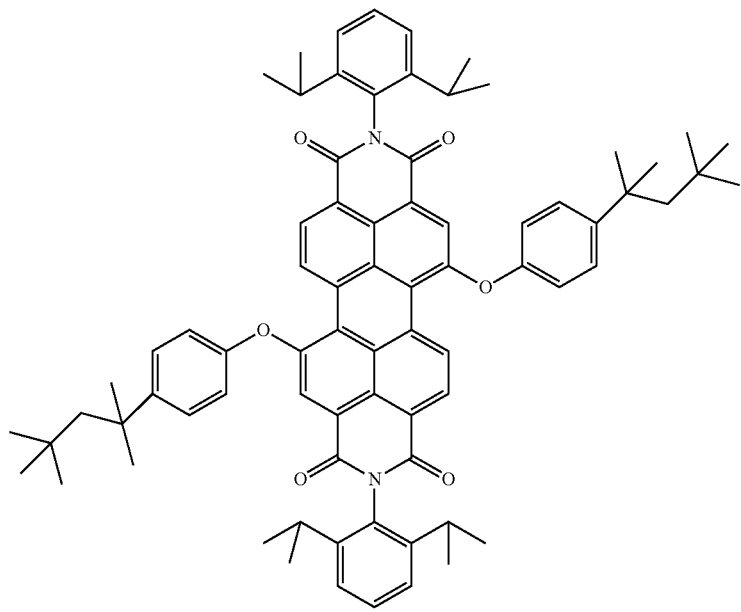

175
176
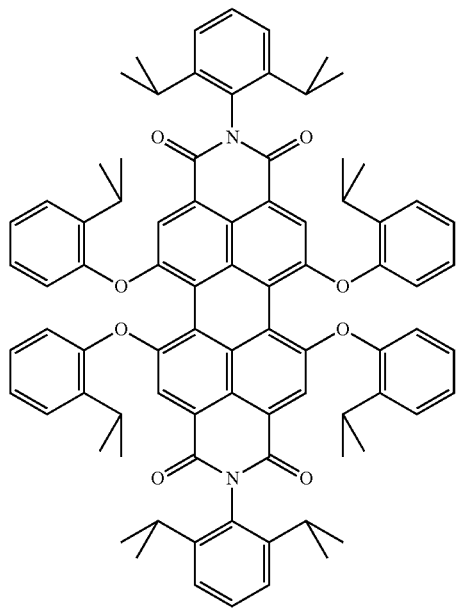
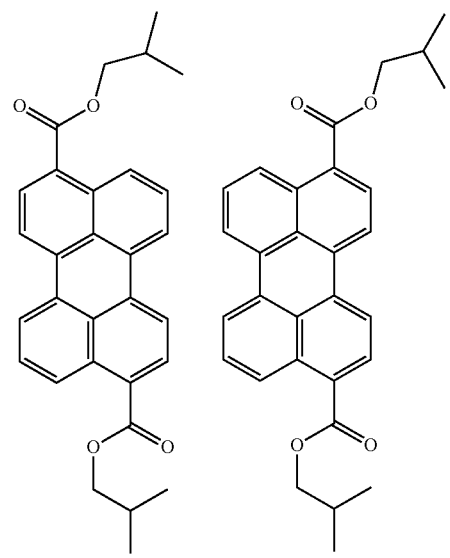
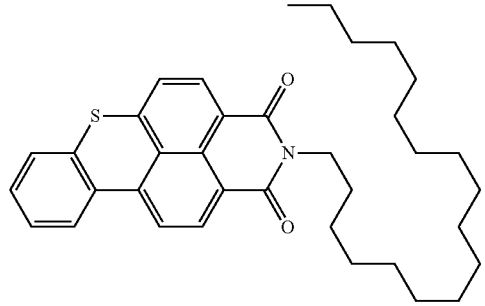
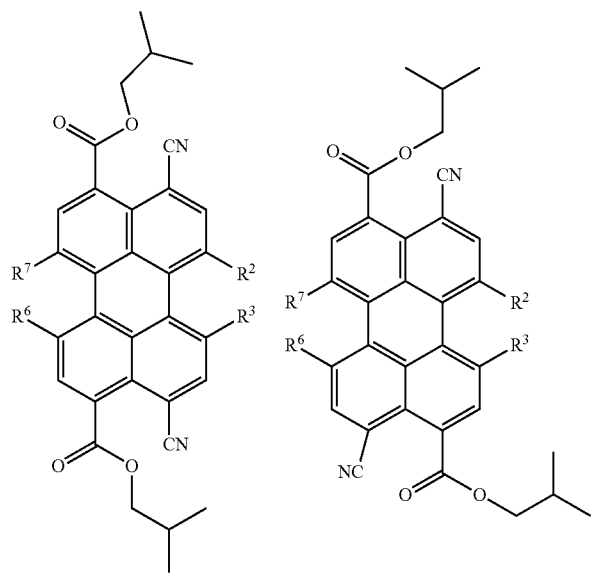
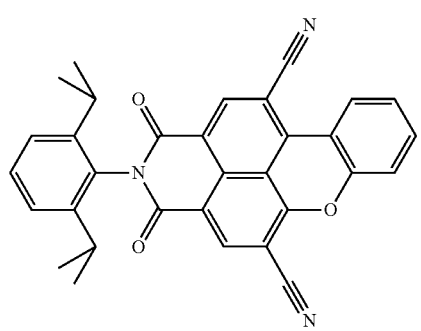
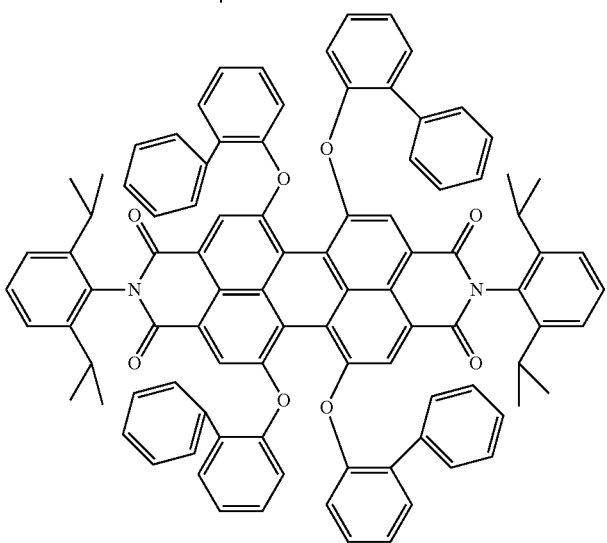

-continued
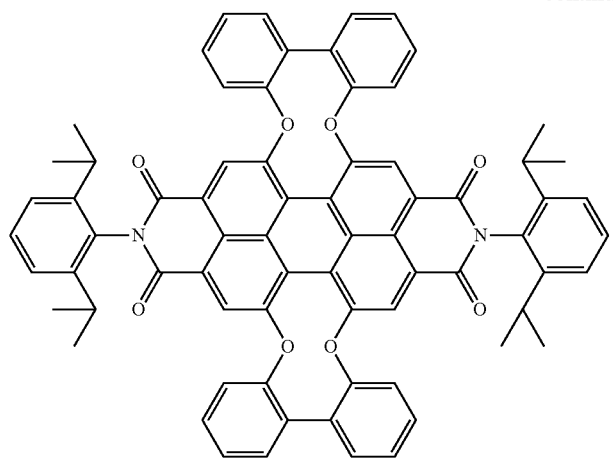
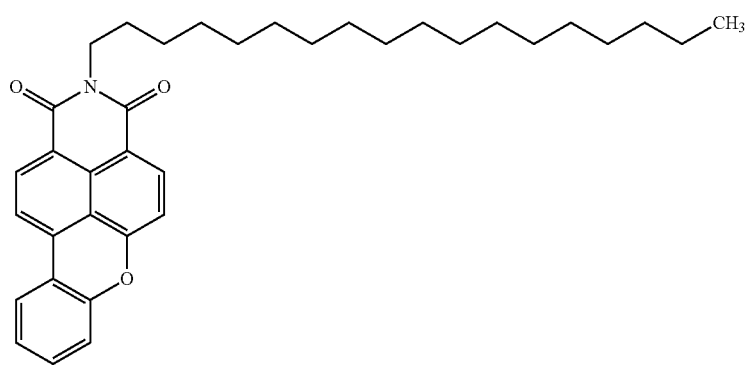
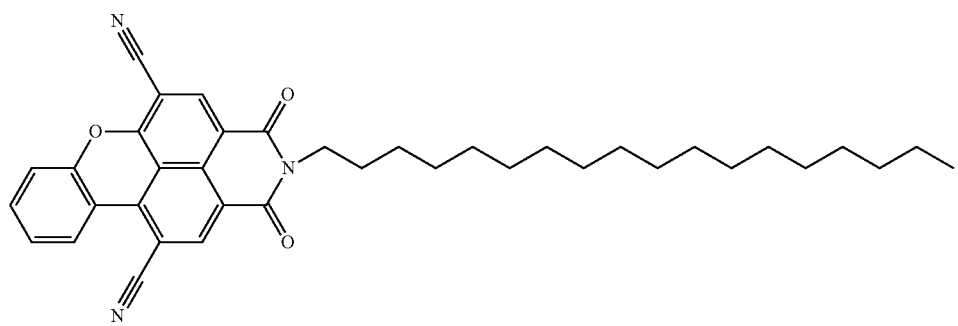

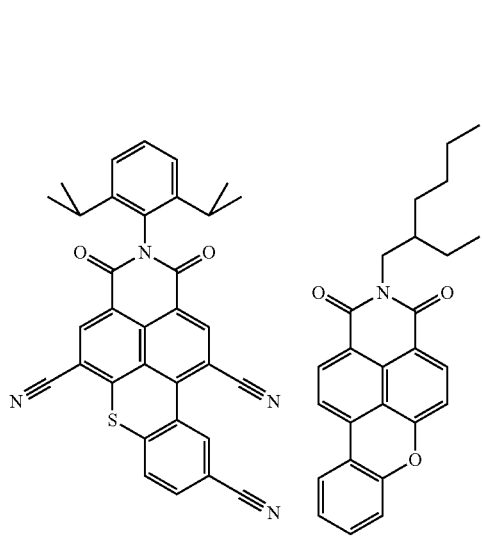
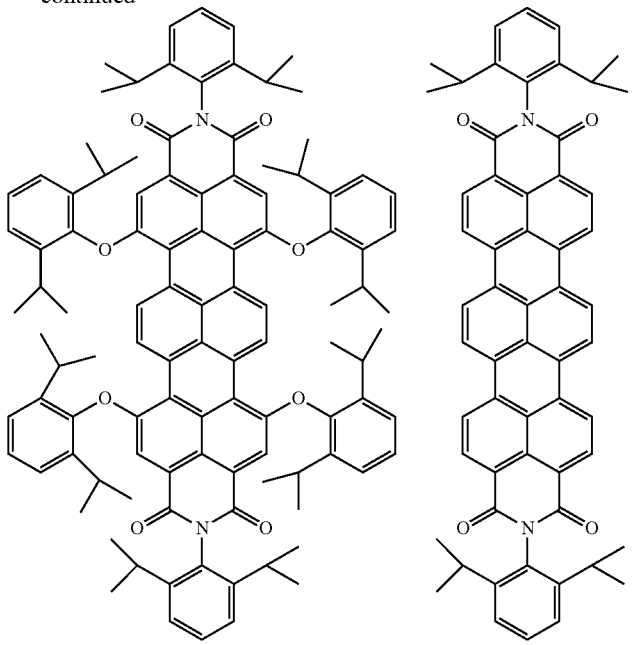
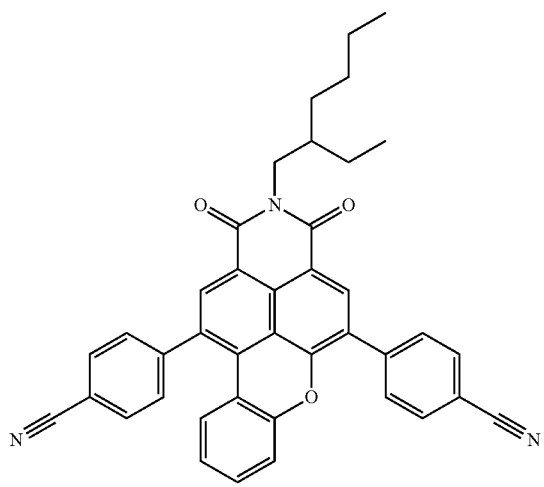
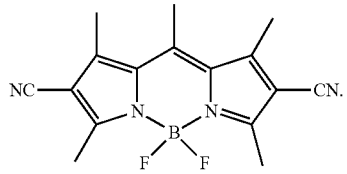

8. The receiver according to claim 1, wherein the luminescence lifetime $\tau_0$ of the organic fluorescent colorants B is 0.1 ns to 10 ns.

9. The receiver according to claim 1, wherein the detector of the luminescent collector is a photodiode or an array of photodiodes.

10. An optical data communication system comprising
at least one transmitter (T), wherein an electrical signal is transformed to an optical signal, and
at least one receiver (R) comprising a luminescent collector, wherein the optical signal is collected and converted to electrical current, comprising
i) at least one wavelength shifting material and
ii) at least one detector;
wherein at least one organic fluorescent colorant (B) selected from the group consisting of B1, B2, B3, B4, B5, B6, B7, B8, B9, B10, B11, B12, B13, B14, B15, B16, B17, and B18 according to claim 1 is present in the wavelength shifting material in the receiver.

11. The optical data communication system according to claim 10 comprising
(i) an input (A),
(ii) a transmitter (T),
(iii) an optical path (C),
(iv) a receiver (R), and
(v) an output (E),
wherein at least one organic fluorescent colorant B selected from the group consisting of B1, B2, B3, B4, B5, B7, B8, B11, B12, B13, B14, B15, B16, B17 and B18 is present in the wavelength shifting material in the receiver.

12. The optical data communication system according to claim 10, which is a free space optical data communication system.

13. Use of at least one compound as defined in claim 1 in a wavelength shifting material in a receiver for an optical data communication system, wherein the receiver comprises a luminescent collector, wherein an optical signal is collected and converted to electrical current, comprising
i) at least one wavelength shifting material and
ii) at least one detector.

14. The receiver according to claim 1, wherein the concentration of the organic fluorescent colorant (B) of the luminescent collector is in the range from 0.001 to 0.5% by weight based on the amount of matrix polymer.

15. The receiver according to claim 1, wherein the luminescence lifetime $\tau_0$ of the organic fluorescent colorants B is 0.2 ns to 7 ns.

* * * * *